US008440951B2

(12) United States Patent
Furuya et al.

(10) Patent No.: US 8,440,951 B2
(45) Date of Patent: May 14, 2013

(54) WAVELENGTH CONVERSION LASER LIGHT SOURCE HAVING DUAL OPTICAL RECEIVER AND A TEMPERATURE CONTROL UNIT, AND PROJECTION DISPLAY DEVICE, LIQUID CRYSTAL DISPLAY DEVICE AND LASER LIGHT SOURCE PROVIDED WITH SAME

(75) Inventors: Hiroyuki Furuya, Osaka (JP); Koichi Kusukame, Osaka (JP); Tetsuro Mizushima, Hyogo (JP); Toshifumi Yokoyama, Toyama (JP); Kenji Nakayama, Osaka (JP); Kazuhisa Yamamoto, Osaka (JP); Shinichi Kadowaki, Kumamoto (JP); Tomoya Sugita, Nara (JP); Nobuyuki Horikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 332 days.

(21) Appl. No.: 13/001,944

(22) PCT Filed: Jul. 8, 2009

(86) PCT No.: PCT/JP2009/003194
§ 371 (c)(1),
(2), (4) Date: Feb. 15, 2011

(87) PCT Pub. No.: WO2010/004749
PCT Pub. Date: Jan. 14, 2010

(65) Prior Publication Data
US 2011/0147566 A1 Jun. 23, 2011

(30) Foreign Application Priority Data

Jul. 9, 2008 (JP) ................................. 2008-178811
Nov. 13, 2008 (JP) ................................. 2008-290532

(51) Int. Cl.
*G01J 1/32* (2006.01)
(52) U.S. Cl.
USPC .......................................... 250/205; 250/238

(58) Field of Classification Search .................. 250/205, 250/238, 239, 225, 208.1, 216; 359/326–332; 372/96, 20–32
See application file for complete search history.

(56) References Cited

U.S. PATENT DOCUMENTS 6,130,901 A 10/2000 Takamine et al.
7,411,992 B2 * 8/2008 Furukawa et al. .............. 372/96

FOREIGN PATENT DOCUMENTS

| JP | 5-188421 | 7/1993 |
| JP | 2000-305120 | 11/2000 |
| JP | 2002-164616 | 6/2002 |

(Continued)

OTHER PUBLICATIONS

International Search Report issued Aug. 4, 2009 in International (PCT) Application No. PCT/JP2009/003194.

*Primary Examiner* — Que T Le
(74) *Attorney, Agent, or Firm* — Wenderoth, Lind & Ponace, L.L.P.

(57) ABSTRACT

A wavelength conversion laser light source includes: a fundamental light source for outputting fundamental light; a wavelength conversion element with a nonlinear optical effect for converting the fundamental light into harmonic light of a different wavelength; a first optical receiver for receiving light of a specific polarization direction contained in the fundamental light output from the fundamental light source and converting an amount of light thereof into an electrical signal; a second optical receiver for receiving the harmonic light output from the wavelength conversion element and converting an amount of light thereof into an electrical signal; a temperature holding unit for holding a temperature of the wavelength conversion element constant; a fundamental light control unit for performing first control of controlling an amount of light of the fundamental light output from the fundamental light source based on the electrical signal from the second optical receiver, and second control of controlling an amount of light of the fundamental light based on the electrical signal from the first optical receiver; and a temperature control unit for performing third control of controlling a holding temperature of the temperature holding unit based on the electrical signal from the second optical receiver.

23 Claims, 30 Drawing Sheets

FOREIGN PATENT DOCUMENTS

| | | |
|---|---|---|
| JP | 2003-290963 | 10/2003 |
| JP | 2004-157217 | 6/2004 |
| JP | 2004-348052 | 12/2004 |
| JP | 2007-233039 | 9/2007 |

* cited by examiner

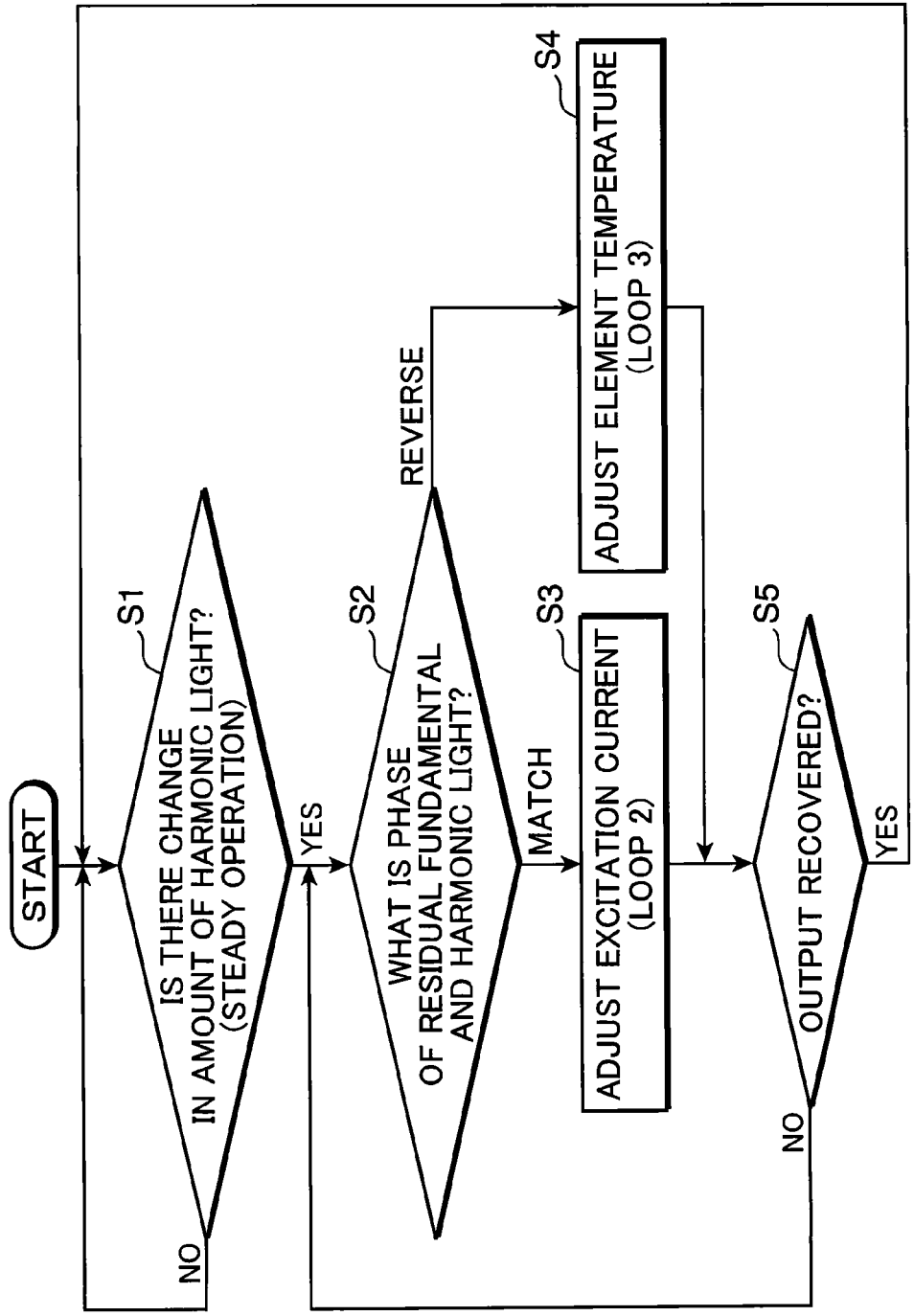

FIG. 31A
FIG. 31B
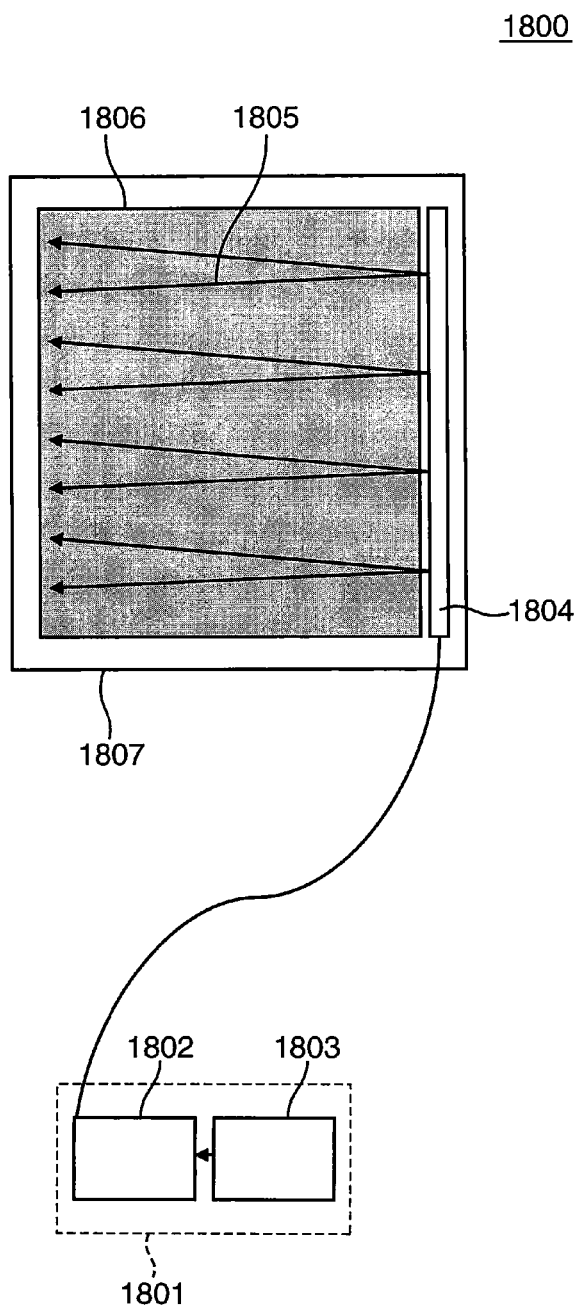
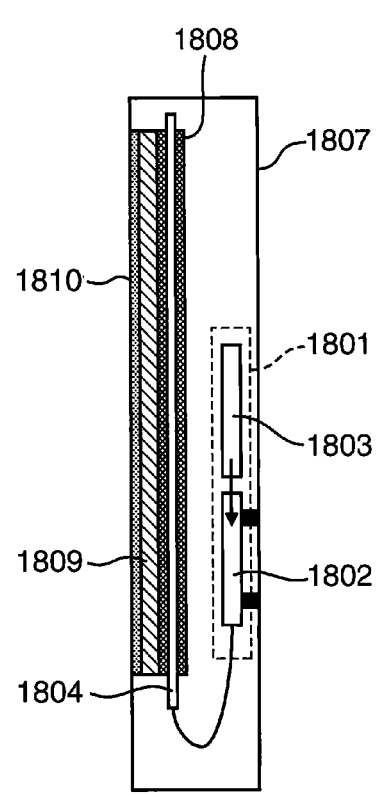

WAVELENGTH CONVERSION LASER LIGHT SOURCE HAVING DUAL OPTICAL RECEIVER AND A TEMPERATURE CONTROL UNIT, AND PROJECTION DISPLAY DEVICE, LIQUID CRYSTAL DISPLAY DEVICE AND LASER LIGHT SOURCE PROVIDED WITH SAME

TECHNICAL FIELD

The present invention relates to a wavelength conversion laser light source which performs wavelength conversion to a laser beam emitted from a laser light source by using a nonlinear optical effect, and also relates to a projection display device, a liquid crystal display device and a laser light source provided with the same.

BACKGROUND ART

Conventionally, numerous wavelength conversion laser light sources for obtaining a visible laser beam of green light or the like by performing wavelength conversion to light that is emitted from a Nd:YAG laser or Nd:YVO$_4$ laser by using the nonlinear optical effect, or obtaining an ultraviolet laser beam by further converting the green light have been developed and put into practical application. The foregoing converted light is used for laser processing, laser display and other purposes.

FIG. 1 shows a standard configuration example of a conventional wavelength conversion laser light source using the nonlinear optical effect. In order to obtain the nonlinear optical effect, it is necessary to use a nonlinear optical crystal with birefringence. Specifically, as nonlinear optical crystals with birefringence, LiB$_3$O$_5$ (lithium triborate: LBO), KTiOPO$_4$ (potassium titanyl phosphate: KTP), CsLiB$_6$O$_{10}$ (cesium lithium borate: CLBO), LiNbO$_3$ (lithium niobate: PPLN) formed with a periodically poled structure, LiTaO$_3$ (lithium tantalate: PPLT), and the like have been used.

As shown in FIG. 1, a wavelength conversion laser light source 100 includes a fundamental light source 101, a condensing lens 108, a wavelength conversion element (nonlinear optical crystal) 109, a re-collimating lens 111, a wavelength separating mirror 113, a temperature holding device 116 such as a heater for maintaining the temperature of the wavelength conversion element 109 constant, a control device 115 for controlling the laser output, and a temperature controller 122 for controlling the temperature of the nonlinear optical crystal disposed in the control device 115. As the fundamental light source 101, Nd:YAG laser or Nd:YVO$_4$ laser with a wavelength of 1.06 μm, or a fiber laser using Yb-doped fiber is often used.

Here, the actual operation is explained upon taking the second harmonic generation for generating a laser beam with a half wavelength of 0.532 μm from the laser beam with a wavelength of 1.06 μm as an example.

The laser beam with a wavelength of 1.06 μm emitted from the fundamental light source 101 is condensed on the nonlinear optical crystal 109 by the condensing lens 108. Here, the refractive index of the nonlinear optical crystal 109 relative to the wavelength of 1.06 μm needs to match the refractive index relative to the light with a wavelength of 0.532 μm to be generated. This is referred to as phase matching. Generally speaking, since the refractive index of a crystal changes with the crystal's temperature conditions, it is necessary to keep the crystal temperature constant. Thus, the nonlinear optical crystal itself is disposed in the temperature holding device 116 and the temperature is held according to the type of crystal.

For example, if the phase matching method referred to as type-1 noncritical phase matching is adopted using an LBO crystal, the crystal needs to be held at a temperature of 148° C. to 150° C.

Moreover, when using the LiNbO$_3$ crystal with a periodically poled structure, the temperature and wavelength to be subject to phase matching can be arbitrarily decided by designing the period of the periodically poled structure. However, in order to continue maintaining the phase matching conditions, the element temperature and the fundamental wavelength must be kept constant (refer to Patent Document 1 and Patent Document 2).

FIG. 2 schematically shows the control loop of monitoring the green light as the wavelength converted light, and controlling the output to be constant.

The control loop 250 shown in FIG. 2 controls the fundamental light output 260 from the fundamental light source 101 by controlling the inrush current 240 to the fundamental light source 101. The fundamental light output 260 enters the wavelength conversion element 109 configured from a nonlinear optical crystal with a constant temperature based on the control of the element temperature control unit 280. After being subject to wavelength conversion in the wavelength conversion element 109, green light 270 is output from the wavelength conversion element 109. In order to make the output of the green light 270 constant, the method of controlling the current 240 to be incident into the fundamental light source 101 based on the control loop 250 in accordance with the light intensity of the green light 270 has been used as APC (Auto Power Control).

Meanwhile, when performing wavelength conversion using the nonlinear optical effect, it is necessary to satisfy the phase matching conditions. Thus, the polarization direction of the fundamental light that is emitted from the fundamental light source 101 and the wavelength of the fundamental light that is emitted from the fundamental light source 101 are also important factors of wavelength conversion.

Patent Document 3 shows a method of reducing noise of the output upon performing relaxation oscillation by monitoring the respective outputs of the fundamental light and the second harmonic light.

Meanwhile, Patent Document 4 proposes a method of acquiring the respective polarization elements of the fundamental light and feeding back the same to the driving of the phase difference adjustment means provided in the resonator in a wavelength conversion laser light source using a wavelength conversion element which performs type-II phase matching.

Nevertheless, with the method of Patent Document 4, it is difficult to stabilize the output since the phase matching state of the wavelength conversion element will jointly fluctuate.

With a conventional control loop, in addition to the problem that it cannot be used in the state of relaxation oscillation as indicated from the past, there is also a problem in that it is unable to deal with changes in polarization or changes in wavelength even in a steady state.

As described above, it has been discovered that stable and efficient wavelength conversion cannot be achieved due to changes in the phase matching state of the wavelength conversion element caused by the state of the fundamental light.

CITATION LIST

Patent Literature

Patent Document 1: Japanese Patent Application Publication No. 2004-157217
Patent Document 2: Japanese Patent Application Publication No. 2000-305120
Patent Document 3: Japanese Patent Application Publication No. 2004-348052
Patent Document 4: Japanese Patent Application Publication No. H5-188421

SUMMARY OF THE INVENTION

An object of this invention is to provide a wavelength conversion laser light source capable of performing stable and efficient wavelength conversion, as well as a projection display device, a liquid crystal display device and a laser light source provided with the same.

In order to achieve the foregoing object, the wavelength conversion laser light source according to one aspect of the present invention includes: a fundamental light source for outputting fundamental light; a wavelength conversion element with a nonlinear optical effect for converting the fundamental light into harmonic light of a different wavelength; a first optical receiver for receiving light of a specific polarization direction contained in the fundamental light output from the fundamental light source and converting an amount of light thereof into an electrical signal; a second optical receiver for receiving the harmonic light output from the wavelength conversion element and converting an amount of light thereof into an electrical signal; a temperature holding unit for holding a temperature of the wavelength conversion element constant; a fundamental light control unit for performing first control of controlling an amount of light of the fundamental light output from the fundamental light source based on the electrical signal from the second optical receiver, and second control of controlling an amount of light of the fundamental light based on the electrical signal from the first optical receiver; and a temperature control unit for performing third control of controlling a holding temperature of the temperature holding unit based on the electrical signal from the second optical receiver.

As a result of intense study by the present inventors, it has been discovered for the first time that changes in the polarization component of fundamental light considerably affects the output variation of harmonic light. Thus, this wavelength conversion laser light source is configured to receive light of a specific polarization direction contained in the fundamental light output from the fundamental light source with a first optical receiver and converting the light quantity thereof into an electrical signal, and controlling the amount or wavelength of the fundamental light output from the fundamental light source with the fundamental light control unit based on the foregoing electrical signal. Since it is thereby possible to appropriately adjust the fundamental light according to changes in the polarization component of the fundamental light, a wavelength conversion laser light source capable of performing stable and efficient wavelength conversion can be realized.

Other objects, features and superior aspects of the present invention shall become apparent from the ensuing explanation. In addition, advantages of the present invention shall become evident from the ensuing explanation with reference to the attached drawings.

BRIEF DESCRIPTION OF THE DRAWINGS

FIG. 15A is a flowchart showing the harmonic emission control process according to according to another embodiment of the present invention.

FIG. 31A and FIG. 31B are explanatory diagrams showing the schematic configuration of the liquid crystal display applying the wavelength conversion laser light source according to an embodiment of the present invention.

BEST MODE FOR CARRYING OUT THE INVENTION

First Embodiment

Figure 1:
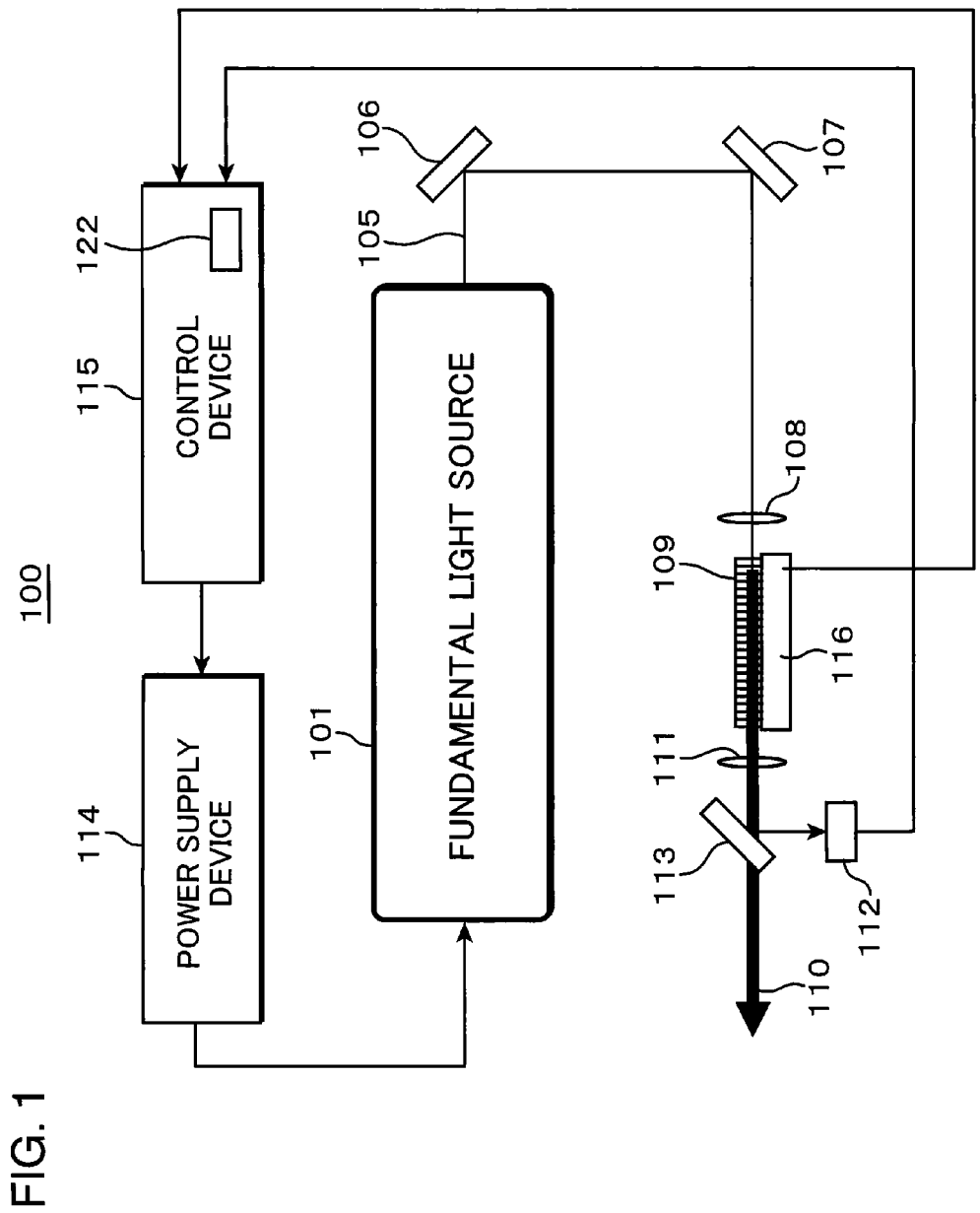
FIG. 1 is a schematic diagram showing the schematic configuration of a conventional wavelength conversion laser light source.
Figure 2:
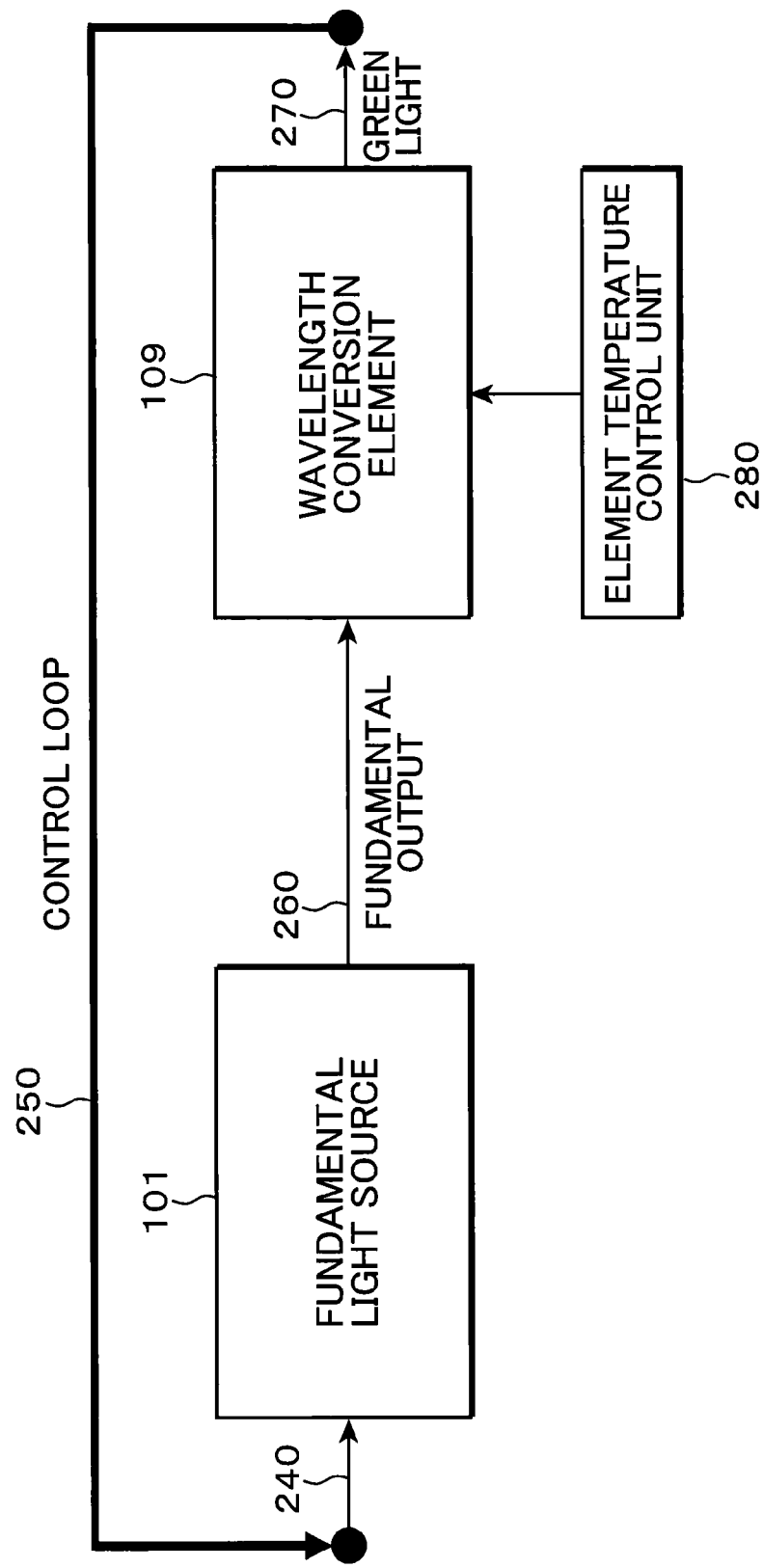
FIG. 2 is an explanatory diagram showing the control loop in a conventional wavelength conversion laser light source.
Figure 3:
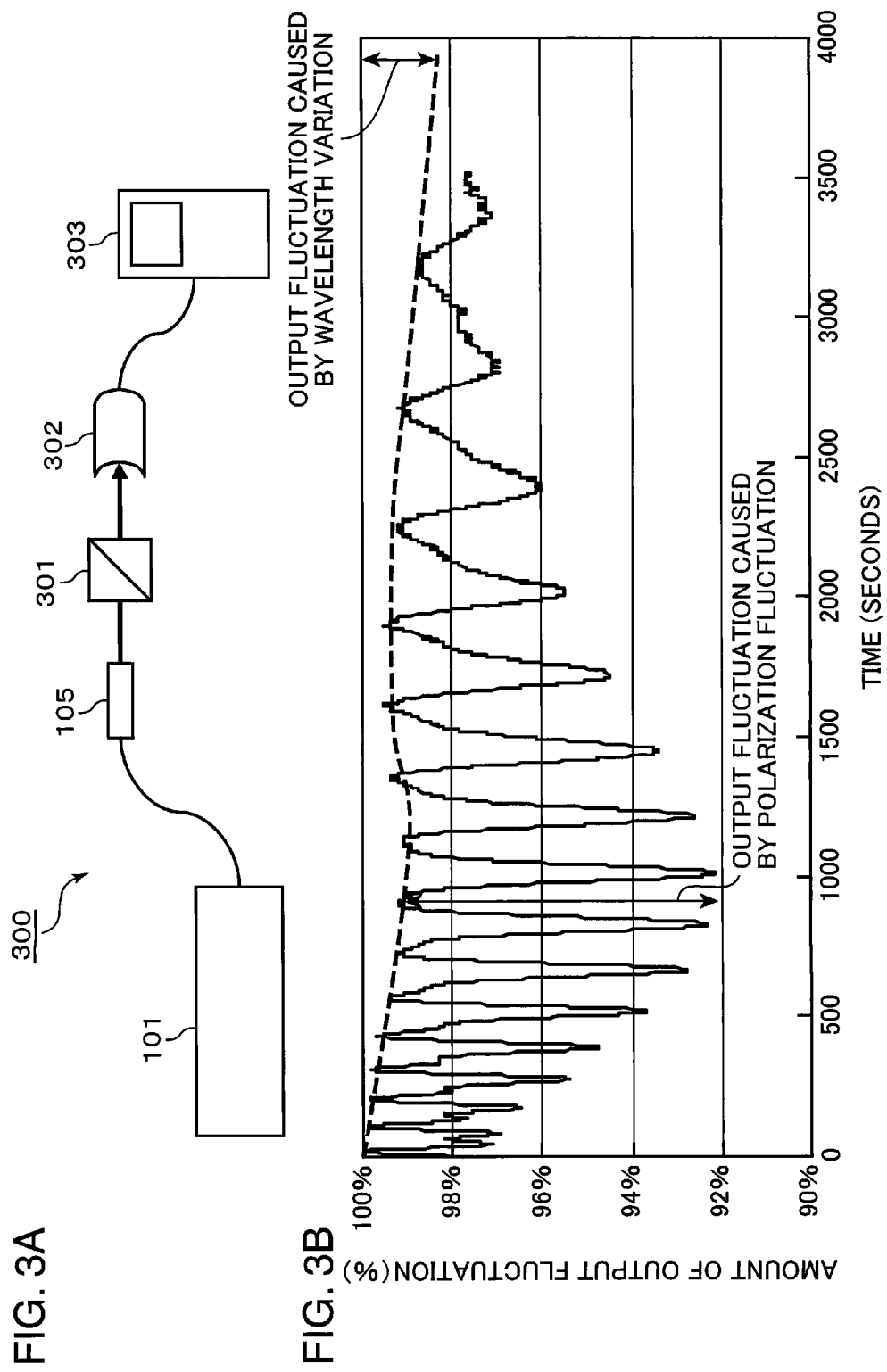
FIG. 3A shows the schematic configuration of the measuring device for measuring the variation of fundamental light in the polarization direction.
FIG. 3B shows the variation of the fundamental light in the polarization direction that was measured with the measuring device depicted in FIG. 3A.

An embodiment of the present invention is now explained with reference to FIG. 3 to FIG. 13.

As a result of intense study by the present inventors, it has been discovered for the first time that changes in the polarization component of fundamental light considerably affects the output variation of harmonic light. Moreover, even in cases of using a wavelength conversion element adopting type-I phase matching or quasi phase matching, it has been discovered for the first time that changes in the polarization component of fundamental light considerably affects the harmonic output variation.

In connection with the foregoing problem, if a fundamental light source in which the emission wavelength or polarization direction may change, it has been discovered for the first time that it is necessary to provide a considerably margin (control margin) of the inrush current.

FIG. 3A shows the schematic configuration of the measuring device 300 for measuring the variation of fundamental light in the polarization direction. FIG. 3B shows the variation of the fundamental light in the polarization direction output from the fundamental light source 101 that was measured with the measuring device 300 depicted in FIG. 3A. The measuring device 300 includes, as shown in FIG. 3A, a fundamental light source 101, a polarization prism 301, and a power meter 303 comprising a light receiving part 302. The fundamental light 105 output from the fundamental light source 101 enters the polarization prism 301 and becomes linear polarized light. Subsequently, only predetermined polarization components in the foregoing linear polarized light enter the light receiving part 302 of the power meter 303. The power meter 303 measures the amount of output fluctuation based on the amount of received light that entered the light receiving part 302. The graph of FIG. 3B is plotting the amount of output fluctuation; that is, variation of the polarization direction in relation to the measured time.

Based on the graph of FIG. 3B, as shown with the broken line in FIG. 3B, it is evident that the output is approximately constant when the fundamental light 205 does not pass through the polarization prism 301, but the output decreases up to roughly 8%; that is, the polarization direction changes when the fundamental light 205 passes through the polarization prism 301.

This embodiment realizes the control (control A) capable of dealing with factors, even if the control margin is small, such as changes in the polarization direction and changes of the wavelength which were difficult to adjust with the conventional control methods.

Figure 4:
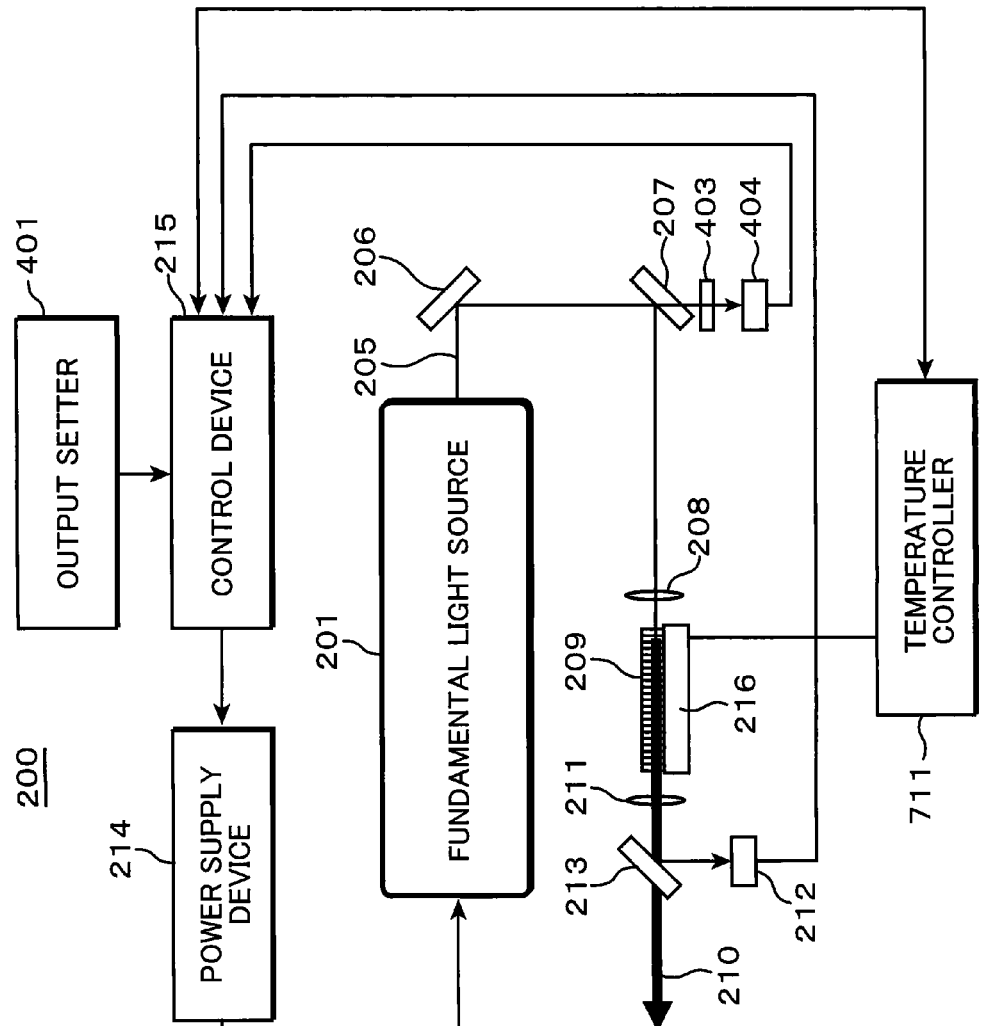
FIG. 4 is a schematic diagram showing the schematic configuration of the wavelength conversion light source applying the harmonic emission control method according to an embodiment of the present invention.

FIG. 4 is a schematic diagram showing the schematic configuration of the wavelength conversion light source 200 according to an embodiment of the present invention. The wavelength conversion laser light source 200 is a configuration example for realizing the foregoing control A.

The wavelength conversion laser light source 200 comprises, as shown in FIG. 4, a fundamental light source (light source) 201, a dichroic mirror 206, a beam splitter 207, a polarization filter 403, an optical receiver (photodiode) 404, a condensing lens 208, a wavelength conversion element (including a nonlinear optical crystal) 209, a re-collimating lens 211, a beam splitter 213, an optical receiver (photodiode) 212, and the like.

With a part of the fundamental light 205 emitted from the fundamental light source (light source) 201, 1% of the light quantity is transmitted with the beam splitter 207, and the remaining 99% is reflected. The fundamental light 205 that was reflected with the beam splitter 207 is input to the wavelength conversion element 209. Subsequently, the fundamental light 205 is subject to wavelength conversion by the wavelength conversion element 209, and converted into green light as a second harmonic.

As the fundamental light source 201, a fiber light source using the Yb-doped fiber is used. The fiber laser light source is advantageous in that the emission wavelength and the spectrum width can be arbitrarily decided. Accordingly, the conversion efficiency from a fundamental light to a harmonic light can be considerably improved by narrowing the band of the spectrum width.

The fundamental light 205 generated with the fundamental light source 201 is condensed on the wavelength conversion element 209 including a nonlinear optical crystal by the condensing lens 208. In this embodiment, a Mg:LiNbO₃ crystal element (MgLN element) formed with a periodically poled structure is used as the nonlinear optical crystal.

This embodiment is configured to monitor the fundamental light that was transmitted through the beam splitter 207 and which passed through the polarization filter 403, and perform feedback control thereto.

The polarization filter 403 only allows the transmission of the polarization components that contribute to the wavelength conversion of the fundamental light 205 that was transmitted through the beam splitter 207. Light of the foregoing polarization components that were transmitted through the polarization filter 403 is monitored with the optical receiver (photodiode) 404.

The optical receiver 404 is able to monitor the polarization fluctuation as a change in intensity simultaneously with the change in intensity of the fundamental light 205, and convert this into an electrical signal. The electrical signal is fed back to the control device 215 as intensity information of the fundamental light 205. In this embodiment, feedback control is performed based on the foregoing feedback information so that the intensity of a predetermined polarization component becomes constant as with the loop 2 of FIG. 5 described later (APC:Auto Power Control).

Moreover, the wavelength conversion laser light source 200 is disposed at the lower surface of the wavelength conversion element 209, and comprises a temperature holding unit 216 for maintaining the wavelength conversion element 209 at a constant temperature. A Peltier element is used as the temperature holding unit 216.

The second harmonic 210 (green light) that was generated with the wavelength conversion in the wavelength conversion element 209 becomes a parallel light flux with the re-collimating lens 211, and a part thereof is thereafter received by the optical receiver 212 via the beam splitter 213. The optical receiver 212 monitors the intensity of the second harmonic 210 generated with the wavelength conversion element 209, converts this into an electrical signal (intensity information of green light), and output the same.

Figure 5:
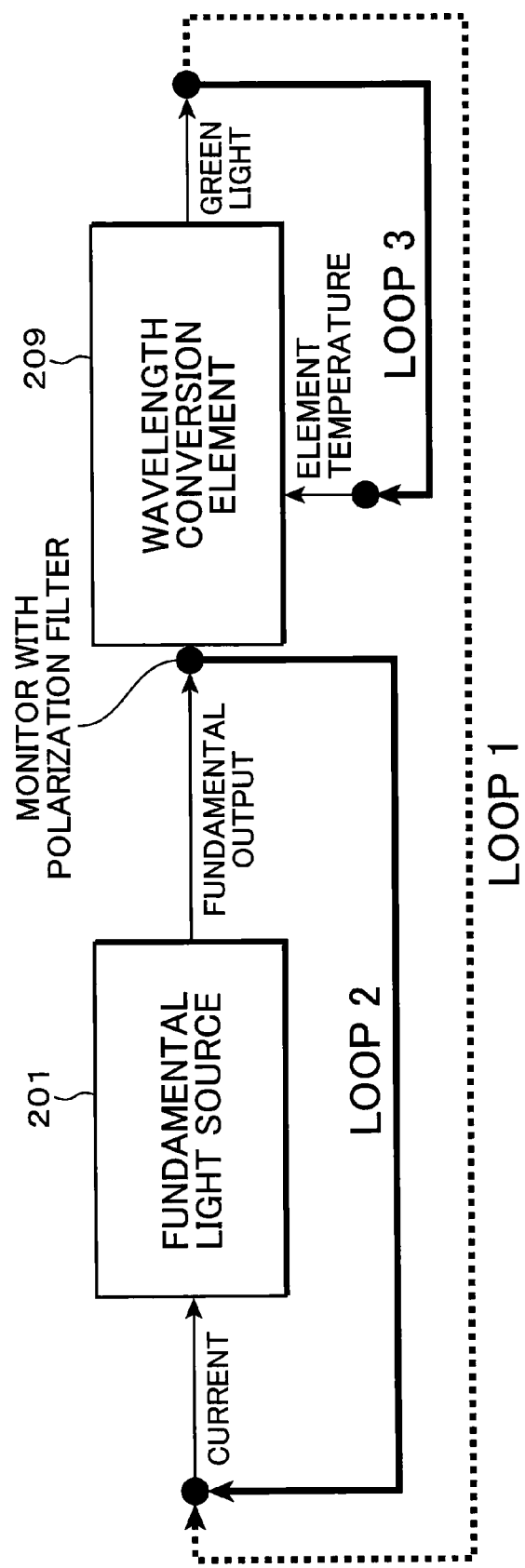
FIG. 5 is an explanatory diagram showing the control loop applying the harmonic emission control method according to an embodiment of the present invention.

The temperature of the temperature holding unit 216 for holding the temperature of the wavelength conversion element 209 is controlled based on the intensity information of the second harmonic 210 that is monitored with the optical receiver 212 (loop 3 of FIG. 5). Consequently, if the intensity of the second harmonic 210 fluctuates due to changes in the wavelength of the fundamental light, the temperature of the wavelength conversion element 209 can be changed in accordance with such changes in the wavelength of the fundamental light.

In other words, if the output of the second harmonic 210 fluctuates even though the fundamental light input in the polarization direction which is contributing to the wavelength conversion is being controlled to be constant (loop 2 of FIG. 5), it could be said that the factor of such output fluctuation is in the wavelength of the fundamental light. Thus, with the control A, in the foregoing case, the temperature of the wavelength conversion element 209 is changed (loop 3 of FIG. 5) to deal with changes in the wavelength of the fundamental light.

Nevertheless, with the feedback control only based on the foregoing two loops (loop 2 and loop 3), control can only be performed with a parameter with a large time constant of temperature in response to the output fluctuation of the second harmonic 210. Thus, it is difficult to keep the output of the second harmonic 210 constant.

Thus, with the control A, the control of the loop 1 is performed in a state of stopping the control of the loop 2 and loop 3 of FIG. 5. With the loop 1, the current for driving the fundamental light is controlled based on the electrical signal showing the intensity information of the second harmonic 210. As a result of inserting the feedback control of the loop 1, the output of the second harmonic 210 can be kept constant even in cases where a parameter with a large time constant is to be controlled. In other words, as a result of performing a plurality of loops based on time sharing as with the control A, the output fluctuation of the second harmonic 210 can be reduced.

Figure 6:
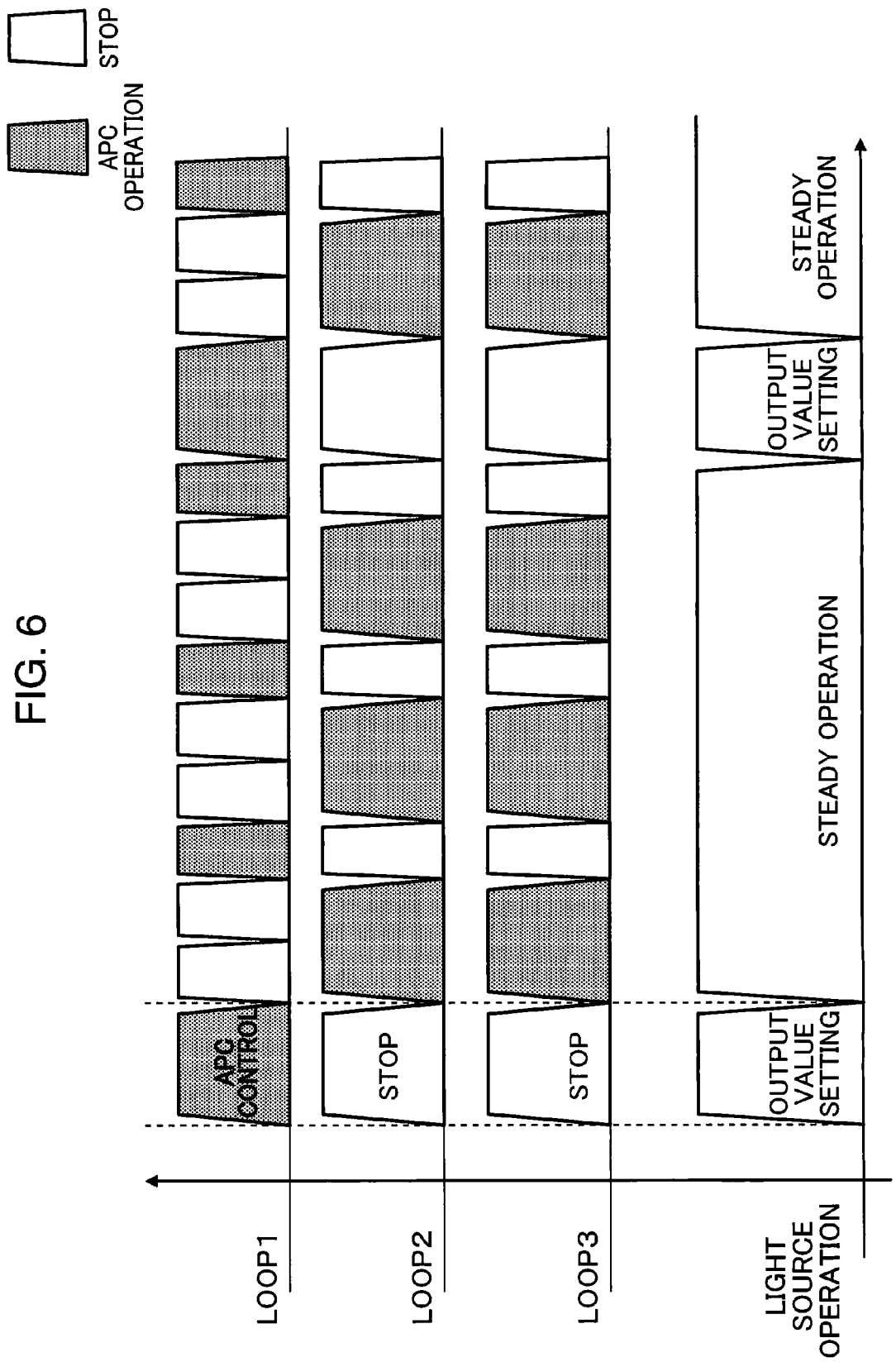
FIG. 6 is a timing chart showing the timing of switching the control target in the control loop applying the harmonic emission control method according to an embodiment of the present invention.

FIG. 6 is a timing chart showing an example of the timing for switching the control target. This timing chart shows whether the respective loops are being performed or stopped in accordance with the operational state of the wavelength conversion laser light source 200.

Foremost, upon setting the light output (output of the second harmonic 210) from the wavelength conversion laser light source 200, the APC control (loop 1) of feeding back the light output value to the current value to be input to the fundamental light source 201 is performed, and time sharing control is started at the point in time that the light output is determined.

With the control A, the control (loop 2) of causing the output of the fundamental light 205 to be constant and the control (loop 3) of optimizing the temperature of the wavelength conversion element 209 are performed at the same timing. This is because, with respect to the two loops of foregoing loop 2 and loop 3, there are no problems such as a runaway even if they are performed simultaneously. Nevertheless, the feedback control of this embodiment is not limited thereto. In other words, so as long as the performance timing of the loop 1 and the performance timing of the loop 2 and the loop 3 are made to be different, the two loops of loop 2 and loop 3 do not necessarily have to be performed simultaneously, and these may be started and ended at a different timing.

In the loop 3, the temperature adjustment of the wavelength conversion element 209 is performed. Thus, the performance time of the loop 3 is preferably around 10 seconds to 1 minute. Here, after the loop 2 and the loop 3 are performed for a given period of time, the control of the loop 2 and the loop 3 is once ended. Meanwhile, the performance time of the loop 1 is roughly 0.1 seconds to 10 seconds, and it is possible to sufficiently follow the preceding loops.

After releasing the loop 2 and the loop 3, the loop 1 of performing feedback to the current value that is input to the fundamental light source is performed once again based on the harmonic light output. As a result of sharing the time of performing the loop 1 and the time of performing the loop 2 and the loop 3 as described above, the temperature of the wavelength conversion element 209 can always be kept at an optical value in relation to environmental changes such as changes in the ambient temperature or the wavelength variation of the fundamental light. Thus, it is possible to reduce the output margin of the fundamental light that is required when the temperature of the wavelength conversion element 209 is not changed and made constant; that is, it is possible to reduce the margin of the current value that is input to the fundamental light source, and the effect of being able to downsize and lower the power consumption of the device can be achieved with a simple control.

In cases where the harmonic light output is modulated into a rectangular wave and output or upon handling the harmonic light output that was subject to pulse oscillation, this control can be applied by using a value in which the harmonic light output was time-averaged in the feedback control.

Figure 7:
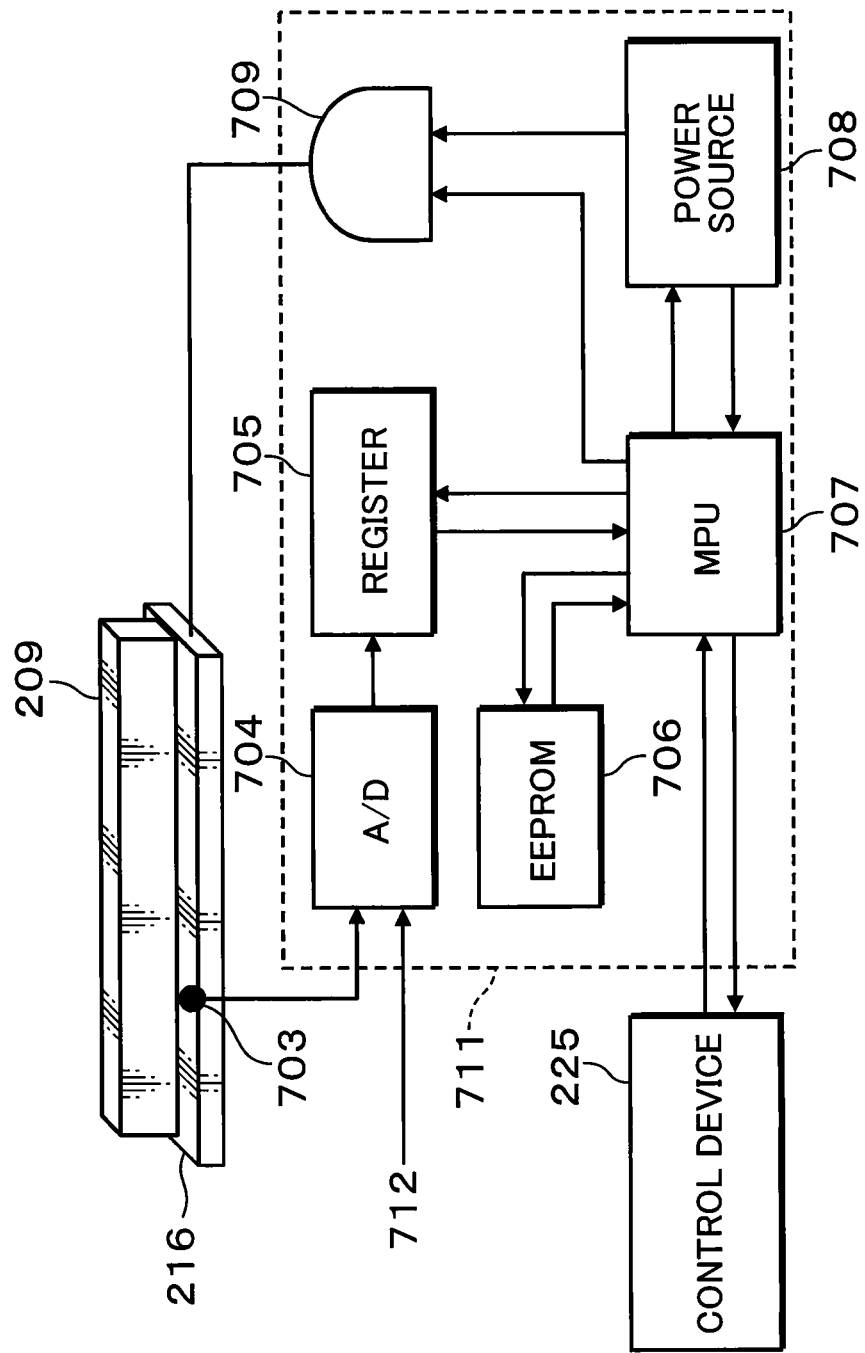
FIG. 7 is a schematic diagram showing the schematic configuration of the control system for performing temperature adjustment of the wavelength conversion element according to an embodiment of the present invention.

The temperature setting method of the wavelength conversion element 209 is now explained. FIG. 7 is a schematic diagram showing the control system for performing temperature adjustment of the wavelength conversion element 209 that is used in the loop 3.

The wavelength conversion element 209 is retained on the temperature holding unit 216, and indirectly monitors the temperature of the wavelength conversion element 209 by monitoring the temperature of the temperature holding unit 216 with the thermistor 703. The temperature signal from the thermistor 703 and the light intensity signal 712 of the wavelength converted light are converted into digital values with the A/D converter 704 and stored in the register 705. The element temperature table in relation to the harmonic output is stored in the EEPROM 706 together with the value of the current that is incident into the fundamental light source 201 that is required in advance. The control device 215 transfers the data of the setting value of the harmonic light output to the MPU 707.

The temperature controller 711 includes, as shown in FIG. 7, a power source 708, a thermistor 703, an A/D converter 704 for converting the temperature signal from the thermistor 703 into a digital value, a register 705 for storing the temperature signal that was converted into a digital signal with the A/D converter 704, an EEPROM 706 for storing a conversion table of the output-temperature setting value, an inrush current table that is required in advance and the like, an MPU 707 to which data of the harmonic output setting value is transferred from the control device 215, and a switch 709 for performing PWM (Pulse Width Modulation) control to the current waveform that is supplied from the power source 708 to the temperature holding unit 216.

In this embodiment, the wavelength conversion element 209 has a periodically poled structure (Mg:LiNbO$_3$ with a periodically poled structure in this embodiment), and the holding temperature of the wavelength conversion element 209 is 50° C.

FIG. 8A to FIG. 8D show an example of the temperature adjustment method of the wavelength conversion element 209.

The control temperature of the wavelength conversion element 209 is subject to wobbling at $\pm\Delta t$ (° C.) centered around the center temperature Tc (° C.).

Figure 8A:
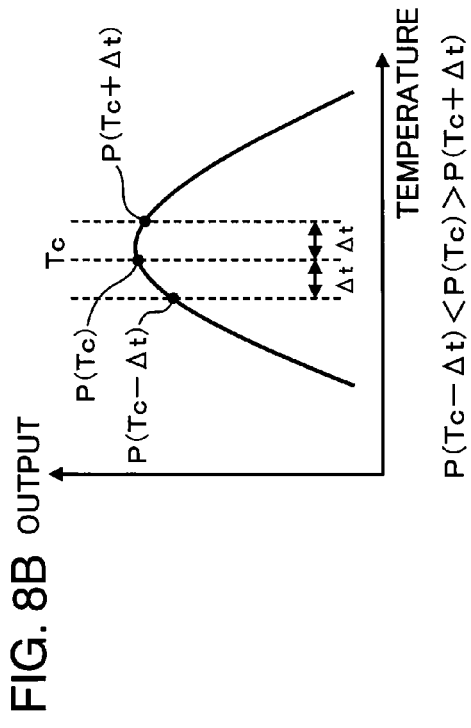
FIG. 8A is a plot diagram explaining the temperature control method of the wavelength conversion element in the harmonic emission control method according to an embodiment of the present invention.
Figure 8B:
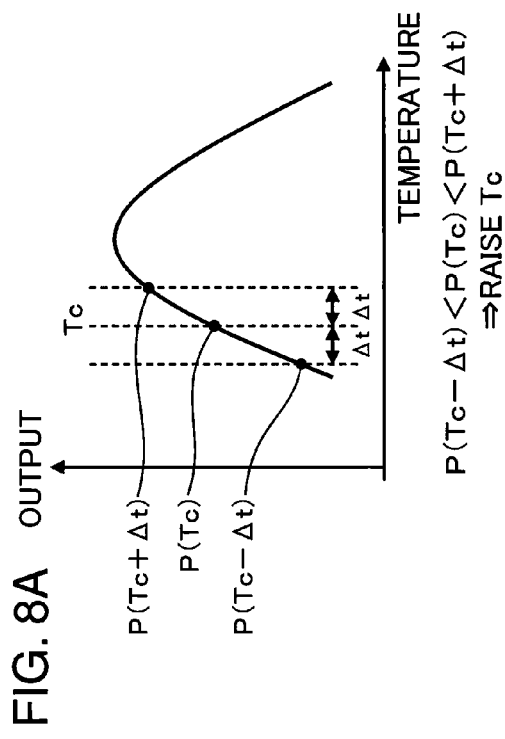
FIG. 8B is a plot diagram explaining the temperature control method of the wavelength conversion element in the harmonic emission control method according to an embodiment of the present invention.
Figure 8C:
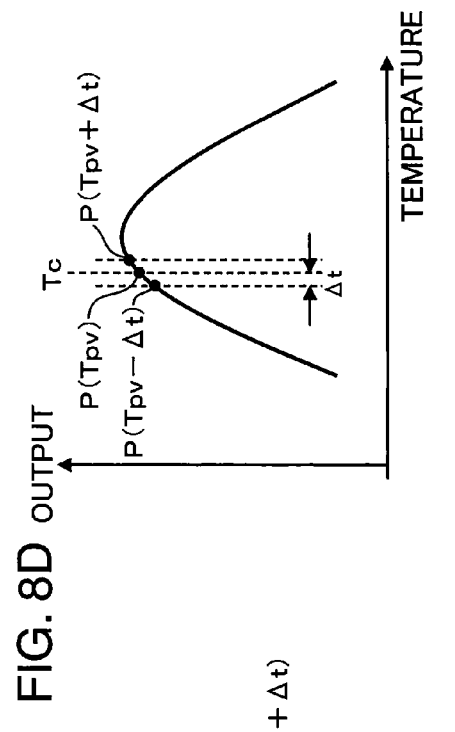
FIG. 8C is a plot diagram explaining the temperature control method of the wavelength conversion element in the harmonic emission control method according to an embodiment of the present invention.

If the harmonic output when the element temperature is Tc+$\Delta t$ (° C.) is set as P (Tc+$\Delta t$), the harmonic output when the element temperature is Tc (° C.) is set as P (Tc), and the harmonic output when the element temperature is Tc–$\Delta t$ (° C.) is set as P (Tc–$\Delta t$), as shown in FIG. 8A, the operation for raising Tc is performed if P (Tc–$\Delta t$)<P (Tc)<P (Tc+$\Delta t$). As shown in FIG. 8B, control is performed to maintain Tc if P (Tc+$\Delta t$)<P (Tc)>P (Tc–$\Delta t$). Meanwhile, as shown in FIG. 8C, the operation for reducing Tc is performed if P (Tc–$\Delta t$)>P (Tc)>P (Tc+$\Delta t$). Note that $\Delta t$ is preferably in a range of 0.1 to 0.2° C. The wobbling period is 5 seconds to 10 seconds. Although this will also depend on the thermal capacity of the wavelength conversion element retaining portion, since the hunting (ripple) of the harmonic output will increase if the $\Delta t$ is greater than 0.2° C. or the wobbling period is not greater than 5 seconds, the search of the point where P (Tc) becomes maximum will become difficult. Meanwhile, if the $\Delta t$ is not greater than 0.1° C., susceptibility of disturbance during the detection of temperature will increase. Thus, as a result of setting the value to be within the foregoing range, an effect of being able to perform the operation of constant output while keeping the output fluctuation low is yielded.

Figure 8D:
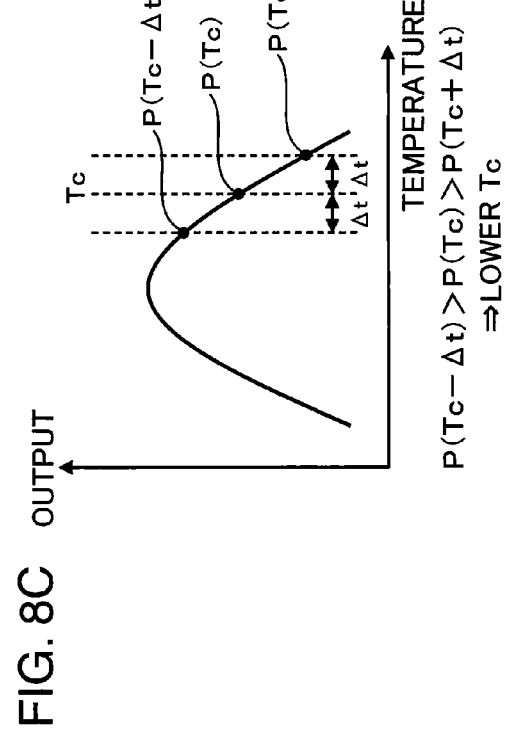
FIG. 8D is a plot diagram explaining the temperature control method of the wavelength conversion element in the harmonic emission control method according to an embodiment of the present invention.

Note that the temperature control method is not limited to the foregoing method. As shown in FIG. 8D, it is also possible to adopt the so-called hill climbing control which is a method of causing the output to wait at a position that is 80% to 90% of the output peak value of the output characteristic curve in relation to the temperature (P(T$_{pv}$) in FIG. 8D), calculating the deviation from the temperature in which the conversion efficiency from fundamental light to the harmonic light becomes maximum based on the amount of output fluctuation from the foregoing position, and thereby correcting the temperature of the wavelength conversion element 209.

Figure 9:
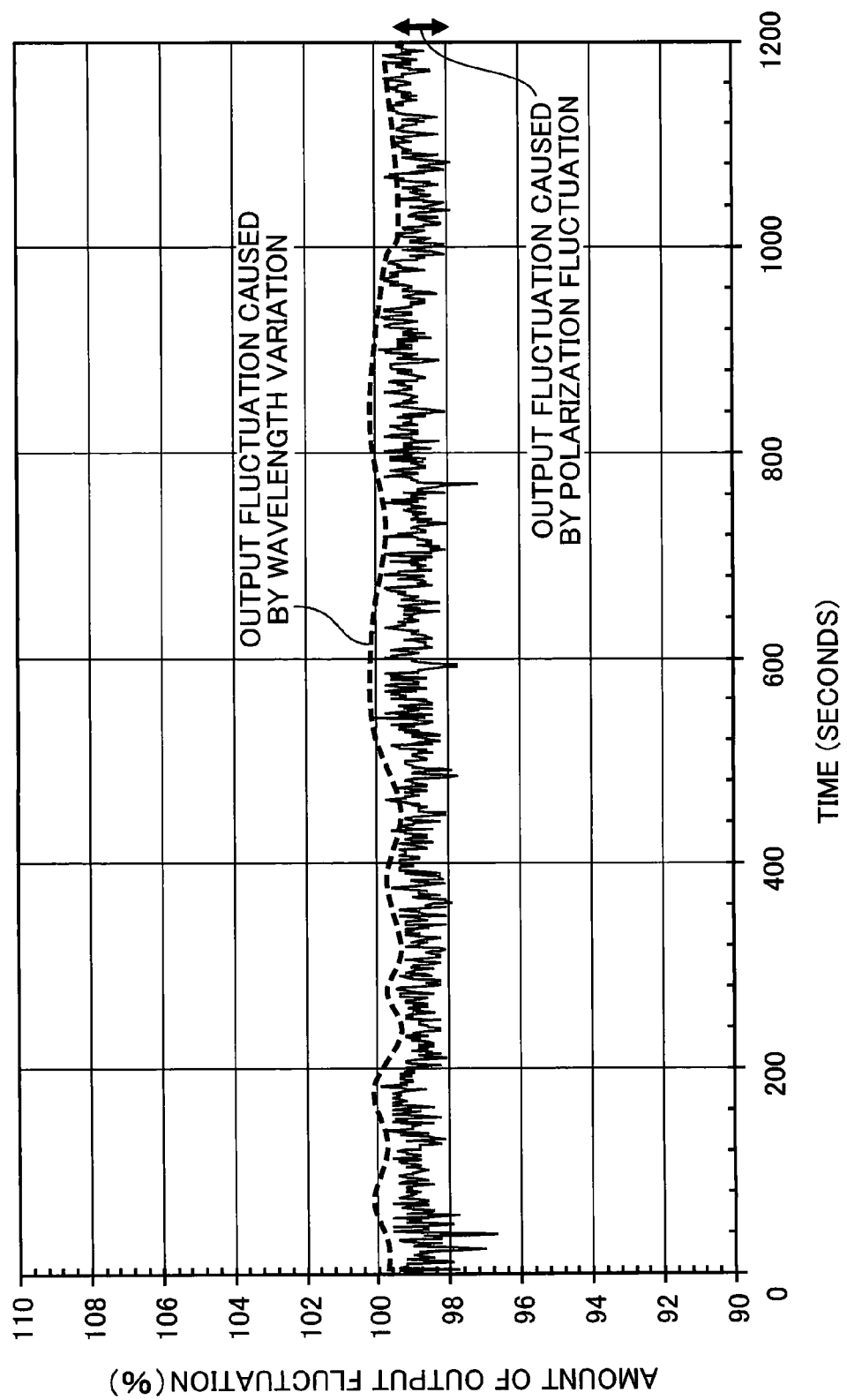
FIG. 9 is a plot diagram showing the output stability in the case of applying the harmonic emission control method according to an embodiment of the present invention.

FIG. 9 is a plot diagram showing the amount of output fluctuation relative to the performance time upon applying the output control method of this embodiment to the wavelength conversion laser light source 200. This is compared with FIG. 3B to verify the effects of this embodiment.

In the case of FIG. 3B, the output reduction of caused by changes in the polarization component of the fundamental is large at 8% or more, and the output reduction caused by the wavelength variation of the fundamental light was also approximately 2% after 3500 seconds from the start of operation. Meanwhile, when applying the output control method of this embodiment, as shown in FIG. 9, the output reduction caused by changes in the polarization component of the fundamental light has been suppressed to only 1% or so, and the output reduction caused by the wavelength variation of the fundamental light is approximately zero.

As described above, the control method according to this embodiment effectively inhibits the output fluctuation caused by changes in the polarization component of the fundamental light and the wavelength variation of the fundamental light. Consequently, it is possible to improve the stability of control and improve the reliability of the wavelength conversion laser light source.

Another feedback control according to this embodiment is now explained with reference to FIG. 10. In this feedback control, control is performed so that the output of the wavelength converted light becomes constant by adjusting the emission wavelength of the fundamental light source 201 (control B).

Figure 10:
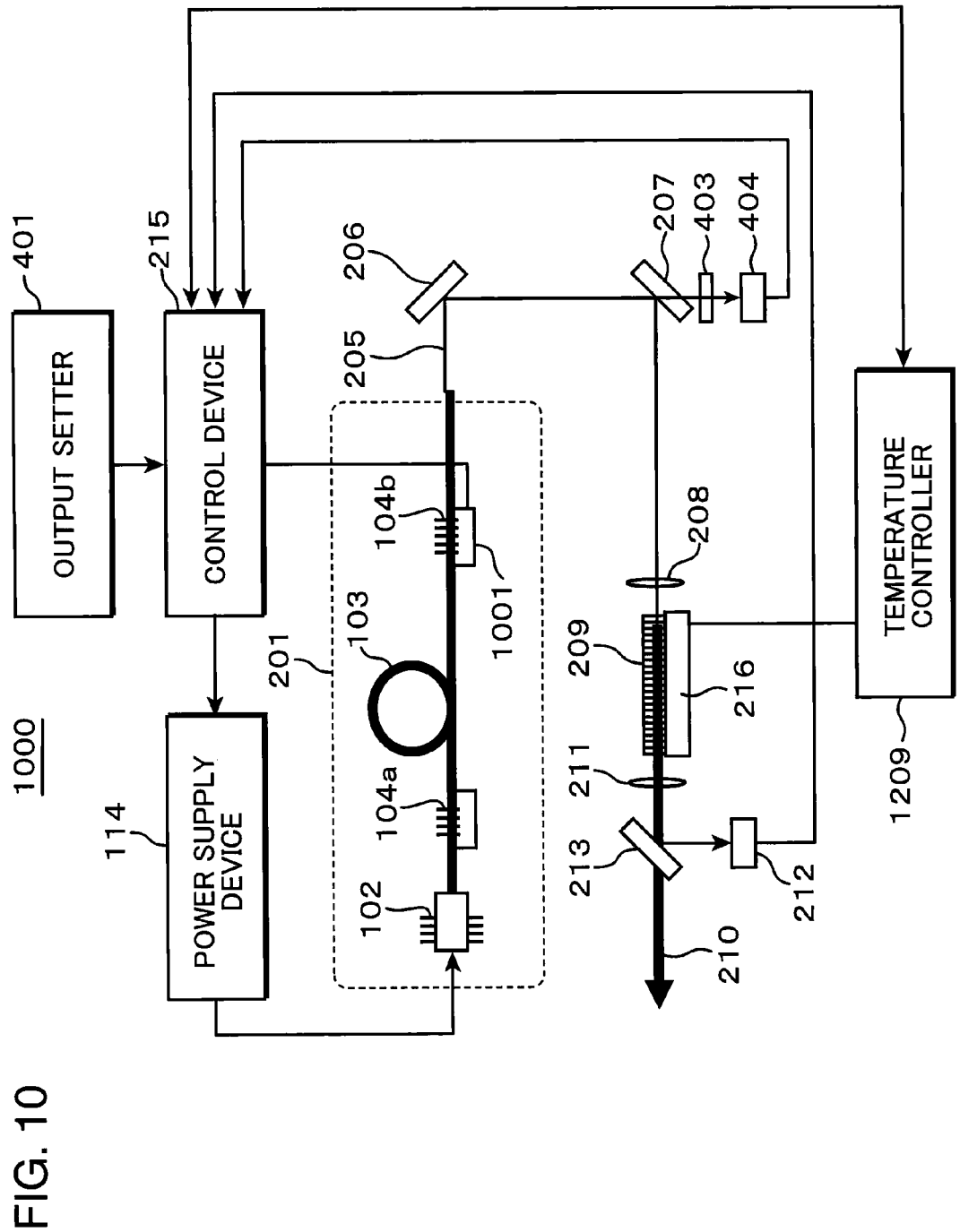
FIG. 10 is an explanatory diagram showing the schematic configuration of the wavelength conversion light source applying another harmonic emission control method according to an embodiment of the present invention.

FIG. 10 is a schematic diagram showing the configuration of the laser light source 1000 that is proposed in the control B.

The fundamental light source 201 comprises, as shown in FIG. 10, a semiconductor laser 102 for emitting excitation light, a double clad rare earth-added fiber 103 for absorbing the excitation light emitted from the semiconductor laser 102 and generating fundamental light, a narrow reflection band fiber grating 104b and a broad reflection band fiber grating 104a disposed on either end of the double clad rare earth-added fiber 103 and which are used for determining the wavelength of the fundamental light emitted from the fundamental light source 201, a residual excitation light processing mechanism (not shown) for absorbing and processing the excitation light that was not absorbed with the double clad rare earth-added fiber 103 among the excitation light emitted from the semiconductor laser 102, a polarized light unification mechanism (not shown) for changing the polarization direction of the fundamental light emitted from the fundamental light source 201 to a linear direction, and an actuator 1001 for applying stress to the narrow reflection band fiber grating, and one end of the narrow reflection band fiber grating 104b is retained by the actuator 1001, and the wavelength of the fundamental light changes based on the stress that is applied by the actuator 1001 to the narrow reflection band fiber grating 104b.

With a part of the fundamental light 205 emitted from the fundamental light source (fiber laser) 201, 1% of the light quantity is transmitted with the beam splitter 207, and the remaining 99% is reflected. The reflected fundamental light 205 is input to the wavelength conversion element 209. Subsequently, the input fundamental light 205 is subject to wavelength conversion by the wavelength conversion element 209, and converted into green light as harmonic light.

The fundamental light 205 is monitored with the light that was transmitted through the beam splitter 207. Here, light in a state where only one polarization component was extracted with the polarization filter 403 is observed with the optical receiver (photodiode) 404. Consequently, the optical receiver 404 is able to monitor the polarization fluctuation as a change in intensity simultaneously with the change in intensity of the fundamental light 205. The fundamental light emitted from the fundamental light source 201 is monitored with the optical receiver 404, and intensity information is fed back to the control device 215.

As the fundamental light source capable of changing the wavelength of the fundamental light, used may be a distributed-feedback semiconductor laser light source including a distributed-feedback mirror part, and the configuration may be such that the wavelength of the fundamental light is changed by changing the current that is incident into the distributed-feedback mirror part.

Moreover, as the fundamental light source capable of changing the wavelength of the fundamental light, used may be a light source comprising a distributed-feedback semiconductor laser light source with a distributed-feedback mirror part for generating light to become the source of the fundamental light, an excitation light source for emitting excitation light, and a laser medium for amplifying the intensity of light emitted by the distributed-feedback semiconductor laser light source by absorbing the excitation light, and the configuration may be such that the wavelength of the fundamental light is changed by changing the current that is incident into the distributed-feedback mirror part.

In the control B also, as with the control A described above, feedback control is performed based on the foregoing feedback information so that the intensity of a predetermined polarization component becomes constant (APC: Auto Power Control, loop 2 (FIG. 11)).

The points that are different from the control A are now explained. In the control A, the temperature of the temperature holding unit 216 that is controlling the temperature of the wavelength conversion element 209 is controlled based on the intensity information of the green light that was monitored with the optical receiver 212. Meanwhile, in the control B, the temperature of the temperature holding unit 216 is kept constant at a predetermined temperature. In the control B, in substitute for adjusting the element temperature, the actuator 1001 fixing the fiber grating 104b is used to adjust the wavelength of fundamental light to the element temperature that is defined with the temperature holding unit 216 (loop 3). In other words, the concept is to perform control so that the fundamental light input in the polarization direction which contributes to the wavelength conversion becomes constant (loop 2 of FIG. 11), change the wavelength of the fundamental light which is the other factor causing the fluctuation of the green light (loop 3 of FIG. 11), and thereby deal with the output fluctuation of the green light.

Figure 11:
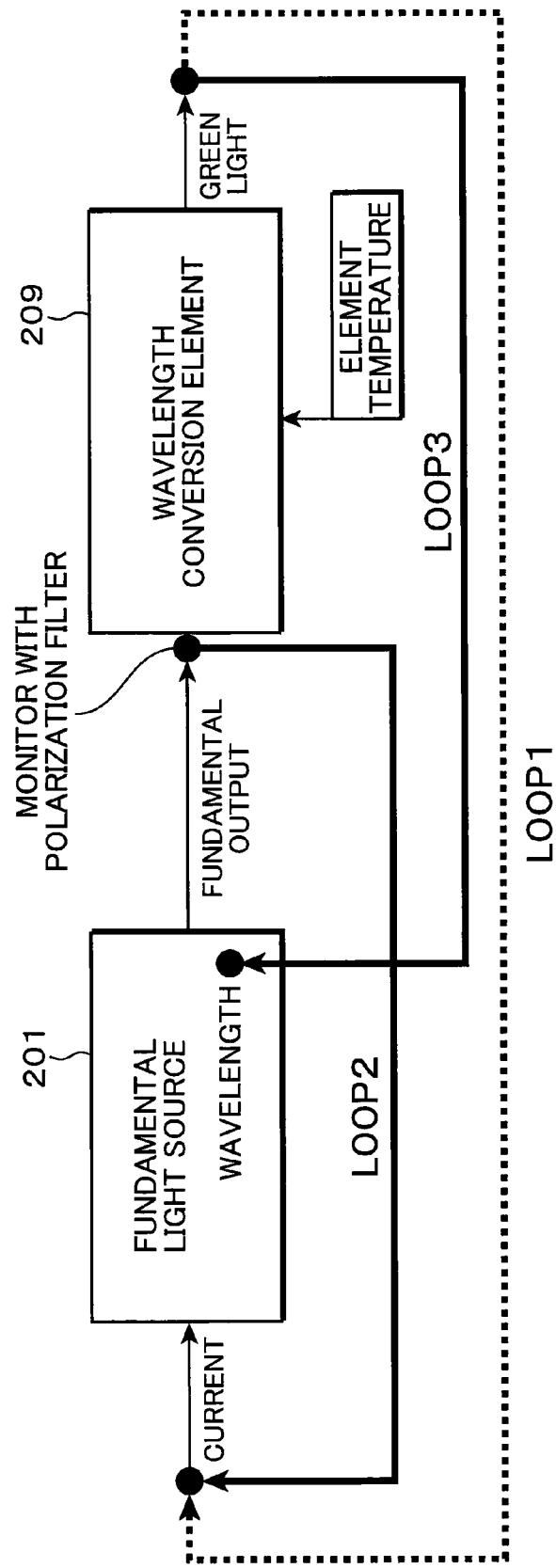
FIG. 11 is an explanatory diagram showing the control loop in another harmonic emission control method according to an embodiment of the present invention.

Nevertheless, with the foregoing two-loop configuration, it is not possible to determine the amount of current to be incident into the fundamental light source 201 with the amount of green light as the reference. Thus, problems will arise upon setting the intended green light output. Thus, with the control B, as a result of inserting the control (loop 1 of FIG. 11) of performing feedback to the current for driving the fundamental light based on the intensity signal of the green light in a state where the control of the loop 2 and the loop 3 of FIG. 11 is stopped, the green light output can be made constant even in cases of setting the green light output. That is, as a result of performing a plurality of loops based on time sharing, the green light fluctuation can be reduced.

Note that, as with the control A, in cases where the harmonic light output is modulated into a rectangular wave and output or upon handling the harmonic light output that was subject to pulse oscillation, this control can be applied by using a value in which the harmonic light output was time-averaged in the feedback control.

Figure 12:
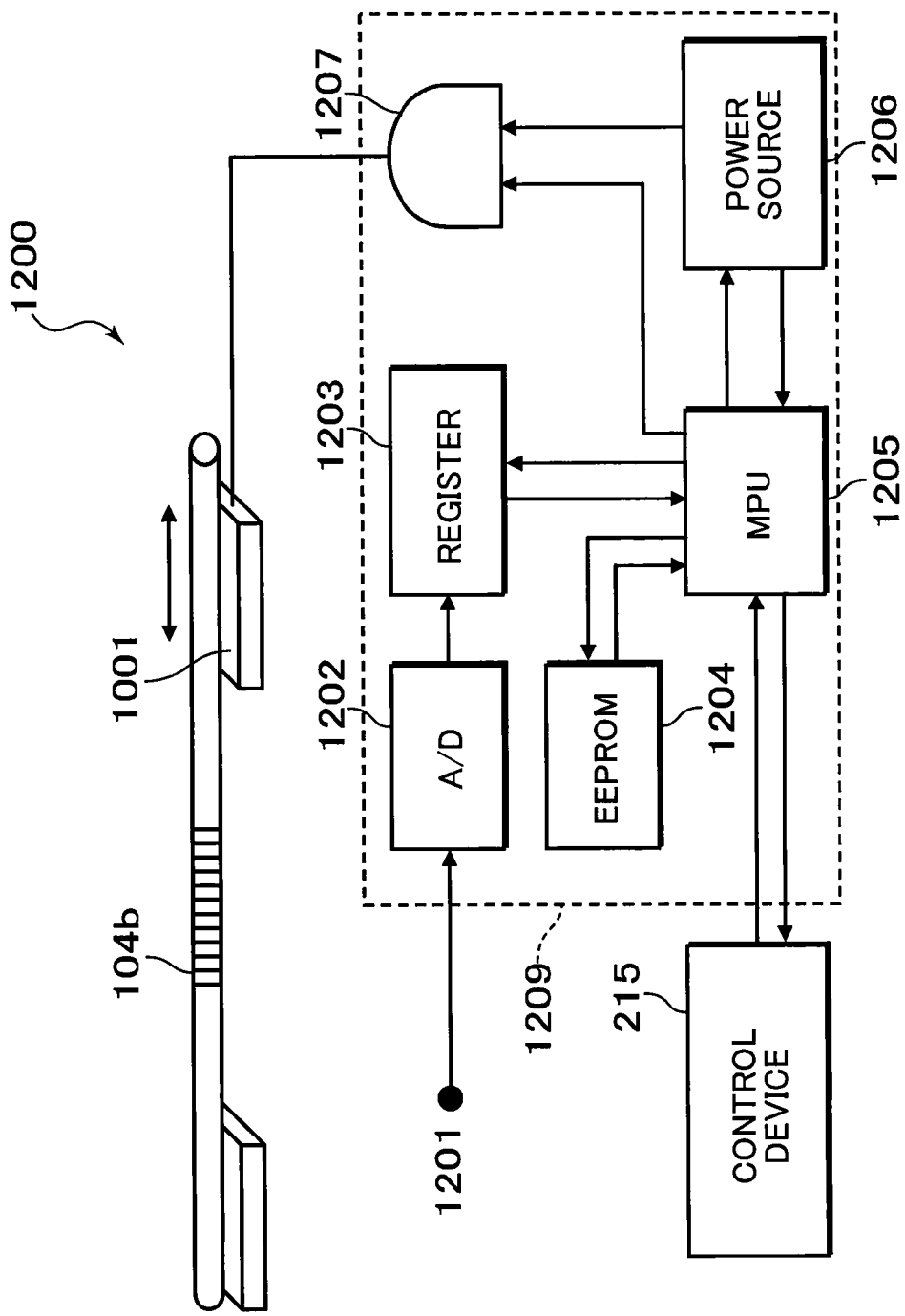
FIG. 12 is a schematic diagram showing the schematic configuration of the control system for adjusting the emission wavelength according to an embodiment of the present invention.

The temperature setting method of the fundamental light of the wavelength conversion element 209 is now explained. FIG. 12 is a schematic diagram showing the control system 1200 for adjusting the emission wavelength that is used in the loop 3.

One end of the fiber grating (FBG) 104b that determines the emission wavelength is retained on the actuator 1001, and the stress to be applied to the FBG 104b is determined by the voltage that is applied to the actuator 1001. The light intensity signal 1201 of the green light generated based on wavelength conversion is converted into a digital value with the A/D converter 1202, and stored in the register 1203. The table of the voltage to be applied to the actuator 1001; that is, the stress to be applied to the FBG in relation to the harmonic output is stored in the EEPROM 1204 in advance together with the required inrush current to the excitation LD.

Data of the harmonic output setting value is transferred from the control device 215 to the MPU 1205. The MPU 1205 acquires the data of stress applied to the FBG in relation to the harmonic output stored in the EEPROM 1204, and compares/computes this with the current value of the green intensity signal stored in the register 1203. The power source 1206 is the source for supplying power to the actuator 1001, and the signal converter 1207 converts the PWM signal into an analog voltage signal and controls the actuator 1001.

Note that, as the actuator 1001 that can be used in this embodiment, an actuator using an electromagnetic coil or an actuator using a piezoelectric element may be used, but preferably used is an actuator 1001 using an electromagnetic coil from the perspective of being able to control the voltage with the stress applied to the FBG and monitor the stress with the voltage value.

Note that, as a method of changing the wavelength of fundamental light, a DBR (Distributed Bragg Reflector) laser, which is one type of a wavelength variable semiconductor laser, may also be used. Moreover, it is also possible to adopt a method of amplifying light by using an optical fiber amplifier with the DBR laser as the seed light.

Figure 13:
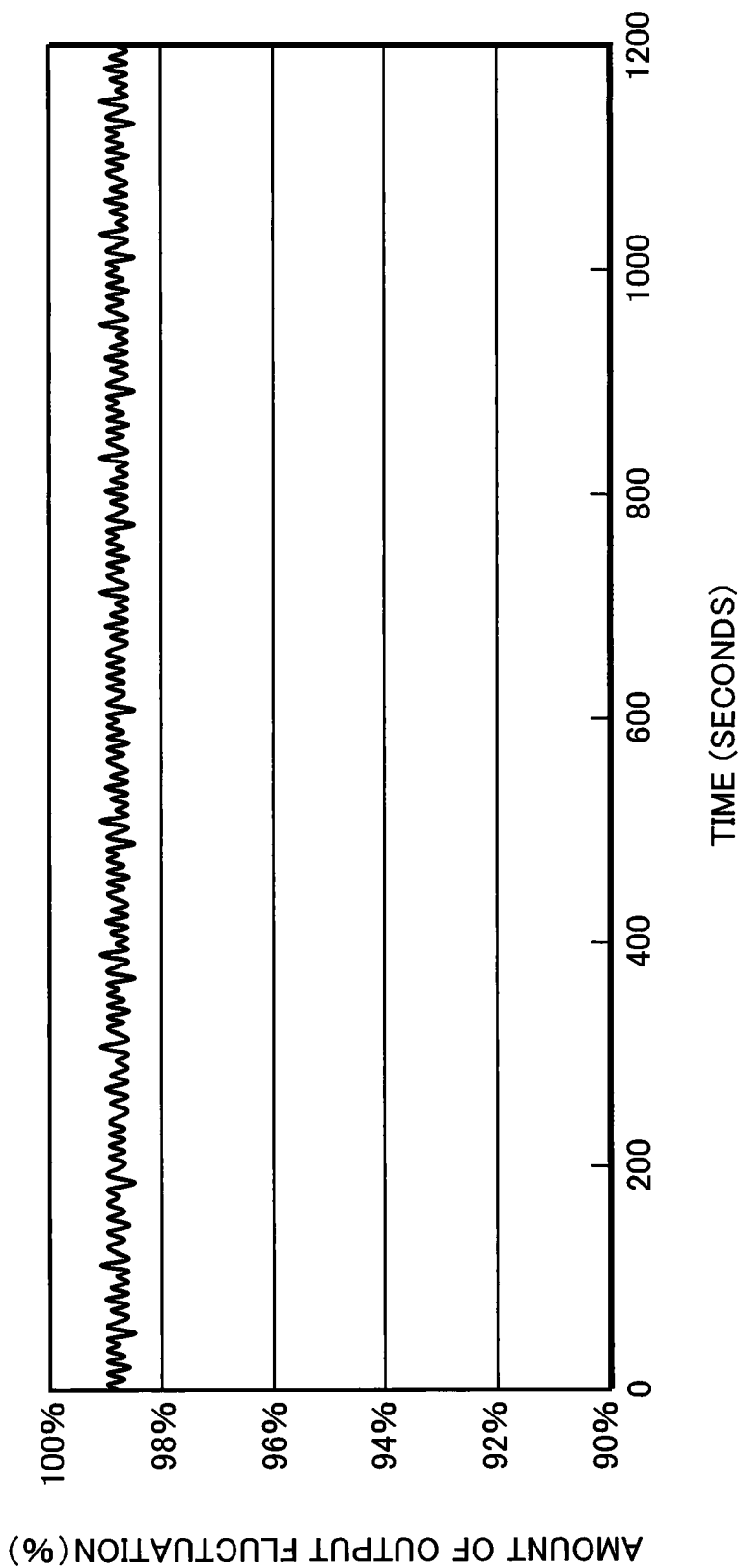
FIG. 13 is a plot diagram showing the output stability in the case of applying another harmonic emission control method according to an embodiment of the present invention.

FIG. 13 shows a plot diagram of the amount of output fluctuation in relation to the operation time of the wavelength conversion laser light source 1000 in the control B. In the foregoing case, the amount of output fluctuation is kept within 1%, and, in comparison to the plot diagram shown in FIG. 3B, it is evident that the output fluctuation caused by the wavelength variation of the fundamental light and the output fluctuation caused by changes in the polarization component of the fundamental light have been considerably reduced. In the case of this embodiment, the control response speed can be improved in comparison to the control A since the emission wavelength of the fundamental light, which is faster than the temperature time response of the wavelength conversion element, is the control target. The output fluctuation of roughly 1% that remained in the wavelength as shown in the plot diagram showing in FIG. 9 upon applying the control A can be further inhibited by applying the control B.

As a result of configuring the wavelength conversion laser light source as per the control A and the control B of this embodiment, it is possible to detect changes in the output caused by disturbances to the polarization direction of the fundamental light, wavelength of the fundamental light, and temperature of the wavelength conversion element and, therefore, there is an effect of being able to improve the stability of output control and improve the reliability of the device.

Second Embodiment

Another embodiment of the present invention is now explained with reference to FIG. 14 and FIG. 15.

This embodiment explains a case of applying the control method of the foregoing first embodiment to an internal resonator-type wavelength conversion laser light source.

Figure 14:
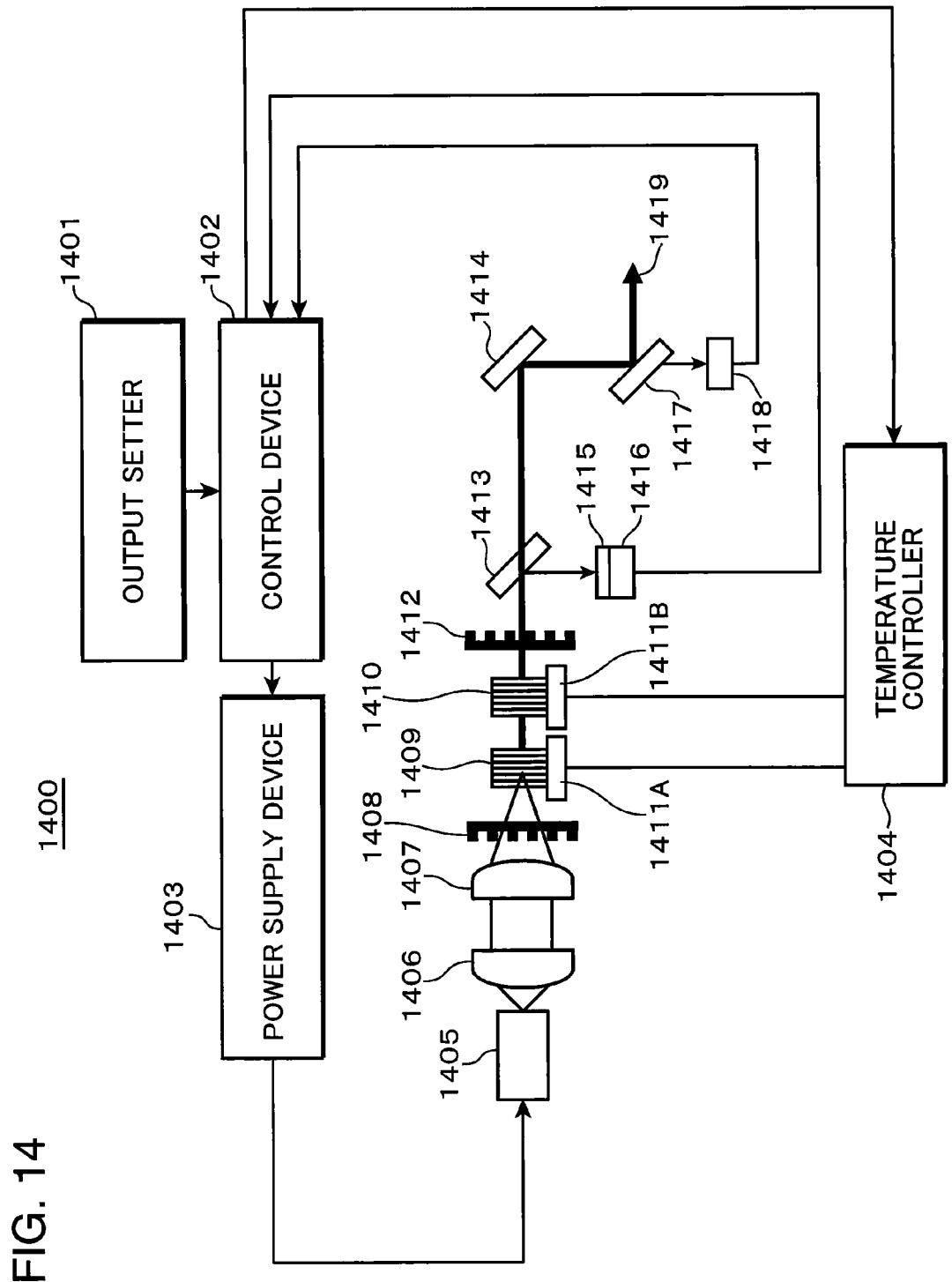
FIG. 14 is a schematic diagram showing the schematic configuration of the wavelength conversion light source applying the harmonic emission control method according to another embodiment of the present invention.

FIG. 14 shows a schematic configuration of the internal resonator-type wavelength conversion laser light source 1400 according to this embodiment.

The internal resonator-type wavelength conversion laser light source 1400 comprises a power supply device 1403, a control device 1402, an output setter 1401, an excitation light source (fundamental light source, laser diode) 1405, a collimating lens 1406, a condensing lens 1407, a solid laser element 1409, resonant mirrors 1408 and 1412, a dielectric multilayer mirror 1413, a light receiving element 1416 comprising a polarizer 1415, a temperature controller 1404, harmonic reflecting mirrors 1414 and 1417, a light receiving element 1418, and the like.

The excitation light output from the excitation light source (laser diode) 1405 is excited as a result of entering the solid laser element 1409 by using the collimating lens 1406 and the condensing lens 1407.

The solid laser element 1409 and the wavelength conversion element 1410 are disposed in the resonator configured from the resonant mirrors 1408 and 1412. The fundamental light emitted from the solid laser element 1409 oscillates in the resonator and emits a laser. The generated fundamental light enters the wavelength conversion element 1410, and a part thereof is converted into the second harmonic. The resonant mirror 1408 and the output mirror 1412 have high reflectance with the wavelength of the fundamental light, and a dielectric multilayer is formed in the output mirror 1412 from which light is output so that the second harmonic will have low reflectance (high transmission).

Most of the light that is output from the laser resonator is a second harmonic, but a fundamental light is also slightly output. Thus, the second harmonic output from the output mirror 1412 is passed through the dielectric multilayer mirror 1413 to separate the light component from the second harmonic. The fundamental light that was reflected off the dielectric multilayer mirror 1413 and separated from the second harmonic enters the light receiving element 1416 comprising a polarizer 1415, and the light quantity thereof is monitored. Meanwhile, the second harmonic component passes through the dielectric multilayer mirror 1413, is reflected off the harmonic reflecting mirrors 1414, 1417, and output as output light 1419 to the outside of the light source. Here, a part of the second harmonic passes through the harmonic reflecting mirror 1417. Subsequently, the harmonic that passed through the harmonic reflecting mirror 1417 is received with the light receiving element 1418, and the light quantity of the harmonic is monitored.

Although this embodiment uses a quasi phase matching $LiNbO_3$ element with a periodically poled structure as the wavelength conversion element, a quasi phase matching wavelength conversion element formed with a periodically poled structured in the $LiTaO_3$ or $KTiOPO_4$ crystal also with an oxygen octahedral structure as its basic structure can also be used. Moreover, as generally performed, it is also possible to use an element using a crystal substrate which inhibits changes in the light refractive index by adding Mg, Ce or the like to the crystal system.

The light intensity signal of the fundamental light received with the light receiving element 1416 and the light intensity signal of the harmonic received with the light receiving element 1418 are sent to the control device 1402. The control device 1402 controls the current signal sent from the power supply device 1403 to the excitation light source 1405 based on the respective light intensity signals of the fundamental light and the harmonic light and the input value set with the output setter 1401. Moreover, the wavelength conversion element 1410 is subject to temperature adjustment with the temperature controller 1404.

In the second embodiment also, the fundamental light that enters the light receiving element 1416 is only a predetermined polarization component as a result of passing through the polarizer 1415. As a result of adopting the configuration of this embodiment, it is possible to determine the polarization fluctuation that occurs from the mode change of the laser resonator, and control according to the laser emission state can be performed as described below.

The harmonic light control process according to this embodiment is now explained with reference to the flowchart of FIG. 15A.

Foremost, in a steady operation, whether there is any change in the amount of harmonic light (harmonic) is determined (S1). If there is no change in the amount of harmonic light (NO at S1), the steady operation is continued (S2). Meanwhile, if there is change in the amount of harmonic light (YES at S1), whether the phase of the residual fundamental light and the phase of the harmonic light match or are reverse is determined (S2). If the phase of the residual fundamental light and the phase of the harmonic light match, the excitation current is adjusted (S3). Meanwhile, if the phase of the residual fundamental light and the phase of the harmonic light are reverse, the element temperature is adjusted (S4). After adjusting the excitation current at S3, or after adjusting the element temperature at S4, whether the harmonic output has recovered is determined (S5). If the harmonic output has not recovered (NO at S5), upon returning to S2, whether the phase of the residual fundamental light and the phase of the harmonic light match or are reverse is determined, and the subsequent processes are repeated. Meanwhile, if the harmonic output has recovered (YES at S5), upon returning to S1, the steady operation is continued.

For example, if the phase of the light intensity signal of the predetermined polarization component detected with the light receiving element 1416 and the phase of the light intensity signal of the harmonic detected with the light receiving element 1418 match (are synchronous), it is possible to predict that the factor of output fluctuation is in the fundamental light source. As the factors of output reduction caused by the fundamental light source, considered maybe three types; namely, heat generation of the solid laser element, output reduction of the excitation light source, and mode change of the emitted fundamental light. If the excitation light source (fundamental light source) 1405 is the cause, as shown in the loop 2 of FIG. 15B, feedback control is performed for changing the excitation current supplied to the excitation light source 1405 so that the intensity of the fundamental light of the predetermined polarization component detected with the light receiving element 1416 becomes constant (APC:Auto Power Control).

Meanwhile, if the phase of the light intensity signal of the predetermined polarization component detected with the light receiving element 1416 and the phase of the light intensity signal of the harmonic detected with the light receiving element 1418 are reverse (asynchronous), it is possible to predict that the factor of output fluctuation is in the wavelength conversion element. If there is abnormality in the wavelength conversion element as in the foregoing case, the output can be recovered by optimizing the element temperature based on the method explained with reference to FIG. 8A to FIG. 8D in the first embodiment.

Note that whether the phase of the light intensity signal of the predetermined polarization component detected with the light receiving element 1416 and the phase of the light intensity signal of the harmonic detected with the light receiving element 1418 match (are synchronous) or are reverse (asynchronous) may be determined, for example, as matching (synchronous) if the phase of both signals is within a range of 0±45 degrees, and reverse (asynchronous) if the phase of both signals is within a range of 180±45 degrees.

As a result of detecting the phase difference between the light intensity of the fundamental light and the light intensity of the harmonic light as described above, the factor of output fluctuation can be recognized quickly. Consequently, since it is possible to promptly and stably perform control according to the laser emission state, a highly reliable wavelength conversion laser light source can be realized.

Note that the foregoing synchronous/asynchronous selection control of the phases can also be applied to the control loop 2 and the control loop 3 of FIG. 11.

Figure 15B:
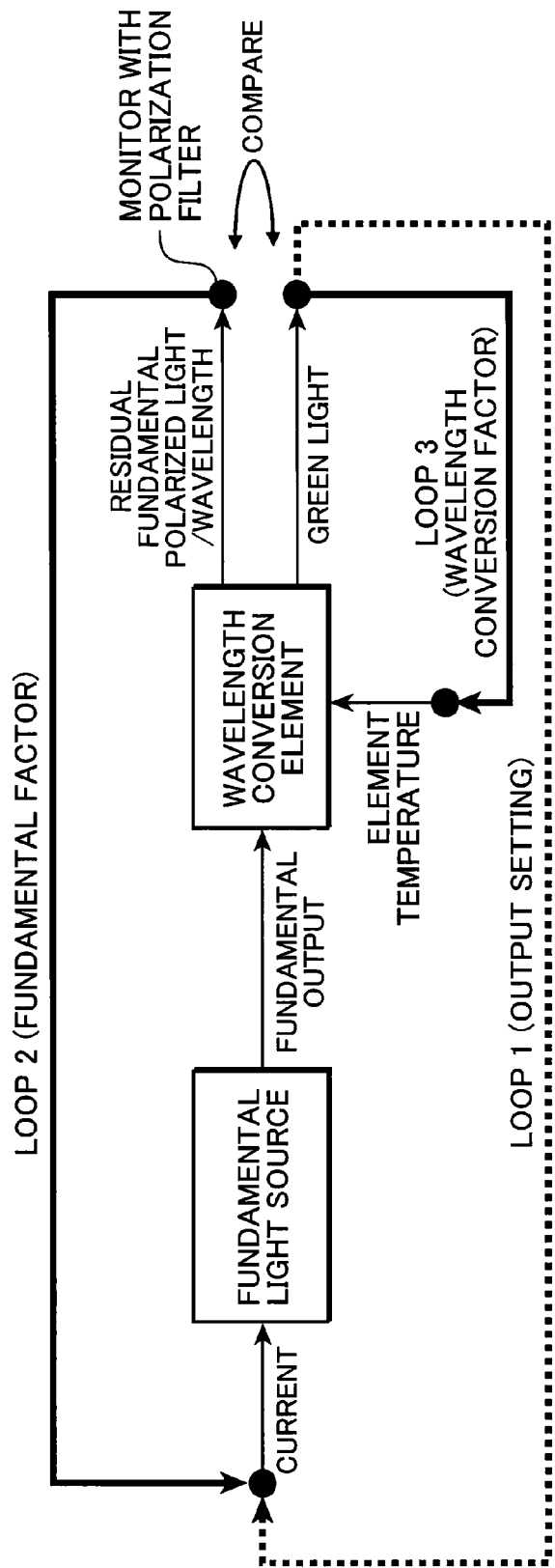
FIG. 15B is a schematic diagram showing the control loop in the harmonic emission control method according to another embodiment of the present invention.

The control loop of the wavelength conversion laser light source according to this embodiment is shown in FIG. 15B.

With respect to the residual fundamental light and harmonic light (green light) that are output from the output mirror, upon comparing the phase information of the intensity thereof, whether to perform the feedback with the loop 2 or perform the feedback with the loop 3 is determined based on information showing the synchronous/asynchronous of the intensity change. In the loop 2, feedback is performed to the inrush current value to the excitation light source 1405. Meanwhile, in the loop 3, feedback is performed in the form of the element temperature. In the foregoing case, what is important upon executing this embodiment is that the feedback operation is not performed if there is no change in the amount of harmonic (green light) in relation to the fluctuation in the amount of residual fundamental light.

The loop 1 is a loop that is used for comparing the inrush current value and the harmonic (green light) output upon setting the output or at regular time intervals. In this embodiment also, an example of the timing of switching the control target used in the first embodiment can be adopted as is. The timing chart of FIG. 6 shows whether the respective loops are being performed or stopped in relation to the operational status of the wavelength conversion laser light source.

Foremost, upon setting the light output from the light source, the APC control (loop 1) of feeding back the light output value to the input current value is performed, and time sharing control is started at the point in time that the light output is determined.

In this embodiment, the control (loop 2) of causing the output of the fundamental light to be constant and the control (loop 3) of optimizing the temperature of the wavelength conversion element are performed at the same timing. This is because, with respect to the two loops of foregoing loop 2 and loop 3, there are no problems such as a runaway even if they are performed simultaneously. Nevertheless, similar to the first embodiment, the feedback control of this embodiment is not limited thereto. In other words, so as long as the performance timing of the loop 1 and the performance timing of the loop 2 and the loop 3 are made to be different, the two loops of loop 2 and loop 3 do not necessarily have to be performed simultaneously, and these may be started and ended at a different timing.

In the loop 3, since the temperature adjustment of the wavelength conversion element is performed, the performance time of the loop 3 is preferably around 10 seconds to 1 minute. Here, after the loop 2 and the loop 3 are performed for a given period of time, the control of the loop 1 and the loop 2 is once ended to release the loops, and the loop 1 of performing feedback to the input current value is performed once again based on the harmonic (green light) output. The performance time of the loop 1 is roughly 0.1 seconds to 10 seconds, and it is possible to sufficiently follow the preceding loops. As a result of sharing the time of performing the loop 1 and the time of performing the loop 2 and the loop 3 as described above, the temperature of the wavelength conversion element can always be kept at an optical value in relation to environmental changes such as changes in the ambient temperature or the wavelength variation of the fundamental light. Thus, there is an effect of being able to improve the stability of control and improve the reliability of the light source.

As described above, according to the control method of this embodiment, it is possible to reduce the output margin of the fundamental light (margin of the input current value), and the effect of being able to downsize and lower the power consumption of the wavelength conversion laser light source can be achieved with a simple control.

Even in the case of using the control method of this embodiment, similar to the plot diagram showing in FIG. 13 of first embodiment, the effect of being able to suppress the output fluctuation to 1% or less is yielded.

Third Embodiment

The wavelength conversion laser light source according to another embodiment of the present invention is now explained with reference to FIG. 16 to FIG. 29.

The configuration of a wavelength conversion laser light source capable of reinforcing the effect of achieving the object of stabilizing the output and lowering the power consumption with the control explained in the first and second embodiments is now explained.

Figure 16:
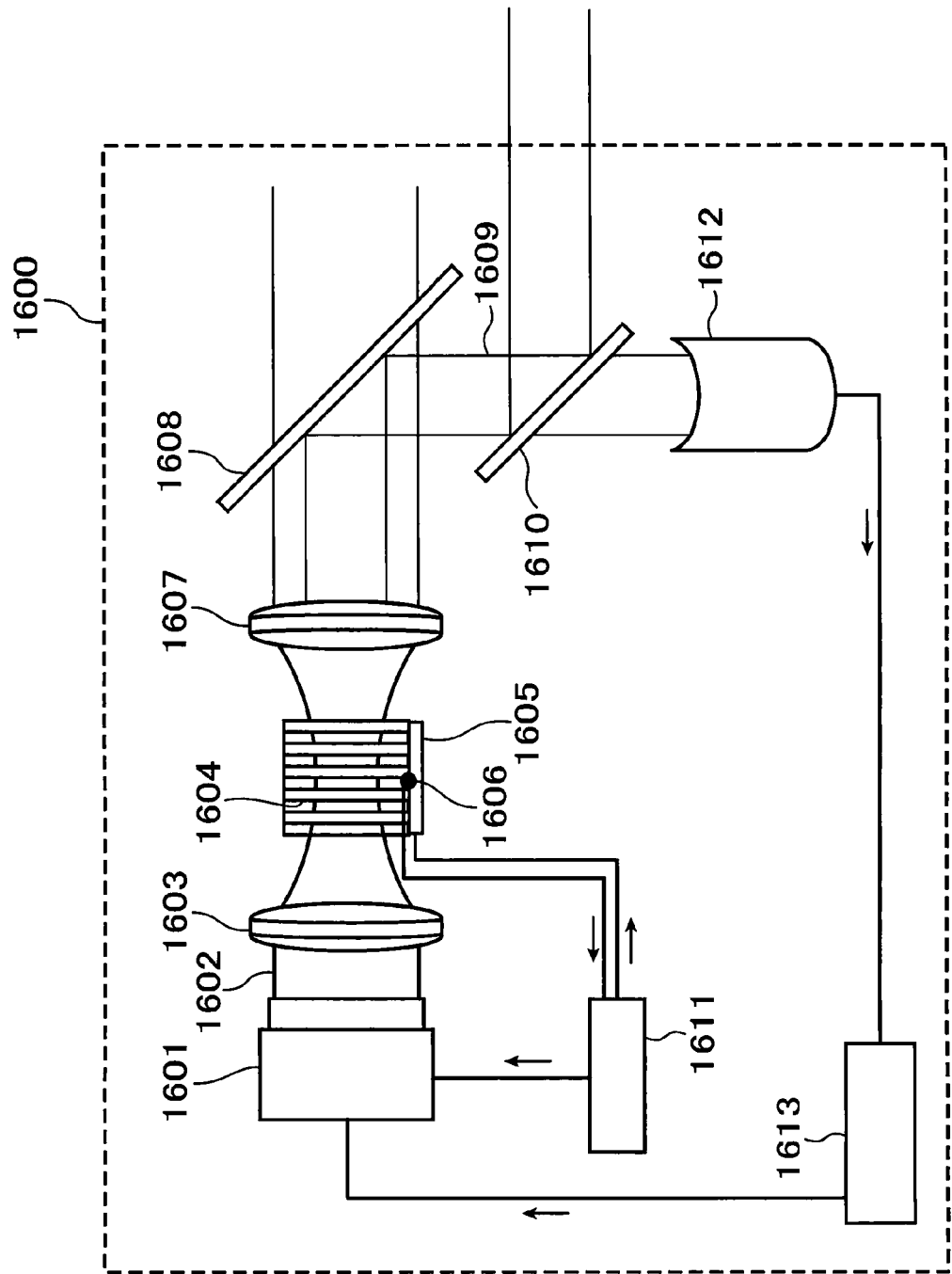
FIG. 16 is a schematic diagram showing the schematic configuration of the wavelength conversion laser light source according to yet another embodiment of the present invention.
Figure 17:
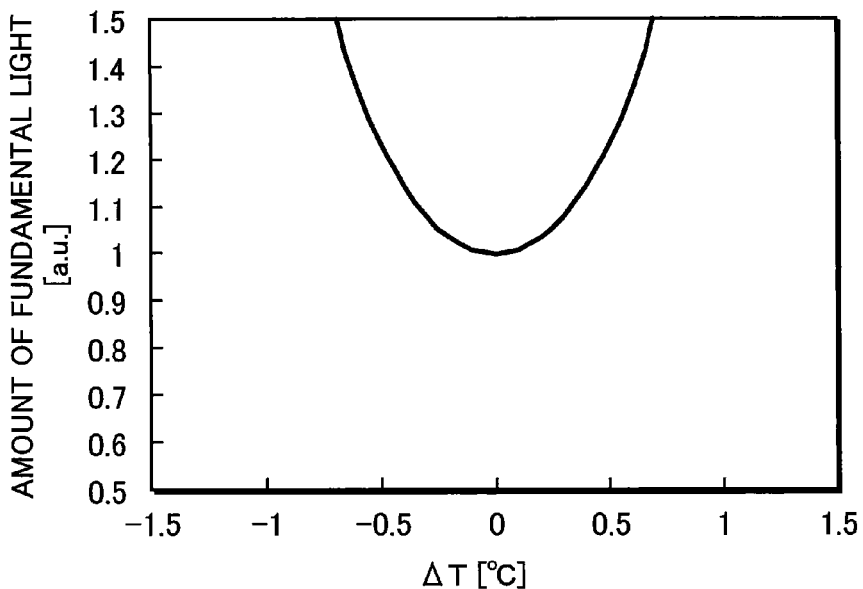
FIG. 17 is a plot diagram showing the relation between the difference ($\Delta T$) from the temperature in which the conversion efficiency from the fundamental light to harmonic light of the wavelength conversion element becomes maximum and the amount of fundamental light that is required for obtaining the set harmonic output according to yet another embodiment of the present invention.
Figure 18:
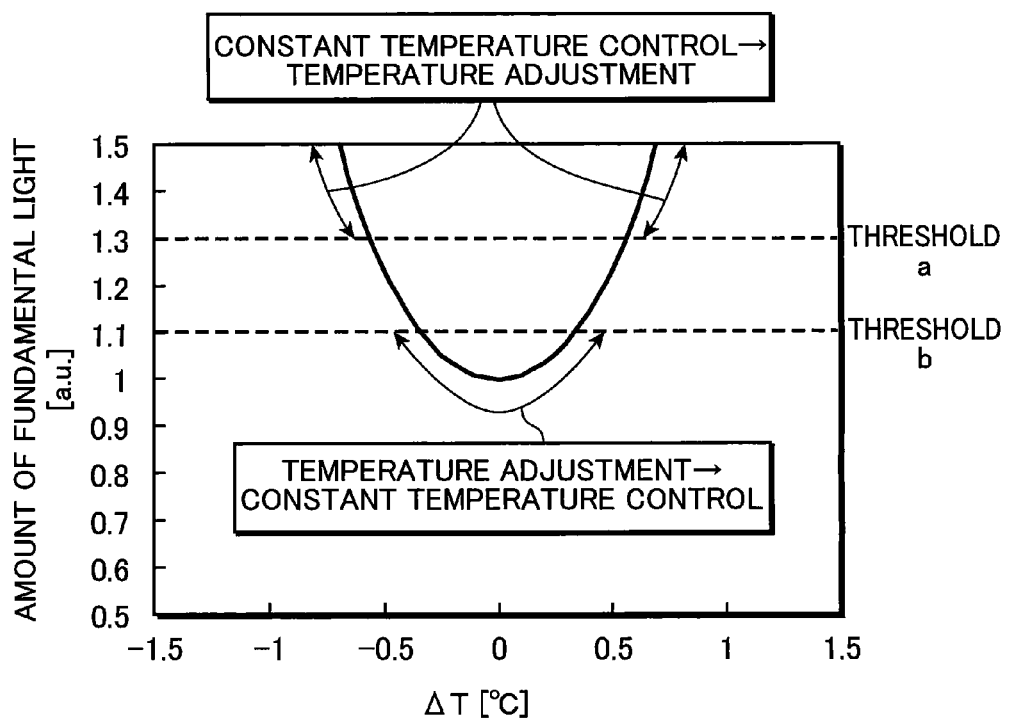
FIG. 18 is a plot diagram showing the relation between the difference ($\Delta T$) from the temperature in which the conversion efficiency from the fundamental light to harmonic light of the wavelength conversion element becomes maximum and the amount of fundamental light that is required for obtaining the set harmonic output according to yet another embodiment of the present invention.

FIG. 16 shows a schematic diagram of the configuration of the wavelength conversion laser light source proposed in this embodiment. FIG. 17 and FIG. 18 are plot diagrams showing the relation among the thermistor temperature in which the wavelength conversion efficiency becomes maximum, the difference ($\Delta T$) with the temperature monitored with the thermistor, and the amount of fundamental light that is required for obtaining the set harmonic output.

The configuration of the wavelength conversion laser light source 1600 of this embodiment is explained. As shown in FIG. 16, the wavelength conversion laser light source 1600 comprises a fundamental light source 1601, a condensing lens 1603, a wavelength conversion element 1604, a Peltier element 1605, a thermistor 1606, a collimating lens 1607, a wavelength separating mirror 1608, an optical branching mirror 1610, a temperature control circuit 1611, a photodiode 1612, and a constant light quantity control circuit.

The fundamental light 1602 output from the fundamental light source 1601 is caused to enter the wavelength conversion element 1604 using a nonlinear optical crystal, and a part of the fundamental light 1602 is converted into the wavelength converted light 1609. Moreover, a fiber laser is used as the fundamental light source 1601, infrared light of a 1 µm band is used as the fundamental light 1602, and green light as the second harmonic of the infrared light is used as the wavelength converted light 1609. Moreover, a quasi phase matching wavelength conversion element configured from LiNbO$_3$ added with 5 mol % of Mg and formed with a periodically poled structure of 7 µm is used as the wavelength conversion element 1604. In this embodiment, the element length of the wavelength conversion element 1604 is 20 mm.

The fundamental light 1602 and the wavelength converted light 1609 output from the wavelength conversion element 1604 are separated with the wavelength separating mirror 1608, and a part of the obtained wavelength converted light 1609 is caused to enter the photodiode 1603 with the optical branching mirror 1610 (wavelength converted light transmission factor of approximately 1 to 10%), and the light quantity of the wavelength converted light 1609 is monitored.

In this embodiment, the constant light quantity control is performed based on the monitored value. A constant light quantity control circuit 1613 for controlling the driving current of the fundamental light source 1601 to reduce the fundamental light 1602 if the wavelength converted light 1609 increases more than the intended light quantity, and increase the fundamental light 1602 if the wavelength converted light 1609 decreases less than the intended light quantity is provided, and the monitor value of the wavelength converted light 1609 is thereby controlled to be constant.

Moreover, the fundamental light source 1601 comprises a temperature control circuit 1611 for adjusting the temperature of the wavelength conversion element 1604 by using the thermistor 1606 and the Peltier element 1605 based on the monitored value of the amount of fundamental light.

Here, although the means for monitoring the amount of fundamental light is not shown in FIG. 16, it is also possible to adopt a configuration of causing a part of the fundamental light before entering the wavelength conversion element to be reflected off a branching mirror and received with the photodiode.

Moreover, if the fundamental light source is a light source in which the increase/decrease of the driving current and the increase/decrease of the amount of emitted fundamental light coincide, a means for monitoring the driving current may be alternately used. In the foregoing case, this is preferable in terms of achieving cost reduction since the number of photodiodes to be used can be reduced.

Moreover, the total light quantity of the fundamental light and the wavelength converted light output from the wavelength conversion element basically coincides with the amount of fundamental light that enters the wavelength conversion element, and the increase/decrease of the amount of fundamental light that is output from the wavelength conversion element and the amount of fundamental light that enters the wavelength conversion element basically coincides. With the control of this embodiment, since it will suffice so as long as the increase/decrease of the amount of fundamental light that enters the wavelength conversion element can be determined, a means for monitoring the amount of fundamental light output from the wavelength conversion element can also be alternatively used. In the foregoing case, this is preferable in that more fundamental light emitted with the fundamental light source will enter the wavelength conversion element. Consequently, highly efficient wavelength conversion is enabled.

The basic operation of the temperature control of the wavelength conversion element of the laser light source using the temperature control circuit is now explained.

In this embodiment, as described above, the constant light quantity control is performed by monitoring the amount of wavelength converted light and increasing/decreasing the amount of fundamental light so that the value thereof becomes constant. Thus, as with a conventional type (FIG. 17), as shown in FIG. 18, more amount of fundamental light becomes necessary as the absolute value of the $\Delta T$ increases. Accordingly, by monitoring the amount of fundamental light that increases or decreases pursuant to changes in the $\Delta T$, the temperature control of the wavelength conversion element 1604 is performed in this embodiment while applying the constant light quantity control.

Consequently, it is possible to continue driving the laser light source without interrupting the constant light quantity control. As a method of performing temperature control of the wavelength conversion element 1604 while operating the constant light quantity control as described above, for example, there is the following control method.

Control C

As shown in FIG. 18, for example, in order to obtain a predetermined amount of wavelength converted light, an amount of fundamental light that is 1.3 times the amount of fundamental light (hereinafter referred to as the "reference amount of fundamental light") at the point ($\Delta T=0$) where the required amount of fundamental light becomes lowest is set as threshold a, and the amount of fundamental light that is 1.1 times the reference amount of fundamental light is set as threshold b.

Figure 19:
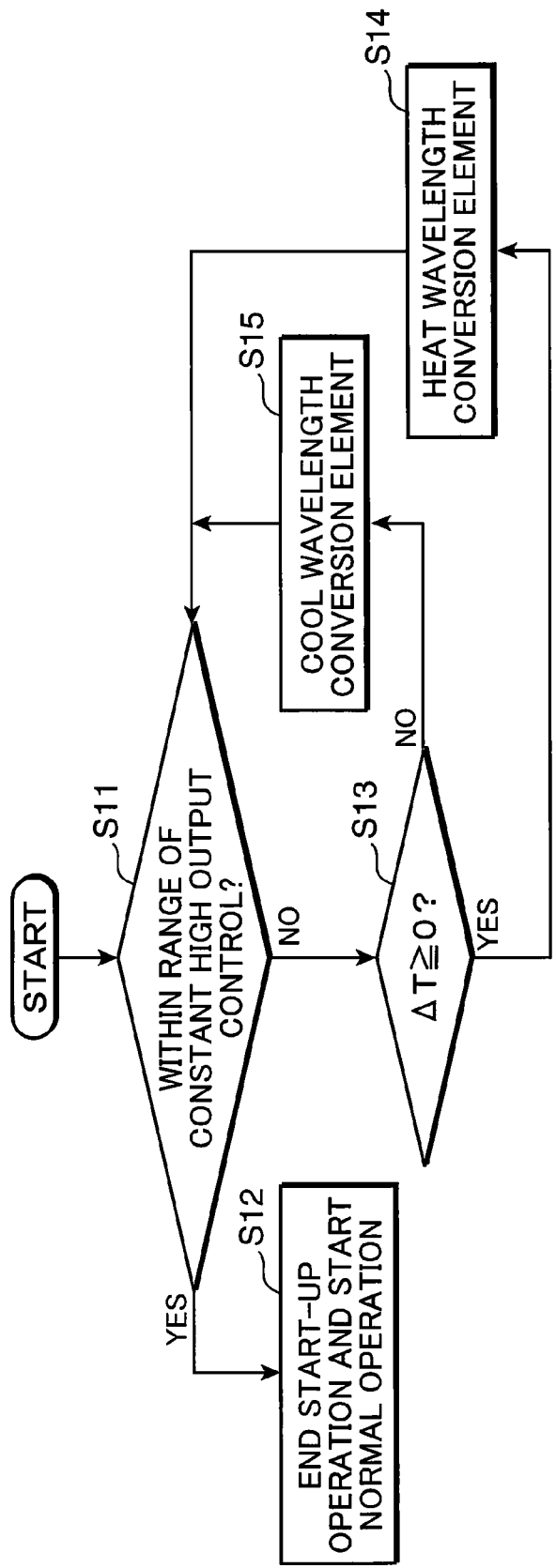
FIG. 19 is a flowchart showing the control process according to yet another embodiment of the present invention.

Upon performing the start-up operation, foremost, the control shown in the flowchart of FIG. 19 is executed.

Foremost, whether the difference $\Delta T$ between the thermistor temperature in which the wavelength conversion efficiency at the time of start-up and the temperature monitored with the thermistor is within a range of constant light quantity control is determined (S11). If the $\Delta T$ is within a range of constant light quantity control (YES at S11), the start-up operation is ended and the normal operation is started (S12). Meanwhile, if the $\Delta T$ is not within a range of constant light quantity control (NO at S11), whether $\Delta T \geqq 0$ is determined (S13). If $\Delta T \geqq 0$ (YES at S13), the wavelength conversion element 1604 is heated (S14). If the $\Delta T$ is negative (NO at S13), the wavelength conversion element 1604 is cooled (S15). Whether the $\Delta T$ is within a range of constant light quantity control is determined once again (S11), and similar processing is subsequently performed. In other words, if the $\Delta T$ is not within a range of constant light quantity control (NO at S11), whether $\Delta T \geqq 0$ is determined (S13). If $\Delta T \geqq 0$ (YES at S13), the wavelength conversion element 1604 is heated. If the $\Delta T$ is negative (NO at S13), the wavelength conversion element 1604 is cooled. After reaching the range of $\Delta T$ capable of constant light quantity control, the start-up operation is ended and switched to the normal operation (S12).

The control process in the normal operation is now explained with reference to the flowchart of FIG. 20.

In the normal operation, foremost, whether the amount of fundamental light is greater than the threshold a is determined (S21). If it is lower than the threshold a (NO at S21), constant temperature control is performed (S22). Meanwhile, if the amount of fundamental light is greater than the threshold a (YES at S21), the wavelength conversion element 1604 is heated (S23). Subsequently, the whether the amount of fundamental light has increased is determined (S24). If the amount of fundamental light has increased (YES at S24), since this means the increase in the deviation (absolute value of $\Delta T$) of $TM_0$ and TM, the wavelength conversion element 1604 is cooled (S25). Meanwhile, if the amount of fundamental light has not increased (NO at S24), whether the amount of fundamental light is greater than the threshold b is determined (S26). If it is lower than the threshold b (NO at S27), constant temperature control is performed (S22).

At S25, after cooling the wavelength conversion element 1604, whether the amount of fundamental light has increased is additionally determined (S27). If the amount of fundamental light has increased (YES at S27), upon returning to S23, the wavelength conversion element 1604 is heated (S23). Subsequently, the step S23 and the steps after S23 are repeated. Meanwhile, if the amount of fundamental light has not increased (NO at S27), whether the amount of fundamental light is greater than the threshold b is determined (S28). If it is not greater than the threshold b (NO at S28), constant temperature control is performed (S22). Meanwhile, if the amount of fundamental light is greater than the threshold b (YES at S28), upon returning to S25, the wavelength conversion element 1604 is cooled and the routine of S25 onward is repeated.

With the foregoing control method, variation in the amount of fundamental light is detected by continuing the constant light quantity control. Thus, the control for causing the amount of wavelength converted light to be constant must be executed at all times during the normal operation.

Here, if the difference between the threshold a and the threshold b to become the reference for determining whether the amount of fundamental light has increased or decreased is too large, the hunting of the thermistor temperature will increase. In the foregoing case, the energy for heating and cooling which is required for temperature adjustment will increase, and this will lead to increased costs since a fundamental light source with a higher output is required. Meanwhile, if the difference between the threshold a and the threshold b to become the reference for determining whether the amount of fundamental light has increased or decreased is too large, the possibility of erroneously determining the increase or decrease in the amount of fundamental light will also increase.

Thus, the difference between the threshold a and the threshold b to become the reference for determining whether the amount of fundamental light has increased or decreased is preferably 20% or less of the width of the $\Delta T$ which will be 1.5 times or less the required amount of fundamental light when the amount of fundamental light is $\Delta T=0$. In the foregoing case, the hunting of the TM will decrease, and temperature adjustment of the wavelength conversion element is enabled with less energy.

Moreover, the difference between the threshold a and the threshold b to become the reference for determining whether the amount of fundamental light has increased or decreased is preferably 5% or more of the width of the $\Delta T$ which will be 1.5 times or less the required amount of fundamental light when the amount of fundamental light is $\Delta T=0$. In the foregoing case, it is possible to accurately determine the increase or decrease in the amount of fundamental light, and faster temperature adjustment is enabled. Consequently, since the average value of the required amount of fundamental light can also be reduced, the output margin value of the fundamental light source can be kept low. It is thereby possible to realize the low power consumption and low cost of the wavelength conversion laser light source.

According to this control method, as shown in FIG. 18, the threshold a and the threshold b are set, and the temperature control for eliminating the $\Delta T$ and the constant temperature control are switched and executed. Consequently, the driving of the laser light source can be continued without interrupting the constant light quantity control. In addition, since it is possible to reduce the energy required for heating or cooling the wavelength conversion element, a stable harmonic output can be realized with low power consumption.

Moreover, the following control method may be adopted as the temperature control under the constant light quantity control.

Control D

Figure 21:
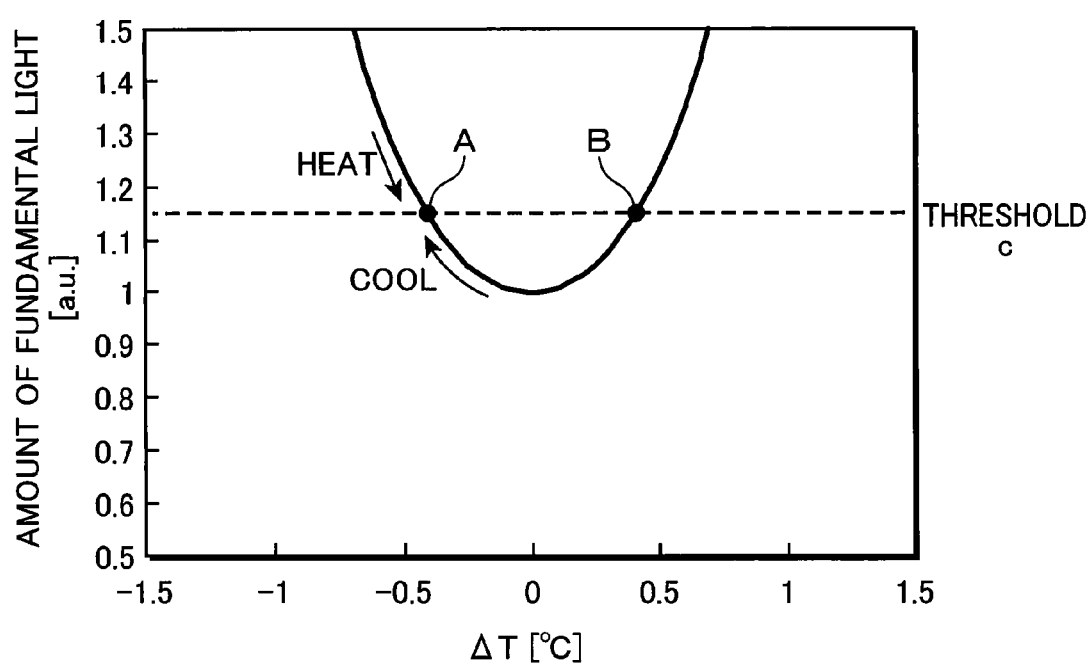
FIG. 21 is a plot diagram showing the relation between the control threshold c and FIG. 17 according to yet another embodiment of the present invention.

As shown in FIG. 21, in order to obtained a predetermined amount of wavelength converted light, the amount of fundamental light that is 1.15 times the amount of fundamental light (hereinafter referred to as the "reference amount of fundamental light") at the point where the required amount of fundamental light becomes the lowest ($\Delta T=0$) is set as threshold c, and a case of heating or cooling the wavelength conversion element so that the amount of fundamental light constantly approaches the threshold c is now explained.

Figure 20:
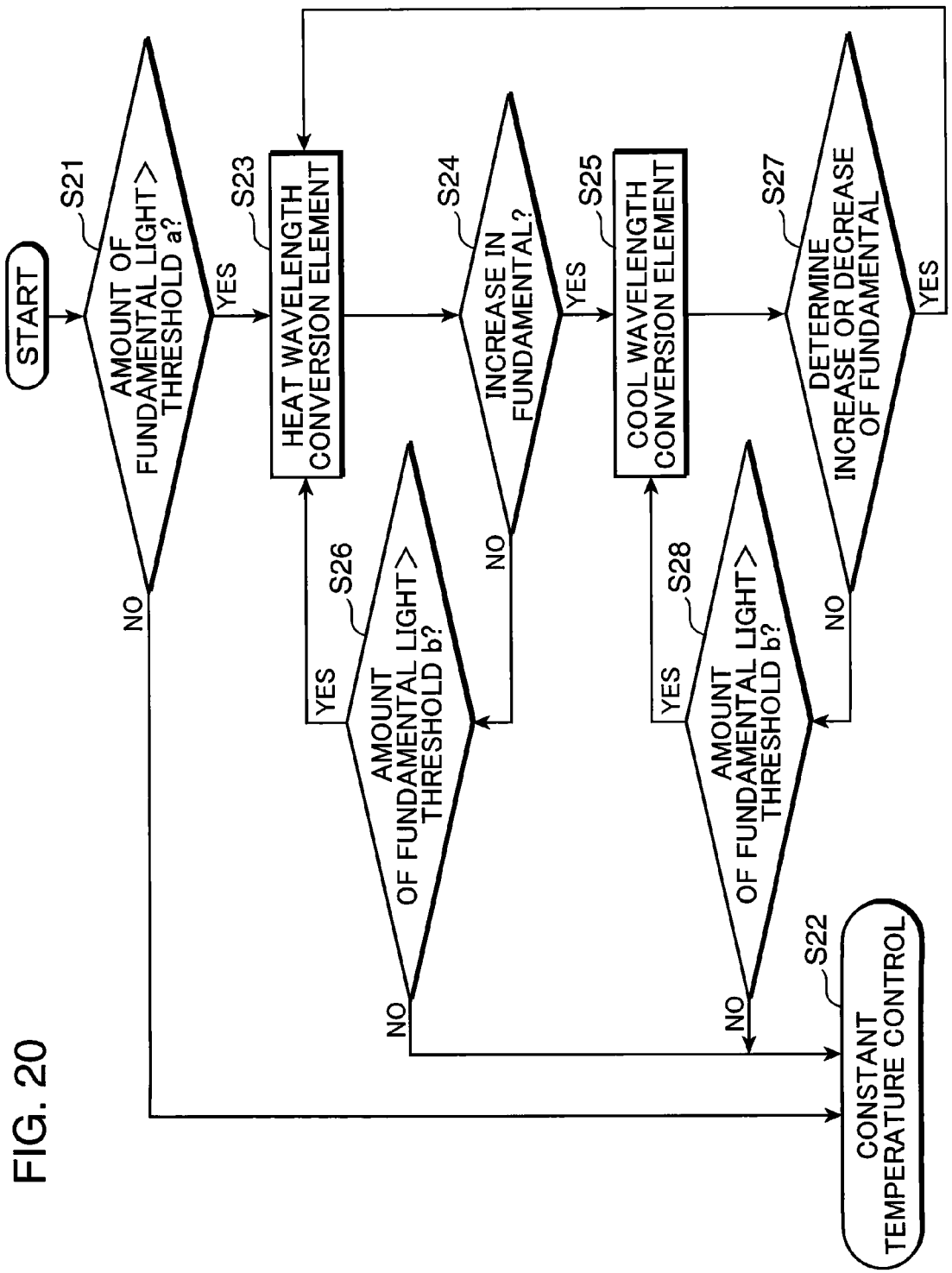
FIG. 20 is a flowchart showing the control process of the wavelength conversion element temperature of the wavelength conversion laser light source according to yet another embodiment of the present invention.

With respect to the start-up operation, the start-up operation as shown with the flow of FIG. 20 is performed until the TM reaches a range that enables constant light quantity control as with the control C. After reaching the range of $\Delta T$ that enables constant light quantity control, the start-up operation is switched to the normal operation.

If the $\Delta T$ is negative at the time of start-up, the wavelength conversion element is heated as the start-up operation, and this is switched to the normal operation where the $\Delta T$ is in a range that enables constant light quantity control and in which the $\Delta T$ becomes negative.

During the normal operation, the wavelength conversion element is heated if the amount of fundamental light is greater than the threshold c so that it is converged to the point A shown in FIG. 21. If the amount of fundamental light is not greater than the threshold c, the wavelength conversion element is cooled. As a result of converging at point A as described above, the control process can be reduced in comparison to the case of converging at point B, and faster control can be realized.

Contrarily, if it is $\Delta T \geq 0$ at the time of start-up, the wavelength conversion element is cooled as the start-up operation. Meanwhile, it is preferable to converge at point B of FIG. 21 (curved line on the right side of $\Delta T=0$) in the normal operation. In this case also, the control process can be reduced in comparison to the case of converging at point A, and faster control can be realized.

Furthermore, since it is possible to reduce the energy required for heating or cooling the necessary amount of fundamental light, a laser light source with lower power consumption can be realized.

Moreover, as a result of reducing the temperature change of the wavelength conversion element, it is possible to alleviate the emission wavelength variation of the light source, and thereby provide a light source which is able to inhibit color deviation and the like when used as an image display device.

Moreover, it is possible to prevent the generation of condensation on the entrance/output plane and thereby alleviate the scattering of fundamental light and wavelength converted light and deterioration in the beam quality. Thus, the wavelength conversion element is preferably used at a temperature that is higher than the temperature of the installation environment.

With the control D, whether the TM shifted to a higher temperature side or lower temperature side than point A can be determined instantaneously. Consequently, in comparison to the foregoing control C, it is possible to reduce the control process and realize faster temperature control. It is thereby possible to considerably narrow the fluctuation width of the TM or the fundamental light path in the wavelength conversion element, and is superior in the following points when compared with the control C.

In other words, it is possible to considerably reduce the energy that is required for the heating or cooling to be performed for the temperature control of the wavelength conversion element. It is further possible to inhibit the wavelength variation of light emitted from the laser light source caused by the temperature change of the wavelength conversion element. Consequently, if the present laser light source is used in an image display device, it is possible to realize an image display device capable of suppressing color deviation. Moreover, if the present laser light source is used as a light source of a measuring device, it is possible to alleviate the measurement error caused by the wavelength variation.

Moreover, in the control D, the tolerable fluctuation range of the $\Delta T$ (hereinafter referred to as the "$\Delta T$ tolerance level") can be expanded according to the following method. As a result of expanding the $\Delta T$ tolerance level, it will be possible to use a less accurate temperature measuring means and a temperature adjustment means with a lower heating/cooling performance, and, therefore, further cost reduction is enabled. Moreover, as a result of expanding the tolerance level in the temperature measured with the thermistor, it is possible to omit the temperature adjustment means, and a further cost reduction of the wavelength conversion laser light source can be realized.

The configuration for expanding the $\Delta T$ tolerance level is now explained with reference to FIG. 22.

Figure 22:
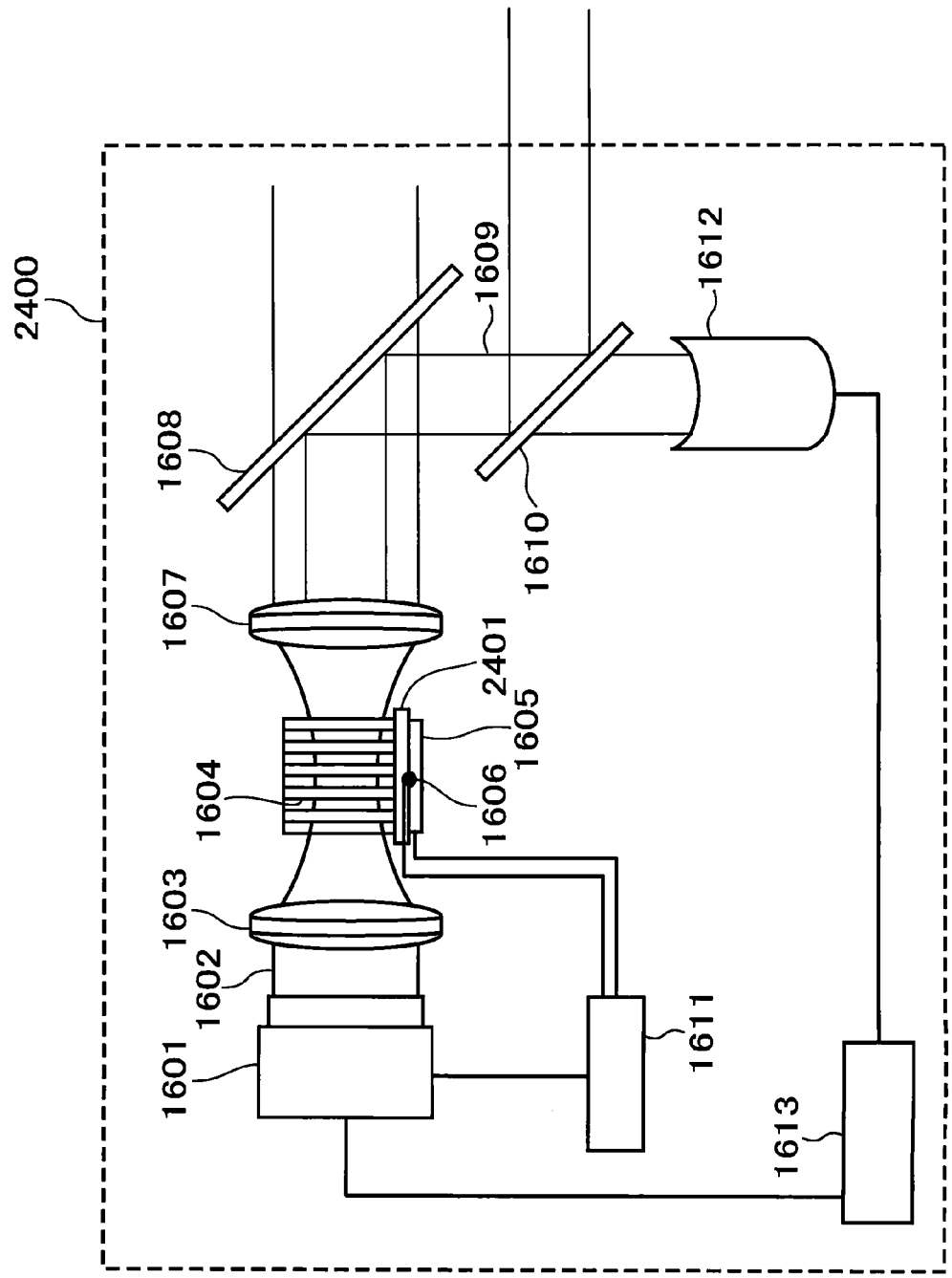
FIG. 22 is an explanatory diagram showing the schematic configuration of the wavelength conversion laser light source according to yet another embodiment of the present invention.

As with the wavelength conversion laser light source 2400 shown in FIG. 22, by adopting a configuration of absorbing a part of the fundamental light 1602 in the wavelength conversion element 1604 and comprising a thermal resistance moderator 2401 between the optical path of the fundamental light 1602 and the thermistor 1606 in the wavelength conversion element 1604, it is possible to expand the tolerance level capable of dealing with changes in the outside temperature of the wavelength conversion laser light source.

According to the foregoing configuration, a temperature difference will arise between the thermistor 1606 and the optical path of the fundamental light 1602 in the wavelength conversion element 1604 in proportion to the size of the fundamental light. Thus, in the graph of FIG. 23, as the amount of fundamental light increases the temperature will shift toward the low temperature side for the amount of the temperature difference in relation to the solid line 1002 showing a case where the thermal resistance moderator 2401 is not provided, and change to the curved line shown with the broken line 2501. Consequently, the inclination of the change in the wavelength conversion efficiency in relation to the change of the $\Delta T$ in cases where the $\Delta T$ is negative will become more gradual in comparison to the case where the $\Delta T$ is positive. In the foregoing case, the tolerance level of $\Delta T$ will expand if temperature control is performed so as to converge at point A'.

To put it differently, if the $\Delta T$ drops when the $\Delta T$ is negative, the absorption amount of the amount of fundamental light will increase and the temperature difference between the fundamental light path in the wavelength conversion element and the TM will also increase, and, therefore, the amount of temperature drop of the fundamental light path in the wavelength conversion element will become smaller in comparison to the amount of temperature drop of the TM.

Thus, the fluctuation width of the temperature of the fundamental light path in the wavelength conversion element will be narrower in comparison to the fluctuation width of the TM.

For example, when using a fundamental light source capable of emission up to 1.5 times the required amount of fundamental light when $\Delta T=0$, with the wavelength conversion laser light source that does not comprise the thermal resistance moderator 2401, constant light quantity control is possible in a range from the vicinity of $\Delta T=0.7°$ C. to $-0.7°$ C. Meanwhile, with a laser light source comprising the thermal resistance moderator 2401, constant light quantity control is possible in a range from the vicinity of $\Delta T=1°$ C. to $-1.9°$ C.

Here, as a method of expanding the $\Delta T$ tolerance level, a method of shortening the element length of the wavelength conversion element may be adopted. However, in the foregoing case, the wavelength conversion efficiency from the fundamental light to the wavelength converted light will deteriorate considerably.

Meanwhile, the configuration of this embodiment is more preferable than the method of shortening the element length with respect to the point that the effect of expanding the $\Delta T$ tolerance level is great without causing considerable deterioration in the wavelength conversion efficiency. Thus, it is possible to realize a wavelength conversion laser light source with lower power consumption.

In the configuration of this embodiment, preferably, the thermal resistance between the thermistor and the fundamental light path is increased.

Note that, as the method of expanding the temperature difference between the thermistor and the fundamental light path, there following methods may be adopted; namely setting the thermal conductivity of the thermal resistance moderator 2401 to a lower value, making the thermal resistance moderator 2401 thicker, increasing the absorption factor of the fundamental light 1602 in the wavelength conversion element 1604, and so on.

Figure 24:
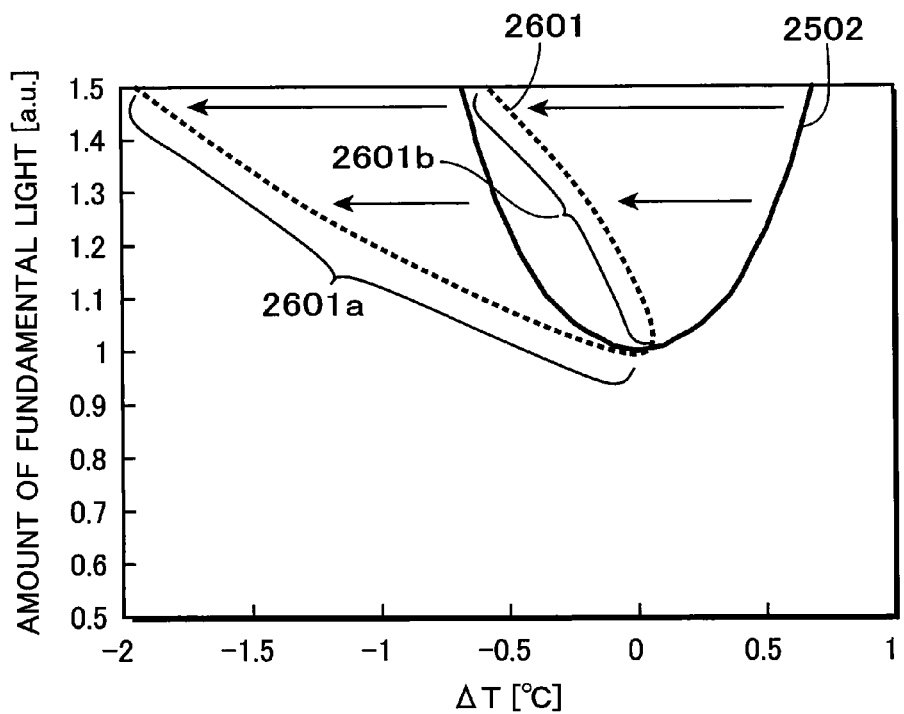
FIG. 24 is another plot diagram showing the temperature difference between the thermistor of the wavelength conversion laser light source and the fundamental light path and a state where the deviation $\Delta T$ shifts from the temperature in which the conversion efficiency from the fundamental light to harmonic light becomes maximum according to yet another embodiment of the present invention.

In the foregoing case, since the temperature difference between the thermistor and the fundamental light path can be expanded, as shown in FIG. 24, the inclination of the amount of fundamental light of the left curved line 2601a and the right curved line 2601b relative to the ΔT can both be made negative.

Moreover, if the ΔT is to be made constant, the ΔT includes two or more values of the amount of fundamental light capable of obtaining the same amount of wavelength converted light. Accordingly, the inclination of the amount of fundamental light of the left curved line 2601a and the right curved line 2601b relative to the ΔT can both be made negative.

In particular, for example, if a Fabry-Perot-type semiconductor laser resonator or solid laser is used as the fundamental light source, there are cases where the emission wavelength of the fundamental light instantaneously shifts and move from the left curved line 2601a to the right curved line 2601b. Nevertheless, with the configuration of this embodiment, since the inclination of the increase/decrease of the ΔT and the inclination of the increase/decrease in the amount of fundamental light are both negative, it is possible to inhibit a runaway of the temperature control.

Figure 25:
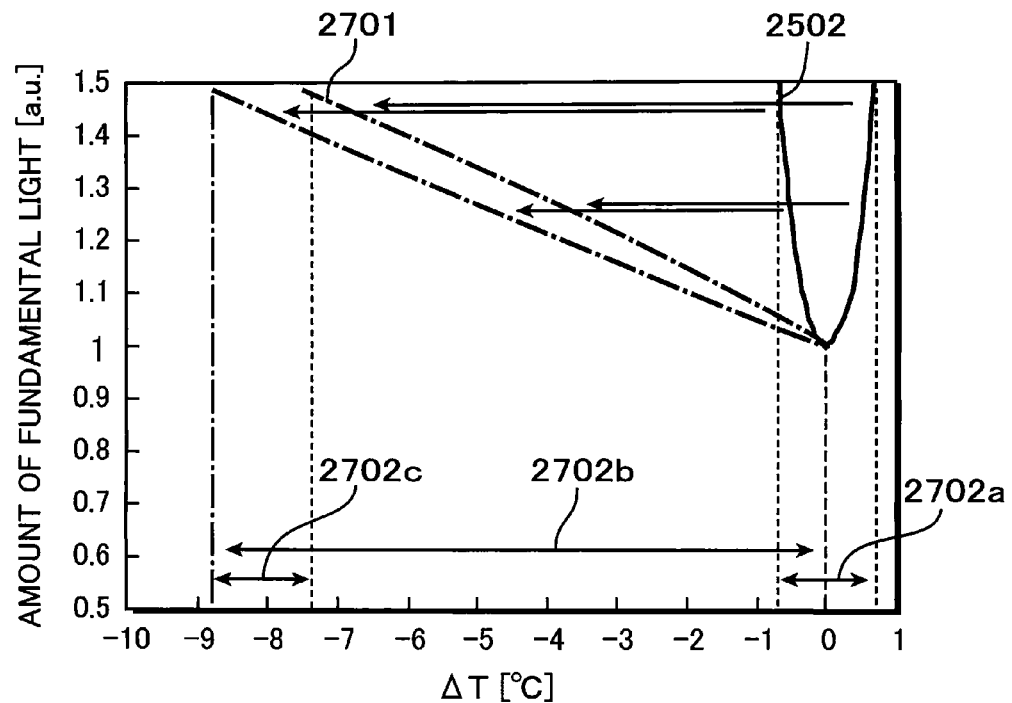
FIG. 25 is yet another plot diagram showing the temperature difference between the thermistor of the wavelength conversion laser light source and the fundamental light path and a state where the deviation $\Delta T$ shifts from the temperature in which the conversion efficiency from the fundamental light to harmonic light becomes maximum according to yet another embodiment of the present invention.

In addition, as a result of increasing the thermal resistance between the thermistor and the fundamental light path, as shown with the dash-dotted line 2701 of FIG. 25, the inclination of the increase/decrease in the amount of fundamental light relative to the ΔT can be made even more gradual.

If the maximum light quantity of the fundamental light source is 1.5 times the required amount of fundamental light when ΔT=0, in the example shown in FIG. 25, while the ΔT tolerable range 2702a in the configuration that does not comprises the thermal resistance moderator 2401 between the fundamental light path and the thermistor is approximately 1.4° C., if the thermal resistance moderator 2401 is provided, the ΔT tolerable range 2702b is expanded to approximately 8.9° C. Here, if the heating value based on fundamental light absorption is increased to further expand the thermal resistance between the thermistor and the fundamental light path, it goes without saying that the tolerable range can be expanded even further.

Moreover, as shown in FIG. 25, the temperature tolerable range 2702a in the case of not comprising the thermal resistance moderator 2401 will coincide with the ΔT difference 2702c capable of obtaining the intended amount of wavelength converted light with the amount of fundamental light as maximum (constant) in the case of comprising the thermal resistance moderator 2401. Thus, it is preferable to adjust the thermal resistance of the thermal resistance moderator 2401 so that the ΔT tolerable range 2702b becomes broader than the ΔT difference 2702c.

With the thermal resistance moderator 2401, the value obtained by dividing the thermal conductivity [W/m/K] by the thickness (distance between the wavelength conversion element and the thermistor) [m] is $15 \times 10^4$ or less.

In the foregoing case, it is possible to at least obtain the effect based on the configuration of comprising the thermal resistance moderator according to this embodiment, and the temperature characteristics can be made to be asymmetrical. Thus, the problem of the output becoming unstable upon executing the control D can be inhibited.

Moreover, with the thermal resistance moderator 2401, the value obtained by dividing the thermal conductivity [W/m/K] by the thickness (distance between the wavelength conversion element and the thermistor) [m] is $5 \times 10^4$ or less.

In the foregoing case, even if the emission wavelength of the fundamental light instantaneously shifts and changes from the left curved line to the right curved line, since the inclination of the increase/decrease of the ΔT and the inclination of the increase/decrease in the amount of fundamental light are both negative, it is possible to inhibit a runaway of the temperature control.

With the wavelength conversion laser light source 2400, the amount of excitation light that is required when the light quantity is constant in relation to the temperature change of the wavelength conversion element will change similarly to the amount of fundamental light (FIG. 18, FIG. 19) that is required when the light quantity is constant in the laser light source 1600. Thus, as a result of controlling the amount of excitation light in this embodiment in substitute for the amount of fundamental light, similar control is enabled. That is, as a result of monitoring the amount of excitation light that increases/decreases pursuant to changes in the ΔT, the temperature control of the wavelength conversion element can be performed while performing the constant light quantity control even with the configuration of the internal resonator-type wavelength conversion light source shown in the second embodiment.

The configuration of another wavelength conversion laser light source according to this embodiment is now explained with reference to FIG. 26.

The wavelength conversion laser light source 2800 is configured by the wavelength conversion element 1604 being disposed in the wavelength conversion laser light source 2800 via the thermal resistance moderator 2401, and temperature adjustment means such as the thermistor and Peltier element are omitted.

Figure 26:
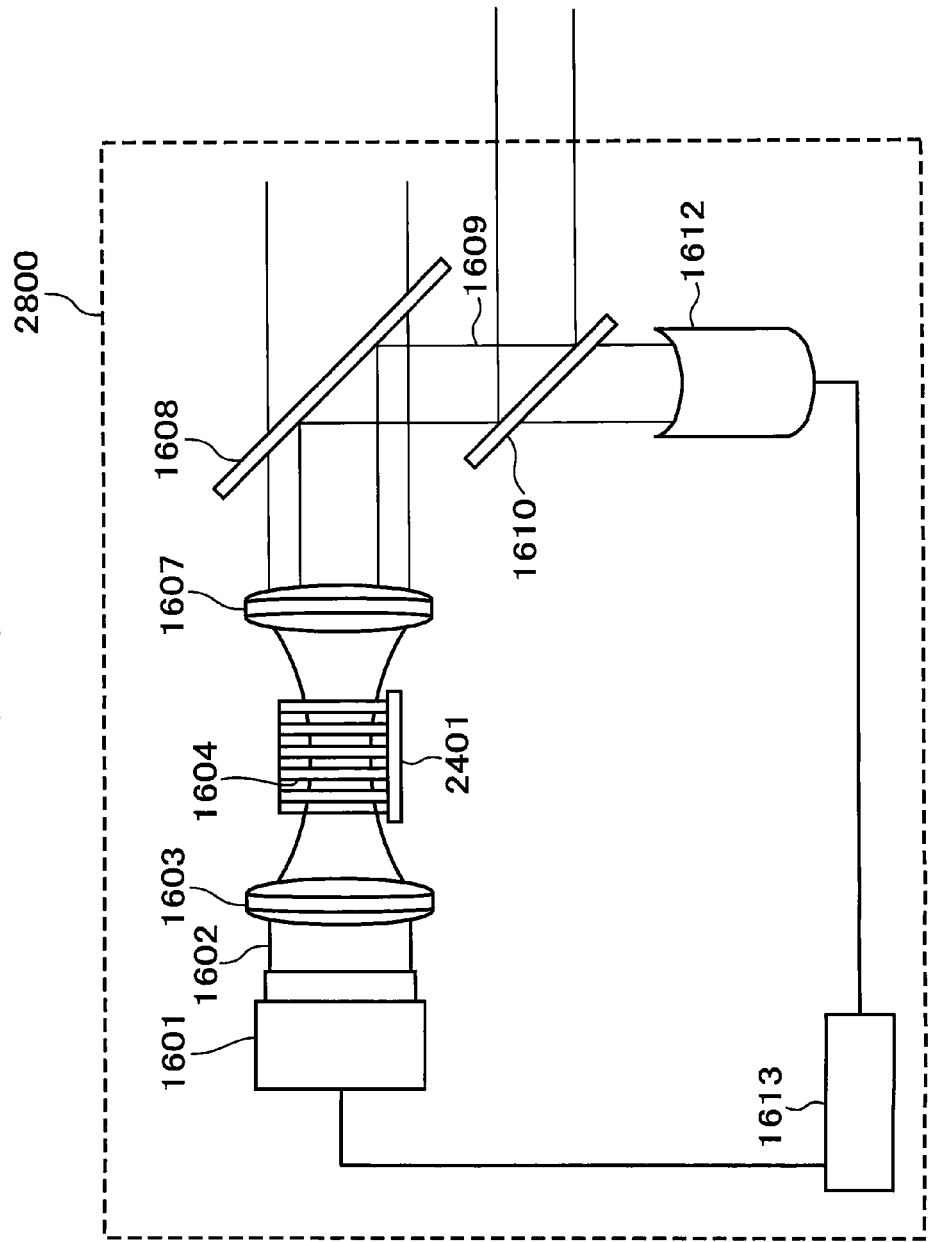
FIG. 26 is an explanatory diagram showing the schematic configuration of the wavelength conversion laser light source comprising the thermal resistance member according to yet another embodiment of the present invention.

In the configuration of FIG. 26, the outside temperature of the wavelength conversion laser light source 2800 is indicated as "T" and the temperature of the wavelength conversion laser light source 2800 in which the wavelength conversion efficiency becomes maximum is indicated as "$T_0$". Moreover, by substituting TM and $TM_0$ shown in the case of using the configuration of FIG. 16 with T and $T_0$, respectively, and setting the difference of T and $T_0$ as ΔT, the control C and the control D can be performed as with the configuration of FIG. 16.

Figure 23:
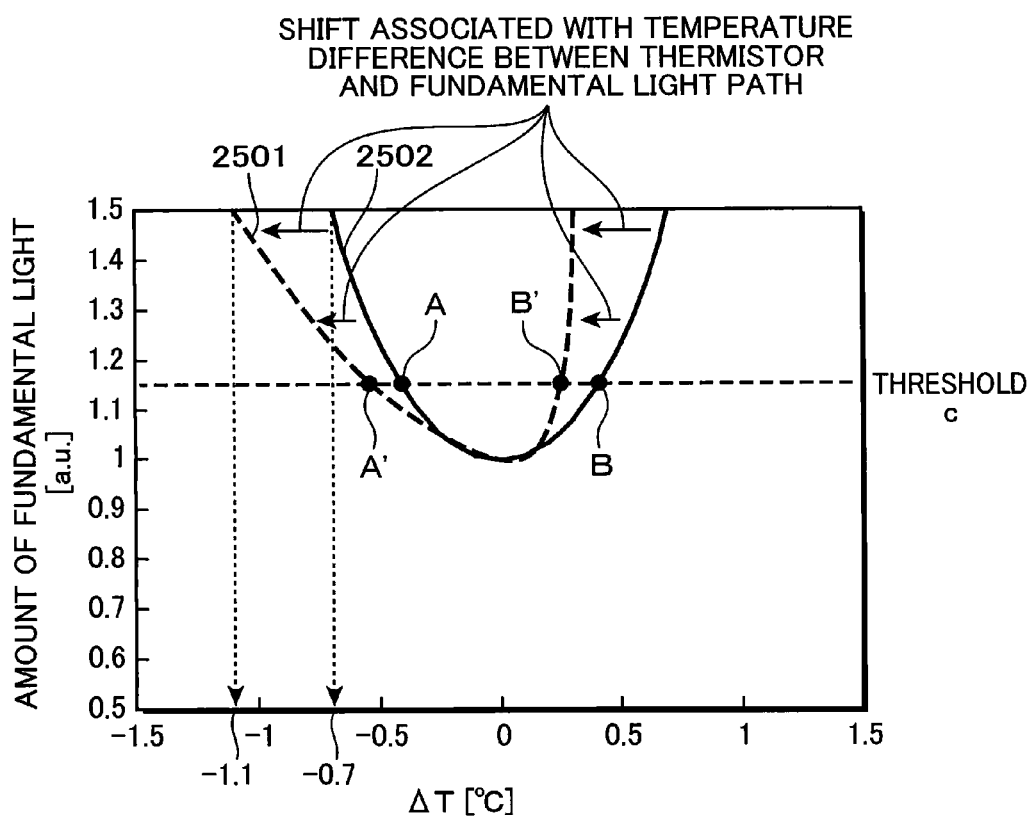
FIG. 23 is a plot diagram showing the temperature difference between the thermistor of the wavelength conversion laser light source and the fundamental light path and a state where the deviation $\Delta T$ shifts from the temperature in which the conversion efficiency from the fundamental light to harmonic light becomes maximum according to yet another embodiment of the present invention.

In the case of the wavelength conversion laser light source 2800 also, the amount of fundamental light that is required for keeping the output constant in relation to changes in the ΔT shows the same properties as shown in FIG. 21. Moreover, as a result of using the thermal resistance moderator 2401, the properties will be as shown in FIG. 23 to FIG. 25. That is, even if the temperature of the laser light source drops, it is possible to increase the amount of fundamental light and raise the temperature of the fundamental light path in relation to the laser light source, and this configuration is able to considerably alleviate the temperature drop of the fundamental light path.

Consequently, even if the temperature adjustment means is omitted and the laser light source temperature (current value) changes in a broad range of, for example, 0° C. to 60° C., it is possible to realize a wavelength conversion laser light source capable of performing constant light quantity control.

Figure 27:
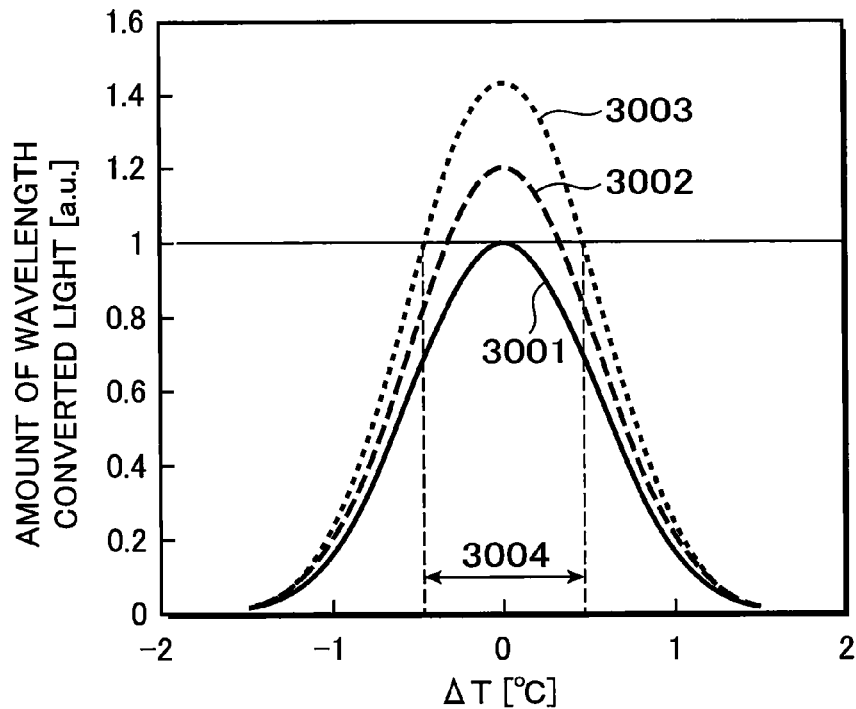
FIG. 27 is a plot diagram showing the relation between the amount of wavelength converted light of the wavelength conversion laser light source and the deviation $\Delta T$ from the temperature in which the conversion efficiency from the fundamental light to harmonic light becomes maximum according to yet another embodiment of the present invention.

As a result of increasing the thermal resistance between the fundamental light path and the thermistor and expanding the temperature difference based on the configuration of this embodiment, as shown in FIG. 27, the thermistor temperature tolerable range can be considerably broadened in comparison to conventional technology. This is because, even if the temperature at the position that is being measured by the thermistor drops, it is possible to considerably alleviate the temperature drop of the fundamental light path as a result of increasing the fundamental light and raising the temperature of the fundamental light path in relation to the thermistor. Similarly, in this embodiment, even if the temperature of the laser light source drops, it is possible to considerably alleviate the temperature drop of the fundamental light path as a result of increasing the amount of fundamental light and raising the temperature of the fundamental light path in relation to the laser light source.

In other words, with this embodiment, the relation shown in FIG. 25 to FIG. 27 can be satisfied by setting the difference between the thermistor temperature in which the wavelength conversion efficiency becomes maximum and the temperature monitored with the thermistor as $\Delta T$, and adjusting the thermal resistance between the fundamental light path and the laser light source using the thermal resistance moderator 2401.

For example, if the outside temperature of the wavelength conversion laser light source 2800 is 60° C., the temperature is designed so that the heating value and the thermal resistance between the two and the conversion efficiency of the wavelength conversion element becomes maximum to achieve a temperature difference of 120° C. between the outside temperature of the wavelength conversion laser light source 2800 and the fundamental light path. Based on this design, even if the outside temperature of the wavelength conversion laser light source 2800 is 0° C., the amount of fundamental light becomes 1.5 times the time that the wavelength conversion efficiency becomes maximum and the temperature difference between the outside temperature of the wavelength conversion laser light source 2800 and the fundamental light path becomes 180° C. That is, even if the outside temperature of the wavelength conversion laser light source 2800 fluctuates from 0° C. to 60° C., the temperature of the wavelength conversion element can be made roughly constant at 180° C.

Figure 29:
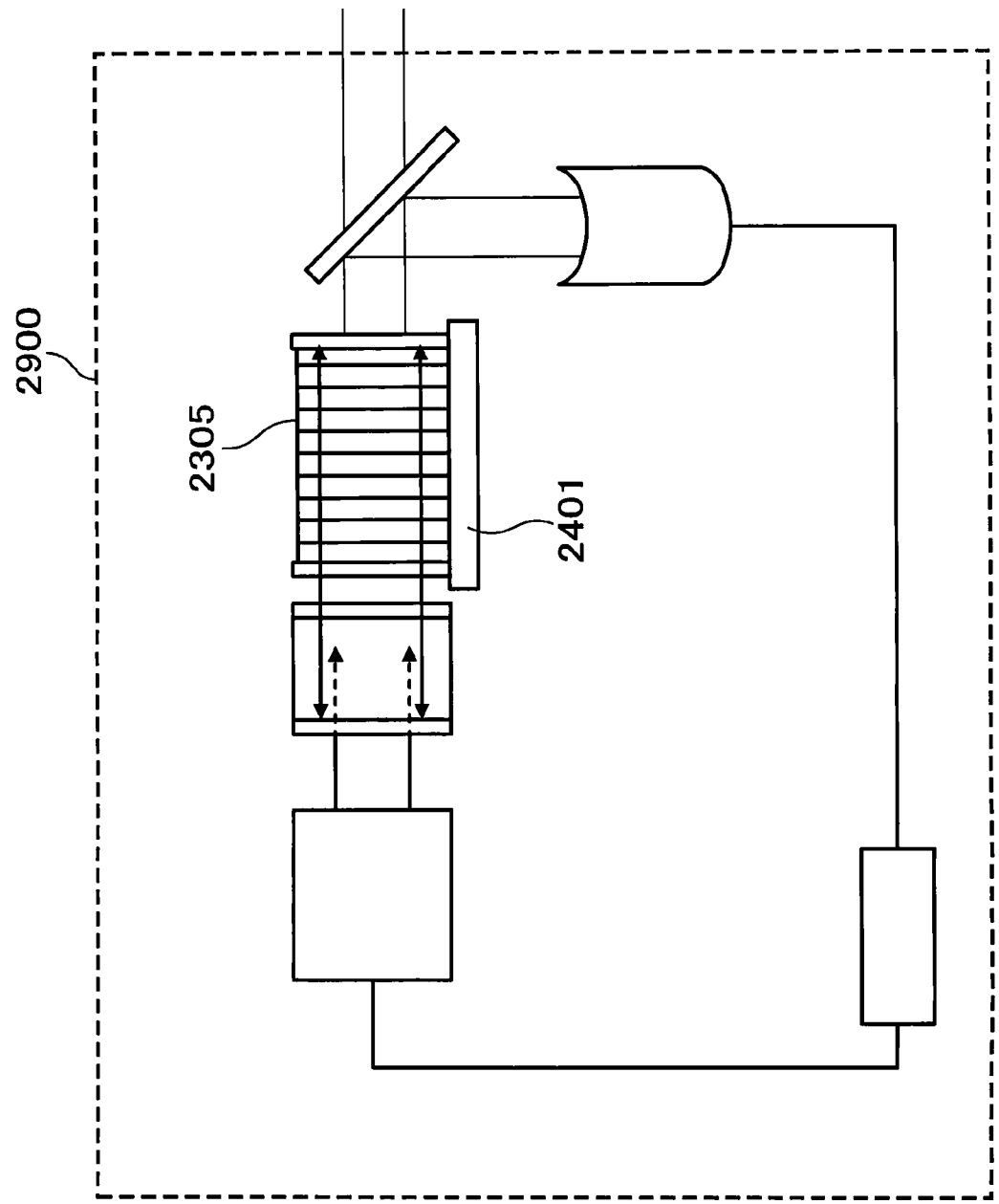
FIG. 29 is an explanatory diagram showing the schematic configuration of the wavelength conversion laser light source comprising the thermal resistance member according to yet another embodiment of the present invention.

As shown in FIG. 29, the laser light source 2900 according to this embodiment is configured by the wavelength conversion element 2305 being mounted directly on the laser light source 2900 across from the thermal resistance moderator 2401.

Moreover, the same effect as this embodiment can be obtained by substituting TM and $TM_0$ shown in the internal resonator configuration with T and $T_0$. That is, with this embodiment, by setting the difference of T and $T_0$ as $\Delta T$ and adjusting the thermal resistance between the fundamental light path and the laser light source using the thermal resistance moderator 2401, the relationship shown in FIG. 23 to FIG. 25 can be satisfied.

Moreover, with this embodiment, by comprising a heat transfer agent (substance with large thermal conductivity; for example, metal: aluminum (237 W/m/K), copper (390 W/m/K), silver (420 W/m/K) and the like) between the thermal resistance moderator and the wavelength conversion element, the contact area of the thermal resistance moderator and the wavelength conversion element can be increased, and the influence from the individual variation in the contact thermal resistance can be reduced. Consequently, the individual variation in the thermal resistance between the wavelength conversion element and the thermistor can also be alleviated.

As a result of comprising a heat transfer agent between the thermistor and the thermal resistance moderator, it is further possible to alleviate the individual variation in the thermal resistance between the wavelength conversion element and the thermistor. Since it is possible to inhibit the individual variation in the thermistor temperature in which the wavelength conversion efficiency becomes maximum, the yield and reliability of the wavelength conversion laser light source can be improved. Consequently, it is preferable to adopt a structure where a heat transfer agent is provided between the thermistor or the wavelength conversion element and the thermal resistance moderator.

The effect of disposing a thermal resistance moderator between the wavelength conversion element and the thermistor, or between the wavelength conversion element and the case of the wavelength conversion laser light source in a wavelength conversion laser light source for performing constant light quantity control as been described above. Nevertheless, the configuration of comprising a thermal resistance moderator between the wavelength conversion element and the thermistor or the laser light source according to this embodiment is not limited to the above, and can also be applied to cases of performing constant input control with a wavelength conversion laser light source having a similar configuration.

The effects thereof are described below.

FIG. 27 shows the amount of wavelength converted light in relation to the $\Delta T$ upon performing constant input control with a conventional wavelength conversion laser light source. In FIG. 27, 3001, 3002, 3003 are plot diagrams of the amount of wavelength converted light with the amount of fundamental light (or amount of excitation light; hereinafter referred to as the "amount of incident light") as the parameter. The relation of the $\Delta T$ and the amount of wavelength converted light in the case where the smallest amount of incident light (hereinafter referred to as the "minimum light quantity") in which the amount of wavelength converted light becomes 1 or more is shown with the solid line 3001, the case where it is 1.1 times the minimum light quantity is shown with the broken line 3002, and the case where it is 1.2 times the minimum light quantity is shown with the dotted line 3003.

As shown in FIG. 27, with a conventional wavelength conversion laser light source, for example, the range (3004) of the $\Delta T$ that is able to obtain the one or more amounts of wavelength converted light coincides with the range when the amount of incident light becomes maximum; that is, the curved line shown with the dotted line 3003 will coincide with the range where the amount of wavelength converted light is 1 or more, and become roughly 1° C. (0.5° C. to –0.5° C.).

Figure 28:
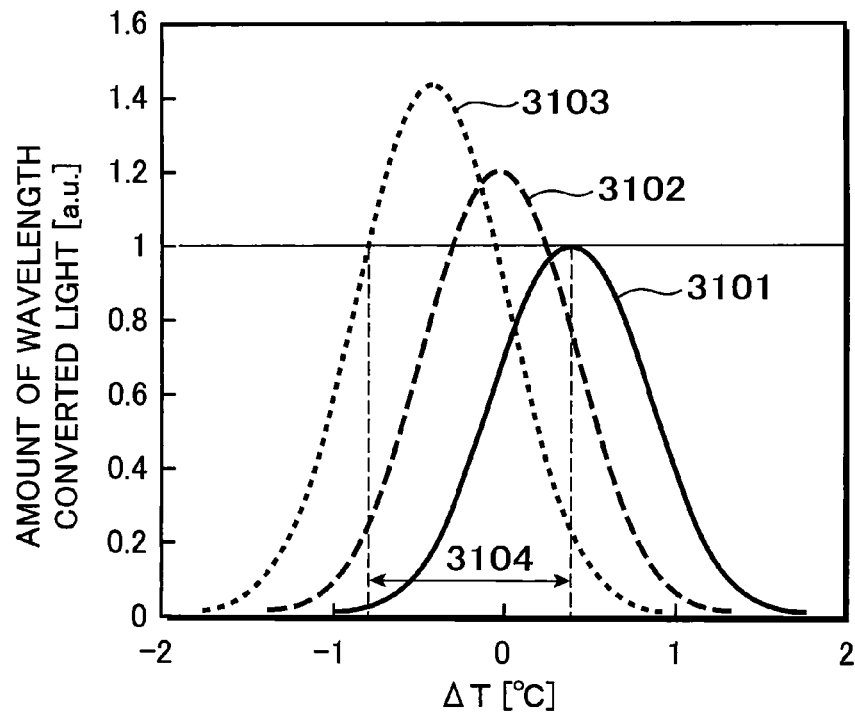
FIG. 28 is a plot diagram showing the relation between the amount of wavelength converted light of the wavelength conversion laser light source and the deviation $\Delta T$ from the temperature in which the conversion efficiency from the fundamental light to harmonic light becomes maximum according to yet another embodiment of present invention.

Meanwhile, FIG. 28 is a plot diagram showing the amount of wavelength converted light in relation to the $\Delta T$ in the case of performing constant input control with the wavelength conversion laser light source comprising the thermal resistance moderator 2401 between the wavelength conversion element and the thermistor, or between the wavelength conversion element and the case of the wavelength conversion laser light source.

In FIG. 28, the solid line 3101 shows the relation between the $\Delta T$ and the amount of wavelength converted light when the amount of incident light is a minimum light quantity. The broken line 3102 shows the relation between the $\Delta T$ and the amount of wavelength converted light when the amount of incident light is 1.1 times the minimum light quantity. The dotted line 3103 shows the relation between the $\Delta T$ and the amount of wavelength converted light when the amount of incident light is 1.2 times the minimum light quantity.

If the amount of incident light is increased, the temperature difference between the wavelength conversion element and the thermistor or the case of the wavelength conversion laser light source will increase.

Thus, as shown in FIG. 28, the temperature in which the wavelength conversion efficiency becomes maximum as the amount of incident light increases will shift to the low temperature side. Consequently, with the wavelength conversion laser light source comprising the thermal resistance moderator, the range 3104 of ΔT in which the amount of wavelength converted light shown in FIG. 28 becomes 1 or more is approximately 1.6° C. (0.1° C. to −1.5° C.), which has expanded roughly 1.6 times in comparison to a conventional wavelength conversion laser light source.

That is, as shown in FIG. 28, in a certain ΔT, the broken line 3102 with a smaller amount of incident light will have a greater amount of wavelength converted light in comparison to the dotted line 3103 with a larger amount of incident light.

Similarly, in a separate ΔT, it is preferably to provide the thermal resistance moderator 2401 between the wavelength conversion element and the thermistor or between the wavelength conversion element and the laser light source and adjust the thermal resistance so that the amount of wavelength converted light of the dotted line 3101 will become greater than the broken line 3102. In the foregoing case, since the temperature difference between the wavelength conversion element and the thermistor, or between the wavelength conversion element and the case of the wavelength conversion laser light source will increase, the range of ΔT in which the amount of wavelength converted light of a predetermined light quantity or more can be increased. That is, the average output can be made constant in a wider temperature range.

In addition, if a certain level of light quantity becomes necessary while using the constant input control, since the wavelength conversion laser light source that exhibits the foregoing effects can realize cost reduction, it can be preferably used in a laser pointer or the like.

Moreover, if one or more amounts of wavelength converted light are obtained, it is preferably to perform pulse driving.

In the foregoing case, even if there are more than one peak light quantity, the pulse duty (pulse oscillation time/pulse cycle) can be adjusted so that there will be one average light quantity of the wavelength converted light.

When using a laser pointer or an image display device, it is desirable to perform pulse driving so that the output flickering is not visible to the human eye, and the cycle is preferably at least 60 Hz or higher. In the foregoing case, it is possible to realize a wavelength conversion laser light source with a constant average output in a wide temperature range.

As a result of adopting the foregoing control method, the average output can be made constant in a broad temperature range. Thus, it is possible to reduce the output margin of the fundamental light (margin of the input current value), and the effect of being able to downsize and lower the power consumption of the wavelength conversion laser light source can be achieved with a simple control.

Fourth Embodiment

Another embodiment of the present invention is now explained with reference to FIG. 30 to FIG. 32.

Figure 30:
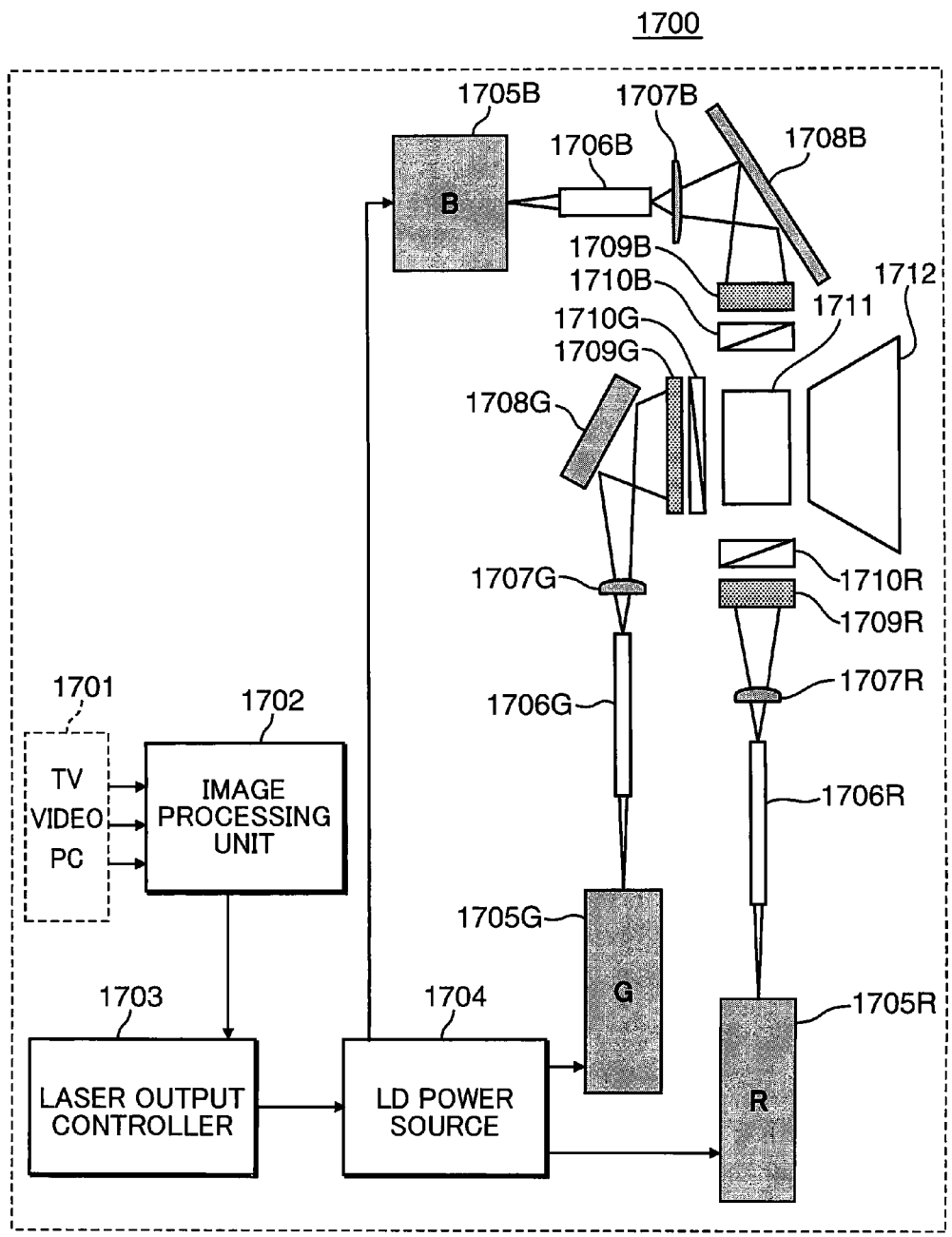
FIG. 30 is an explanatory diagram showing the schematic configuration of the projector (projection display) applying the wavelength conversion laser light source according to an embodiment of the present invention.

FIG. 30 shows a schematic diagram of the optical engine of the projector system using the laser proposed in the first to third embodiments as the light source. The two dimensional image display device 1700 of this embodiment is an example of applying the wavelength conversion laser light source of each of the first to third embodiments to the optical engine of a three-panel liquid crystal projector. FIG. 31 is a schematic diagram showing the configuration of the liquid crystal display applying the wavelength conversion laser light source of each of the first to third embodiments. FIG. 32 is a schematic diagram showing a configuration of the laser light source with a fiber applying the wavelength conversion laser light source of each of the first to third embodiments.

The two dimensional image display device 1700 includes an image processing unit 1702, a laser output controller (controller) 1703, an LD power source 1704, red, green, blue laser light sources 1705R, 1705G, 1705B, beam forming rod lenses 1706R, 1706G, 1706B, relay lenses 1707R, 1707G, 1707B, folding mirrors 1708G, 1708B, two dimensional modulation elements 1709R, 1709G, 1709B for displaying images, polarizers 1710R, 1710G, 1710B, a multiplexing prism 1711, and a projection lens 1712.

The green laser light source 1705G is controlled with the laser output controller 1703 and the LD power source 1704 for controlling the output of the green light source.

The laser beam from each of the light sources (red, green, blue laser light sources 1705R, 1705G, 1705B) is shaped into a rectangle with the beam forming rod lenses 1706R, 1706G, 1706B, and thereafter passes through the relay lenses 1707R, 1707G, 1707B and irradiates two dimensional modulation elements 1709R, 1709G, 1709B of the respective colors. The images of the respective colors that were modulated into two dimensions are multiplexed with the multiplexing prism 1711, and the image is displayed by being projected on a screen with the projection lens 1712.

Moreover, the green laser light source 1705G shall be a system in which the laser resonator is closed in the fiber. It is thereby possible to inhibit the temporal reduction of output or the output fluctuation caused by the increase in the resonator loss due to outside dust or misalignment of the reflecting surface.

The image processing unit 1702 plays the role of generating a light quantity control signal for changing the output of the laser beam according to the brightness information of the visual signal 1701 that is input from the TV, video device, PC or the like, and sending such light quantity control signal to the laser output controller 1703. As a result of controlling the light quantity according to the brightness information as described above, the contrast can be improved.

In the foregoing case, the laser output controller 1703 may also adopt a control method (PWM control) of changing the average light quantity by pulse-driving the laser and changing the duty ratio of the illumination time of the laser (value of illumination time/(illumination time+non-illumination time)).

Moreover, the green light source used in the projector system may be configured to emit a green laser beam with a wavelength of 510 nm to 550 nm. According to this configuration, it is possible to obtain a green laser emission with high visibility, and realize a color expression that is even closer to the natural color as a display with favorable color reproducibility.

Moreover, the two dimensional image display device of this embodiment comprises a screen, a plurality of laser light sources, and a scanning unit for scanning the laser light source, the laser light sources are configured light sources for respectively emitting at least red, green and blue lasers, and, among the laser light sources, at least the green light source may use one of the wavelength conversion laser light sources shown in the first to third embodiments described above.

According to this configuration, it is possible to obtain a green laser emission with high visibility, and realize a color expression that is even closer to the natural color as a display with favorable color reproducibility.

In addition to this kind of mode of projecting images from the back of the screen (rear projection display: FIG. 30), it is also possible to adopt a mode of a two dimensional image display device with a front projection configuration.

It goes without saying that, as the spatial modulation element, used may be a two dimensional modulation element employing a transmissive liquid crystal or reflective liquid crystal, a galvano mirror or a mechanical micro switch MEMS (Micro Electro Mechanical System) as represented by a DMD (Digital Mirror Device).

Note that, when propagating the harmonic with an optical fiber with a reflective spatial modulation element as with this embodiment or a light conversion element such as the MEMS or galvano mirror in which the influence of the polarization component to the light modulation characteristics is minimal, there is no need to use a polarization maintaining fiber such as a PANDA (polarization maintaining and absorption reducing) fiber. Nevertheless, upon using a two dimensional modulation device using a liquid crystal, since the modulation characteristics and the polarization properties are closely related, it is preferable to use a polarization maintaining fiber.

Moreover, as shown in FIG. 31A and FIG. 31B, as one mode of a display using laser as its light source, it is also possible to realize a liquid crystal display 1800 including a laser light source 1802, a control unit 1803, a light guiding member 1804 for converting the laser light source from a point light source to a line light source, a light guiding plate member 1808 for converting the light source from a line light source to a plane light source and illuminating the entire liquid crystal panel, a polarization plate/diffusion member 1809 for aligning the polarization direction or eliminating the illumination irregularities, and a liquid crystal panel 1810. That is, the wavelength conversion laser light source shown in the first, second and third embodiments can e used as the backlight light source of a liquid crystal display.

Figure 32:
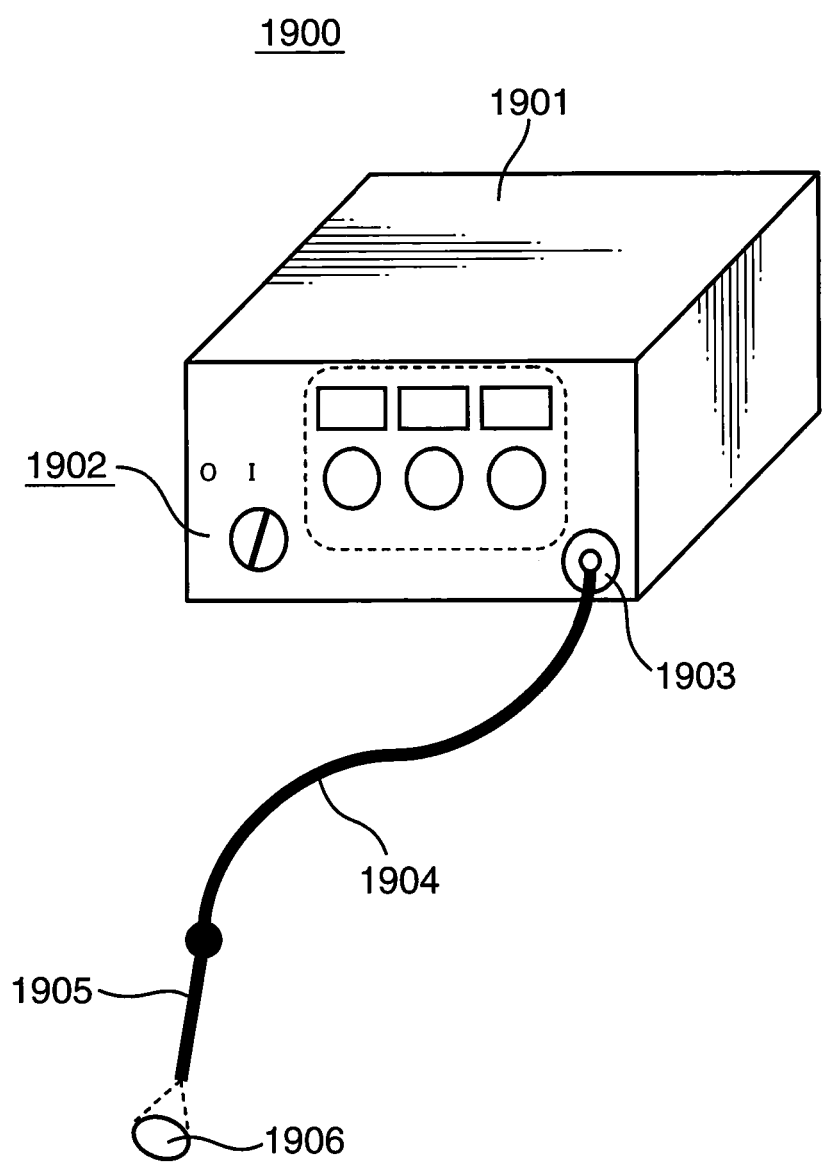
FIG. 32 is an explanatory diagram showing the schematic configuration of the medical light source applying the wavelength conversion laser light source according to an embodiment of the present invention.

Moreover, as shown in FIG. 32, the laser device comprising the wavelength conversion laser light source of the present invention shown in the first to third embodiments can also be used as a laser light source 1900 with a fiber for use in surgery. This laser light source 1900 with a fiber for use in surgery comprises a laser light source, a control unit for controlling the output from the laser light source, an output setting unit 1902 for setting the output, an output connector 1903 for outputting the laser light source, a delivery fiber 1904 for guiding the laser beam to the target irradiation area, and a hand piece 1905.

As a result of applying the wavelength conversion laser light source to a laser display (image display device), a laser liquid crystal backlight, or a surgical laser light source, the output control stability of the light source can be improved, and effects such as being able to expand the operational temperature of devices and improving the reliability can be achieved.

Note that the configurations shown in the respective embodiments of the present invention are merely examples, and may be variously modified within a range that does not deviate from the gist of this invention.

As the wavelength conversion element used in the respective embodiments, a quasi phase matching $LiNbO_3$ element with a periodically poled structure is used, but the embodiments are not limited thereto, a quasi phase matching wavelength conversion element formed with a periodically poled structured in the $LiTaO_3$ or $KTiOPO_4$ crystal also with an oxygen octahedral structure as its basic structure can also be used. Moreover, as generally performed, it is also possible to use an element using a crystal substrate which inhibits changes in the light refractive index by adding Mg, Ce or the like to the crystal system.

With a quasi phase matching wavelength conversion element formed with a periodically poled structured, although the polarization direction of the incoming fundamental light and the polarization direction of the outgoing harmonic light coincide, since it is sensitive to the fluctuation in the temperature of the wavelength conversion element and the variation in the fundamental wavelength, the output change caused by disturbance to the respective configurations can be detected and controlled for each factor by adopting the configuration and control method proposed above. Thus, a considerable effect of being able to improve the temporal stability of the harmonic output can be achieved.

Note that, in addition to the lithium niobate and lithium tantalite-based crystals used in the respective embodiments of the present invention, a nonlinear optical crystal with an oxygen octahedral structure as its basic structure; for example, a potassium titanyl phosphate ($KTiOPO_4$:KTP) crystal or the like, is able to form a periodically poled structure, and, although the absorption factor of visible light is large at 0.01 $cm^{-1}$ or more, the absorption factor of infrared light is low at roughly 0.002 $cm^{-1}$ to 0.004 $cm^{-1}$.

With the configuration of the laser light source subject to the constant light quantity control of the first to fourth embodiments, the light quantity of the second harmonic as the visible light is constant and the amount of absorption is also constant. Thus, the effect of the present invention cannot be obtained due to the generation of heat caused by the absorption of the second harmonic. Thus, it is preferable to use a material in which the absorption factor of infrared light has been increased. The temperature difference between the fundamental light path in the wavelength conversion element and the thermistor is thereby increased, and the $\Delta T$ tolerance level will increase even further. If the $\Delta T$ tolerance level is wide at approximately several ten ° C., it is possible to omit the temperature controlling means of the wavelength conversion element and realize a laser light source that is free of temperature control. Moreover, since the heating and cooling of the fundamental light path portion can be adjusted even faster, it is possible to realize a laser light source with a stable temperature and a stable wavelength that is output. Thus, as a result of using this laser light source, it is possible to realize an image display device with minimal color deviation and a measuring device with minimal measurement error caused by wavelength variation. With a (quasi phase matching) wavelength conversion element in which a periodically poled structure is formed in a nonlinear optical crystal, it has been discovered based on independent investigation that the absorption factor of the infrared light (wavelength 800 nm to 1800 nm) increases if a heat cycle is performed upon disposing a non-insulating body on the plane that intersects with the polarizing direction where the polarization inverted wall (boundary where the polarizing direction switches positions) is exposed.

For example, with a lithium niobate-based quasi phase matching wavelength conversion element, as a result of coating the plane that intersects with the polarizing direction with a conductive coating material, coating material A with electrical resistivity of $1 \times 10^8$ $\Omega \cdot cm$, coating material B with electrical resistivity of $2 \times 10^{11}$ $\Omega \cdot cm$, $SiO^2$ film obtained by RF sputtering, and $SiO^2$ film formed by CVD and performing 100 heat cycles of 0 to 80° C., respectively, as shown in Table 1, the absorption factor of infrared light increases by performing the heat cycle in cases of using a non-insulating coating material with electrical resistivity of $1 \times 10^8$ $\Omega \cdot cm$ or less. Moreover, a DC drift occurred with the $SiO^2$ film obtained by RF sputtering, and the effect of increasing the absorption factor of infrared light has also been achieved. Moreover, even if the heat cycle is 100 cycles or less, there is an effect of increasing the infrared light absorption. Consequently, an effect is yielded in that the average output can be made constant in a wide temperature range.

As a method of increasing the infrared light absorption in a nonlinear optical crystal with an oxygen octahedral structure, there are other methods of adding an additive or the like, but it is preferable to adopt the method that is proposed in this embodiment since the uniformity of the periodically poled structure which is essential in preparing a quasi phase matching wavelength conversion element is inferior with such other methods. The method of increasing the absorption factor of the infrared light of this embodiment enables the treatment for increasing the absorption factor of the infrared light after forming the periodically poled structure and in a state of the quasi phase matching wavelength conversion element. Thus, the periodically poled structure can be formed easily and this is a more preferable method.

As described above, the wavelength conversion laser light source according to one aspect of the present invention includes: a fundamental light source for outputting fundamental light; a wavelength conversion element with a nonlinear optical effect for converting the fundamental light into harmonic light of a different wavelength; a first optical receiver for receiving light of a specific polarization direction contained in the fundamental light output from the fundamental light source and converting an amount of light thereof into an electrical signal; a second optical receiver for receiving the harmonic light output from the wavelength conversion element and converting an amount of light thereof into an electrical signal; a temperature holding unit for holding a temperature of the wavelength conversion element constant; a fundamental light control unit for performing first control of controlling an amount of light of the fundamental light output from the fundamental light source based on the electrical signal from the second optical receiver, and second control of controlling an amount of light of the fundamental light based on the electrical signal from the first optical receiver; and a temperature control unit for performing third control of controlling a holding temperature of the temperature holding unit based on the electrical signal from the second optical receiver.

As a result of intense study by the present inventors, it has been discovered for the first time that changes in the polarization component of fundamental light considerably affects the output variation of harmonic light. Thus, this wavelength conversion laser light source is configured to receive light of a specific polarization direction contained in the fundamental light output from the fundamental light source with a first optical receiver and converting the light quantity thereof into an electrical signal, and controlling the amount or wavelength of the fundamental light output from the fundamental light source with the fundamental light control unit based on the foregoing electrical signal. Since it is thereby possible to appropriately adjust the fundamental light according to changes in the polarization component of the fundamental light, a wavelength conversion laser light source capable of performing stable and efficient wavelength conversion can be realized.

In addition, the first control for stabilizing the harmonic light is performed by receiving the amount of harmonic light with the second optical receiver and performing feedback control of the amount of fundamental light. Moreover, the second control for stabilizing the fundamental light in the polarization direction which contributes to the wavelength conversion is performed by receiving light of a specific polarization direction contained in the fundamental light with the first optical receiver and performing feedback control to the amount of fundamental light. The further stabilization of the harmonic light is thereby sought. In addition, the third control of causing the temperature of the wavelength conversion element to appropriately adjust to changes in the wavelength of the fundamental light is performed by receiving the amount of harmonic light with the second optical receiver and performing feedback control to the holding temperature of the temperature holding unit. As a result of executing the first control to third control described above, a wavelength conversion laser light source capable of performing stable and efficient wavelength conversion can be realized.

In the foregoing configuration, preferably, the first control to third control are intermittently implemented by the fundamental light control unit and the temperature control unit so that implementation timing of the first control and implementation timing of the second control and the third control do not overlap.

The first control can be performed in a short period of time in comparison to the second control and the third control. In particular, with the third control, since a parameter with a large time constant of temperature is used for the control, the time required for the control become longer in comparison to the first control. Thus, as with the foregoing configuration, time sharing control so that the implementation timing of the first control and the implementation timing of the second control and the third control will not overlap is intermittently performed. It is thereby possible to stabilize the fundamental light in the polarization direction which contributes to the wavelength conversion (second control) and additionally adjust the temperature of the wavelength conversion element according to the wavelength variation of the fundamental light (third control) at a timing that does not overlap with the implementation timing of the first control while appropriately controlling the amount of fundamental light with the amount of harmonic light in the timing of the first control as the reference. Thus, a wavelength conversion laser light source capable of performing further stable and efficient wavelength conversion can be realized.

In the foregoing configuration, preferably, the temperature control unit includes a temperature measuring part for measuring a temperature of the wavelength conversion element, and a temperature controller for supplying current to the temperature holding unit and controlling the holding temperature of the temperature holding unit constant based on a measurement signal from the temperature measuring part.

The third control can be performed accurately by configuring the temperature control unit as described above.

In the foregoing configuration, preferably, the temperature controller adjusts the holding temperature of the temperature holding unit by performing wobbling at $\pm\Delta t$ (° C.) centered around a center temperature Tc (° C.), and if the amount of light of the harmonic light is P (Tc+$\Delta t$), P (Tc) and P (Tc−$\Delta t$), respectively, when the temperature of the wavelength conversion element is Tc+$\Delta t$ (° C.), Tc (° C.) and Tc−$\Delta t$ (° C.), current is supplied to the temperature holding unit so that Tc is raised if P (Tc−$\Delta t$)<P (Tc)<P (Tc+$\Delta t$), Tc is maintained if P (Tc+$\Delta t$)<P (Tc)>P (Tc−$\Delta t$), and Tc is lowered if P (Tc−$\Delta t$)>P (Tc)>P (Tc+$\Delta t$).

The third control can be easily and accurately performed by the temperature controller performing wobbling according to the foregoing configuration.

In the foregoing configuration, preferably, a range of the $\Delta t$ in which the temperature controller performs wobbling is 0.1° C. to 0.2° C.

In the foregoing case, the temperature controller is able to perform appropriate wobbling.

In the foregoing configuration, preferably, a period of the wobbling performed by the temperature controller is 5 seconds to 10 seconds.

In the foregoing case, the temperature controller is able to perform appropriate wobbling.

In the foregoing configuration, preferably, the wavelength conversion laser light source further includes: a second optical receiver for receiving the harmonic light output from the wavelength conversion element and converting an amount of light thereof into an electrical signal; a temperature holding unit for holding a temperature of the wavelength conversion element constant; and the fundamental light control unit for performing first control of controlling an amount of light of the fundamental light output from the fundamental light source based on the electrical signal from the second optical receiver, second control of controlling an amount of light of the fundamental light based on the electrical signal from the first optical receiver, and third control of controlling a wavelength of the fundamental light based on the electrical signal from the second optical receiver.

According to the foregoing configuration, the first control for stabilizing the harmonic light is performed by receiving the amount of harmonic light with the second optical receiver and performing feedback control of the amount of fundamental light. Moreover, the second control for stabilizing the fundamental light in the polarization direction which contributes to the wavelength conversion is performed by receiving light of a specific polarization direction contained in the fundamental light with the first optical receiver and performing feedback control to the amount of fundamental light. The further stabilization of the harmonic light is thereby sought. In addition, the third control of dealing with a situation where the temperature of the wavelength conversion element that is held at a constant temperature deviates from the optimal wavelength of the fundamental light, which is caused by changes in the wavelength of the fundamental light, is performed. In other words, the third control of stabilizing the wavelength of the fundamental light is performed by receiving the amount of harmonic light with the second optical receiver and performing feedback control to the wavelength of the fundamental light. As a result of executing the first control to third control described above, a wavelength conversion laser light source capable of performing stable and efficient wavelength conversion can be realized.

In the foregoing configuration, preferably, the fundamental light control unit intermittently implements the first control to third control so that implementation timing of the first control and implementation timing of the second control and the third control do not overlap.

As with the foregoing configuration, by intermittently performing time sharing control so that the implementation timing of the first control and the implementation timing of the second control and the third control will not overlap, it is possible to stabilize the fundamental light in the polarization direction which contributes to the wavelength conversion (second control) and additionally stabilize the wavelength of the fundamental light (third control) at a timing that does not overlap with the implementation timing of the first control while appropriately controlling the amount of fundamental light with the amount of harmonic light in the timing of the first control as the reference. Thus, a wavelength conversion laser light source capable of performing further stable and efficient wavelength conversion can be realized.

In the foregoing configuration, preferably, the fundamental light source includes a semiconductor laser for emitting excitation light, a double clad rare earth-added fiber for absorbing the excitation light emitted from the semiconductor laser and emitting the fundamental light, a narrow reflection band fiber grating and a broad reflection band fiber grating disposed at either end of the double clad rare earth-added fiber, and for deciding a wavelength of the fundamental light emitted from the fundamental light source, and an actuator for applying stress to the narrow reflection band fiber grating, and the wavelength of the fundamental light changes based on the stress applied by the actuator to the narrow reflection band fiber grating.

In the foregoing case, the third control can be performed easily and accurately by using the fundamental light source of the foregoing configuration.

In the foregoing configuration, preferably, the fundamental light source is a distributed-feedback semiconductor laser light source including a distributed-feedback mirror part, and the wavelength of the fundamental light changes by changing current that is incident into the distributed-feedback mirror part.

In the foregoing case, the third control can be performed easily and accurately by using the fundamental light source of the foregoing configuration.

In the foregoing configuration, preferably, the fundamental light source includes a distributed-feedback semiconductor laser light source with a distributed-feedback mirror part for generating light which becomes a source of the fundamental light, an excitation light source for emitting excitation light, and a laser medium for increasing intensity of the light emitted by the distributed-feedback semiconductor laser light source by absorbing the excitation light, and the wavelength of the fundamental light changes by changing current that is incident into the distributed-feedback mirror part.

The third control can be performed easily and accurately by using the fundamental light source of the foregoing configuration.

In the foregoing configuration, preferably, the wavelength conversion laser light source further includes: a temperature control unit for controlling a holding temperature of the temperature holding unit, and the temperature control unit includes a temperature measuring part for measuring a temperature of the wavelength conversion element, and a temperature controller for supplying current to the temperature holding unit and controlling the holding temperature of the temperature holding unit constant based on a measurement signal from the temperature measuring part.

In the foregoing case, the temperature of the wavelength conversion element can be kept constant with certainty.

In the foregoing configuration, preferably, a thermal resistance moderator for providing a difference between a temperature of the wavelength conversion element and a temperature measured with the temperature measuring part is provided between the wavelength conversion element and the temperature measuring part.

In the foregoing case, the tolerance level capable of responding to changes in the outside temperature of the wavelength conversion laser light source can be broadened.

In the foregoing configuration, preferably, a heat transfer agent for equalizing contact thermal resistance between members is provided between the thermal resistance moderator and the wavelength conversion element, a case of the wavelength conversion laser light source, or the temperature measuring part.

In the foregoing case, the tolerance level capable of responding to changes in the outside temperature of the wavelength conversion laser light source can be broadened.

In the foregoing case, the contact area of the thermal resistance moderator and the wavelength conversion element can be increased, and influence from the individual variation in the contact thermal resistance can be reduced.

In the foregoing configuration, preferably, the wavelength conversion element is configured from an optical crystal primarily having an oxygen octahedral structure as the basic structure thereof, and the optical crystal is formed with a periodically poled structure for matching phases of the fundamental light and the harmonic light.

The wavelength conversion element of the foregoing configuration is optimal for the present wavelength conversion laser light source.

In the foregoing configuration, preferably, a plane, which is orthogonal to a polarizing direction of the periodically poled structure, of the wavelength conversion element is coated with a coating material with electrical resistivity of $1\times10^8$ $\Omega\cdot cm$ or more.

In the foregoing case, with the wavelength conversion element coated with the coating material of the foregoing configuration, the absorption factor of infrared light will increase, and the temperature adjustment of the fundamental light path portion of the wavelength conversion element is facilitated.

In the foregoing configuration, preferably, the second control is selectively executed if a phase of the electrical signal output from the first optical receiver and a phase of the electrical signal output from the second optical receiver are synchronous, and the third control is selectively executed if a phase of the electrical signal output from the first optical receiver and a phase of the electrical signal output from the second optical receiver are asynchronous.

As with the foregoing configuration, as a result of selectively executing the second control and the third control depending on whether the phase of the electrical signal output from the first optical receiver and the phase of the electrical signal output from the second optical receiver are synchronized, appropriate control is enabled. In other words, if both of the foregoing phases are synchronized, it is possible to assume that the factor of the harmonic light output fluctuation is in the fundamental light source and, therefore, the second control of stabilizing the fundamental light in the polarization direction which contributes to the wavelength conversion is effective. Meanwhile, if both of the foregoing phases are asynchronous, it is possible to assume that the factor of the harmonic light output fluctuation is a result of the wavelength of the fundamental light not being appropriate for the temperature of the wavelength conversion element and, therefore, the third control of adjusting the temperature of the wavelength conversion element or adjusting the wavelength of the fundamental light is effective. Based on the control of the foregoing configuration, a wavelength conversion laser light source capable of performing further stable and efficient wavelength conversion can be realized.

The projection display device according to another aspect of the present invention includes: the wavelength conversion laser light source according to any one of the foregoing configurations; a two dimensional light modulation element for receiving the harmonic light emitted from the wavelength conversion laser light source and forming an image; and a projection lens for projecting the image formed with the two dimensional modulation element.

According to the foregoing configuration, a high definition and low power consumption projection display device can be realized by using the foregoing wavelength conversion laser light source capable of performing stable and efficient wavelength conversion.

The liquid crystal display device according to another aspect of the present invention includes: the wavelength conversion laser light source according to any one of the foregoing configurations; and a liquid crystal display panel for receiving light emitted from the light source unit and forming an image.

According to the foregoing configuration, a high definition and low power consumption liquid crystal display device can be realized by using the foregoing wavelength conversion laser light source capable of performing stable and efficient wavelength conversion.

The laser light source according to another aspect of the present invention includes: the wavelength conversion laser light source according to any one of the foregoing configurations; and a delivery fiber for guiding the harmonic light output from the wavelength conversion laser light source to an irradiation target area.

According to the foregoing configuration, a highly reliable low power consumption laser light source with fiber can be realized by using the foregoing wavelength conversion laser light source capable of performing stable and efficient wavelength conversion.

INDUSTRIAL APPLICABILITY

The wavelength conversion laser light source of the present invention is useful as a wavelength conversion laser light source comprising a fundamental light source in which the polarization properties and emission wavelength of the fundamental light change easily, and can be applied to laser display devices with high color reproducibility.

Incidentally, the specific embodiments and examples in the detailed description of the invention are merely provided for demonstrating the technical content of the present invention, and the present invention should not be interpreted narrowly by being limited such specific examples. Thus, the present invention may be implemented in various modes within the spirit of this invention and the scope of claims provided below.

The invention claimed is:

1. A wavelength conversion laser light source, comprising:
a fundamental light source for outputting fundamental light;
a wavelength conversion element with a nonlinear optical effect for converting the fundamental light into harmonic light of a different wavelength;
a polarization element disposed at a position where the fundamental light is incident, and for passing only light of a specific polarization direction contained in the fundamental light;
a first optical receiver for receiving the light which has passed the polarization element and converting an amount of light thereof into an electrical signal;
a second optical receiver for receiving the harmonic light output from the wavelength conversion element and converting an amount of light thereof into an electrical signal;
a temperature holding unit for holding a temperature of the wavelength conversion element constant;
a fundamental light control unit for performing first control of controlling an amount of light of the fundamental light output from the fundamental light source based on the electrical signal from the second optical receiver, and second control of controlling an amount of light of the fundamental light based on the electrical signal from the first optical receiver; and a temperature control unit for performing third control of controlling a holding temperature of the temperature holding unit based on the electrical signal from the second optical receiver.

2. A wavelength conversion laser light source, comprising:
a fundamental light source for outputting fundamental light;
a wavelength conversion element with a nonlinear optical effect for converting the fundamental light into harmonic light of a different wavelength;
a mirror disposed at a position where the harmonic light output from the wavelength conversion element is incident, for separating fundamental light contained in the harmonic light;
a polarization element disposed at a position where the fundamental light as separated is incident, which allows only the light of a specific polarization direction contained in the harmonic light to pass therethrough;
a first optical receiver for receiving the light passed through the polarization element and converting an amount of light thereof into an electrical signal;
a second optical receiver for receiving the harmonic light output from the wavelength conversion element and converting an amount of light thereof into an electrical signal;
a temperature holding unit for holding a temperature of the wavelength conversion element constant;
a fundamental light control unit for performing first control of controlling an amount of light of the fundamental light output from the fundamental light source based on the electrical signal from the second optical receiver, and second control of controlling an amount of light of the fundamental light based on a result of comparing the electrical signal from the second optical receiver and the electrical signal from the first optical receiver; and
a temperature control unit for performing third control of controlling the holding temperature of the temperature holding unit based on a result of comparing the electrical signal from the second optical receiver and the electrical signal from the first optical receiver.

3. The wavelength conversion laser light source according to claim 1,
wherein the first control to third control are intermittently implemented by the fundamental light control unit and the temperature control unit so that implementation timing of the first control and implementation timing of the second control and the third control do not overlap.

4. The wavelength conversion laser light source according to claim 1,
wherein the temperature control unit includes
a temperature measuring part for measuring a temperature of the wavelength conversion element, and
a temperature controller for supplying current to the temperature holding unit and controlling the holding temperature of the temperature holding unit constant based on a measurement signal from the temperature measuring part.

5. The wavelength conversion laser light source according to claim 4,
wherein the temperature controller adjusts the holding temperature of the temperature holding unit by performing wobbling at $\pm \Delta t$ (° C.) centered around a center temperature $T_c$ (° C.), and
if the amount of light of the harmonic light is $P(T_c+\Delta t)$, $P(T_c)$ and $P(T_c-\Delta t)$, respectively, when the temperature of the wavelength conversion element is $T_c+\Delta t$ (° C.), $T_c$ (° C.) and $T_c-\Delta t$ (° C.), current is supplied to the temperature holding unit so that
$T_c$ is raised if $P(T_c-\Delta t)<P(T_c)<P(T_c+\Delta t)$,
$T_c$ is maintained if $P(T_c+\Delta t)<P(T_c)>P(T_c-\Delta t)$, and
$T_c$ is lowered if $P(T_c-\Delta t)>P(T_c)>P(T_c+\Delta t)$.

6. The wavelength conversion laser light source according to claim 5,
wherein a range of the $\Delta t$ in which the temperature controller performs wobbling is 0.1° C. to 0.2° C.

7. The wavelength conversion laser light source according to claim 5,
wherein a period of the wobbling performed by the temperature controller is 5 seconds to 10 seconds.

8. The wavelength conversion laser light source according to claim 1,
wherein the second control controls intensity of the fundamental light so that, of the fundamental light, intensity of light in the polarization direction which contributes to a wavelength conversion of the wavelength conversion element becomes constant.

9. A wavelength conversion laser light source, comprising:
a fundamental light source for outputting fundamental light;
a wavelength conversion element with a nonlinear optical effect for converting the fundamental light into harmonic light of a different wavelength;
a polarization element disposed at a position where the fundamental light is incident, and for passing only light of a specific polarization direction contained in the fundamental light;
a first optical receiver for receiving the light which has passed the polarization element and converting an amount of light thereof into an electrical signal;
a second optical receiver for receiving the harmonic light output from the wavelength conversion element and converting an amount of light thereof into an electrical signal;
a temperature holding unit for holding a temperature of the wavelength conversion element constant; and
a fundamental light control unit for performing first control of controlling an amount of light of the fundamental light output from the fundamental light source based on the electrical signal from the second optical receiver, second control of controlling an amount of light of the fundamental light based on the electrical signal from the first optical receiver, and third control of controlling a wavelength of the fundamental light based on the electrical signal from the second optical receiver.

10. The wavelength conversion laser light source according to claim 9,
wherein the fundamental light control unit intermittently implements the first control to third control so that implementation timing of the first control and implementation timing of the second control and the third control do not overlap.

11. The wavelength conversion laser light source according to claim 9,
wherein the fundamental light source includes
a semiconductor laser for emitting excitation light,
a double clad rare earth-added fiber for absorbing the excitation light emitted from the semiconductor laser and emitting the fundamental light,
a narrow reflection band fiber grating and a broad reflection band fiber grating disposed at either end of the double clad rare earth-added fiber, and for deciding a wavelength of the fundamental light emitted from the fundamental light source, and an actuator for applying stress to the narrow reflection band fiber grating, and the wavelength of the fundamental light changes based on the stress applied by the actuator to the narrow reflection band fiber grating.

12. The wavelength conversion laser light source according to claim 9, wherein the fundamental light source is a distributed-feedback semiconductor laser light source including a distributed-feedback mirror part, and the wavelength of the fundamental light changes by changing current that is incident into the distributed-feedback mirror part.

13. The wavelength conversion laser light source according to claim 9, wherein the fundamental light source includes a distributed-feedback semiconductor laser light source with a distributed-feedback mirror part for generating light which becomes a source of the fundamental light, an excitation light source for emitting excitation light, and a laser medium for increasing intensity of the light emitted by the distributed-feedback semiconductor laser light source by absorbing the excitation light, and the wavelength of the fundamental light changes by changing current that is incident into the distributed-feedback mirror part.

14. The wavelength conversion laser light source according to claim 9, further comprising:

a temperature control unit for controlling a holding temperature of the temperature holding unit, wherein the temperature control unit includes a temperature measuring part for measuring a temperature of the wavelength conversion element, and a temperature controller for supplying current to the temperature holding unit and controlling the holding temperature of the temperature holding unit constant based on a measurement signal from the temperature measuring part.

15. The wavelength conversion laser light source according to claim 4, wherein a thermal resistance moderator for providing a difference between a temperature of the wavelength conversion element and a temperature measured with the temperature measuring part is provided between the wavelength conversion element and the temperature measuring part.

16. The wavelength conversion laser light source according to claim 9, wherein the second control controls intensity of the fundamental light so that, of the fundamental light, intensity of light in the polarization direction which contributes to a wavelength conversion of the wavelength conversion element becomes constant.

17. The wavelength conversion laser light source according to claim 15, wherein a heat transfer agent for equalizing contact thermal resistance between members is provided between the thermal resistance moderator and the wavelength conversion element, a case of the wavelength conversion laser light source, or the temperature measuring part.

18. The wavelength conversion laser light source according to claim 1, wherein the wavelength conversion element is configured from an optical crystal primarily having an oxygen octahedral structure as the basic structure thereof, and the optical crystal is formed with a periodically poled structure for matching phases of the fundamental light and the harmonic light.

19. The wavelength conversion laser light source according to claim 18, wherein a plane, which is orthogonal to a polarizing direction of the periodically poled structure, of the wavelength conversion element is coated with a coating material with electrical resistivity of $1 \times 10^8$ Ω·cm or more.

20. The wavelength conversion laser light source according to claim 2, wherein the second control is selectively executed if a phase of the electrical signal output from the first optical receiver and a phase of the electrical signal output from the second optical receiver are synchronous, and the third control is selectively executed if a phase of the electrical signal output from the first optical receiver and a phase of the electrical signal output from the second optical receiver are asynchronous.

21. A projection display device, comprising:

the wavelength conversion laser light source according to claim 1;

a two dimensional light modulation element for receiving the harmonic light emitted from the wavelength conversion laser light source and forming an image; and a projection lens for projecting the image formed with the two dimensional modulation element.

22. A liquid crystal display device, comprising:

a light source including the wavelength conversion laser light source according to claim 1; and a liquid crystal display panel for receiving light emitted from the light source unit and forming an image.

23. A laser light source, comprising:

the wavelength conversion laser light source according to claim 1; and a delivery fiber for guiding the harmonic light output from the wavelength conversion laser light source to an irradiation target area.

\* \* \* \* \*